US012278073B2

(12) United States Patent
Ostrovsky et al.

(10) Patent No.: US 12,278,073 B2
(45) Date of Patent: Apr. 15, 2025

(54) CIRCUIT BREAKERS INCORPORATING RESET LOCKOUT MECHANISMS

(71) Applicant: Leviton Manufacturing Co., Inc., Melville, NY (US)

(72) Inventors: Michael Ostrovsky, Melville, NY (US); Michael Kamor, Melville, NY (US); Alfred J. Lombardi, Melville, NY (US); Adam Kevelos, Melville, NY (US); James Bugryn, Bristol, CT (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 169 days.

(21) Appl. No.: 18/072,967

(22) Filed: Dec. 1, 2022

(65) Prior Publication Data

US 2023/0089554 A1 Mar. 23, 2023

Related U.S. Application Data

(63) Continuation of application No. 17/714,291, filed on Apr. 6, 2022, now Pat. No. 11,545,327, which is a (Continued)

(51) Int. Cl.
*H01H 1/00* (2006.01)
*H01H 33/02* (2006.01)
(Continued)

(52) U.S. Cl.
CPC .......... *H01H 71/62* (2013.01); *H01H 1/0015* (2013.01); *H01H 33/02* (2013.01);
(Continued)

(58) Field of Classification Search
CPC ........ H01H 71/62; H01H 71/54; H01H 71/64; H01H 71/524; H01H 71/0207;
(Continued)

(56) References Cited

U.S. PATENT DOCUMENTS 3,113,245 A 12/1963 Hoffman
3,786,311 A 1/1974 Hobson, Jr. et al.
(Continued)

FOREIGN PATENT DOCUMENTS

CN 204332850 U 5/2015
CN 204760342 U 11/2015
(Continued)

OTHER PUBLICATIONS

International Search Report and Written Opinion issued by the European Patent Office in connection with International Application No. PCT/US2022/015201, dated Jul. 11, 2022.

(Continued)

*Primary Examiner* — William A Bolton
(74) *Attorney, Agent, or Firm* — George Likourezos; Carter, DeLuca & Farrell LLP

(57) ABSTRACT

Multi-pole and single-pole circuit breakers include a housing and a reset lockout mechanism disposed within the housing. The reset lockout mechanism disables electrical communication between line and load terminals of the circuit breaker if a predefined condition exists. Some circuit breakers include a single actuator, transition between ON and OFF states, and are capable of performing test functions. The test functions may involve testing AFCI and/or GFCI functions of the circuit breakers. The test functions may be performed when the circuit breaker transitions from an OFF state to an ON state. Some circuit breakers including a reset lockout mechanism may be powered only on its line side. Some circuit breakers provide an electrical indication when they are in the OFF state.

16 Claims, 67 Drawing Sheets

Related U.S. Application Data continuation of application No. 16/322,039, filed as application No. PCT/US2017/045651 on Aug. 5, 2017, now Pat. No. 11,342,152.

(60) Provisional application No. 62/371,312, filed on Aug. 5, 2016.

(51) Int. Cl.

| | |
|---|---|
| ***H01H 71/52*** | (2006.01) |
| ***H01H 71/54*** | (2006.01) |
| ***H01H 71/62*** | (2006.01) |
| ***H01H 71/64*** | (2006.01) |
| ***H01H 83/04*** | (2006.01) |

(52) U.S. Cl.

CPC .......... *H01H 71/524* (2013.01); *H01H 71/54* (2013.01); *H01H 71/64* (2013.01); *H01H 83/04* (2013.01)

(58) Field of Classification Search

CPC .... H01H 71/02; H01H 71/2463; H01H 33/02; H01H 1/0015; H01H 83/04; H02H 1/0007

USPC ........ 218/154, 153, 140, 120; 200/400, 401; 335/2, 201, 202

See application file for complete search history.

(56) References Cited

U.S. PATENT DOCUMENTS

| | | | | | |
|---|---|---|---|---|---|
| 3,840,783 | A | 10/1974 | Eckart | | |
| 3,949,272 | A | 4/1976 | Smith | | |
| 4,091,433 | A | 5/1978 | Wilkinson | | |
| 4,329,727 | A | 5/1982 | Premeriani | | |
| 4,521,824 | A | 6/1985 | Morris et al. | | |
| 4,595,894 | A | 6/1986 | Doyle et al. | | |
| 4,631,625 | A | 12/1986 | Alexander et al. | | |
| 4,641,217 | A | 2/1987 | Morris et al. | | |
| 4,814,712 | A | 3/1989 | Burton et al. | | |
| 5,414,395 | A | 5/1995 | Garnto et al. | | |
| 5,453,723 | A | 9/1995 | Fello et al. | | |
| 5,477,201 | A | 12/1995 | Garnto et al. | | |
| 5,481,235 | A * | 1/1996 | Heise | H01H 83/04 | 361/42 |
| 5,483,211 | A | 1/1996 | Carrodus et al. | | |
| 5,510,945 | A | 4/1996 | Taylor et al. | | |
| 5,889,643 | A | 3/1999 | Elms | | |
| 5,933,063 | A | 8/1999 | Keung et al. | | |
| 5,940,257 | A | 8/1999 | Zavis | | |
| 6,014,297 | A | 1/2000 | Clarey et al. | | |
| 6,040,967 | A | 3/2000 | DiSalvo | | |
| 6,052,046 | A | 4/2000 | Ennis et al. | | |
| 6,288,882 | B1 | 9/2001 | Disalvo et al. | | |
| 6,417,671 | B1 | 7/2002 | Tiemann | | |
| 6,538,862 | B1 | 3/2003 | Mason, Jr. et al. | | |
| 6,734,768 | B2 | 5/2004 | Kim | | |
| 6,864,447 | B1 * | 3/2005 | Lipsey, II | H01H 73/14 | 200/312 |
| 6,897,747 | B2 * | 5/2005 | Brandon | H01H 71/524 | 335/172 |
| 6,961,226 | B2 | 11/2005 | Mason, Jr. et al. | | |
| 7,019,606 | B2 | 3/2006 | Williams et al. | | |
| 7,061,349 | B2 | 6/2006 | Castonguay et al. | | |
| 7,161,780 | B2 | 1/2007 | Germain et al. | | |
| 7,298,606 | B2 | 11/2007 | M'Sadoques | | |
| 7,307,429 | B1 | 12/2007 | Parker et al. | | |
| 7,342,474 | B2 | 3/2008 | Castonguay et al. | | |
| 7,378,927 | B2 | 5/2008 | DiSalvo et al. | | |
| 7,414,499 | B2 | 8/2008 | Germain | | |
| 7,595,710 | B2 | 9/2009 | DeBoer et al. | | |
| 7,598,629 | B2 | 10/2009 | Brown et al. | | |
| 7,876,181 | B2 * | 1/2011 | Nakano | H01H 83/226 | 335/10 |
| 8,120,886 | B2 | 2/2012 | Anand et al. | | |
| 8,437,112 | B2 | 5/2013 | Wan et al. | | |
| 8,451,568 | B2 | 5/2013 | Wan et al. | | |
| 8,570,713 | B2 | 10/2013 | Kumfer et al. | | |
| 9,042,073 | B2 | 5/2015 | Mills et al. | | |
| 9,048,054 | B2 | 6/2015 | Potratz | | |
| 9,312,088 | B2 | 4/2016 | Sorenson, Sr. | | |
| 9,318,284 | B2 * | 4/2016 | Fasano | H01H 71/08 | |
| 9,324,513 | B2 * | 4/2016 | Cazals | H01H 1/0015 | |
| 9,384,931 | B2 | 7/2016 | Fasano | | |
| 9,799,476 | B2 | 10/2017 | Fasano | | |
| 9,859,084 | B2 | 1/2018 | Fasano et al. | | |
| 9,966,206 | B1 | 5/2018 | Sastry et al. | | |
| 10,361,043 | B2 | 7/2019 | Okerman | | |
| 10,651,681 | B2 | 5/2020 | Sorenson | | |
| 10,855,067 | B2 | 12/2020 | Murahari et al. | | |
| 11,342,152 | B2 | 5/2022 | Ostrovsky | | |
| 11,398,363 | B2 | 7/2022 | Courson et al. | | |
| 11,901,148 | B2 | 2/2024 | Kamor et al. | | |
| 2003/0123209 | A1 | 7/2003 | Kim | | |
| 2005/0024173 | A1 | 2/2005 | Puskar et al. | | |
| 2005/0212628 | A1 | 9/2005 | Castonguay et al. | | |
| 2005/0212629 | A1 | 9/2005 | Williams et al. | | |
| 2005/0213289 | A1 | 9/2005 | M'Sadoques et al. | | |
| 2006/0071742 | A1 | 4/2006 | Castonguay et al. | | |
| 2007/0132531 | A1 | 6/2007 | Elms | | |
| 2008/0151463 | A1 | 6/2008 | Dwyer et al. | | |
| 2009/0167100 | A1 | 7/2009 | Brown et al. | | |
| 2010/0020453 | A1 | 1/2010 | McCoy et al. | | |
| 2010/0052829 | A1 | 3/2010 | Anand et al. | | |
| 2011/0273817 | A1 | 11/2011 | Wan | | |
| 2011/0273818 | A1 | 11/2011 | Wan et al. | | |
| 2012/0273334 | A1 * | 11/2012 | Ganley | H01H 71/322 | 200/400 |
| 2013/0003262 | A1 | 1/2013 | Kumfer et al. | | |
| 2014/0062623 | A1 | 3/2014 | Fasano | | |
| 2014/0176293 | A1 * | 6/2014 | Melecio | H01H 71/18 | 337/12 |
| 2015/0035628 | A1 | 2/2015 | Warne | | |
| 2015/0070114 | A1 | 3/2015 | Fasano et al. | | |
| 2015/0101914 | A1 * | 4/2015 | Sorenson, Sr. | H01H 71/12 | 200/331 |
| 2016/0141862 | A1 | 5/2016 | Endozo et al. | | |
| 2016/0163475 | A1 | 6/2016 | Okerman | | |
| 2016/0300682 | A1 | 10/2016 | Fasano | | |
| 2019/0058354 | A1 | 2/2019 | Sorenson | | |
| 2020/0136365 | A1 | 4/2020 | Courson et al. | | |

FOREIGN PATENT DOCUMENTS

| | | | |
|---|---|---|---|
| EP | 1703533 | A2 | 9/2006 |
| EP | 2849200 | A1 | 3/2015 |
| WO | 02080329 | A1 | 10/2002 |
| WO | 2004044937 | A2 | 5/2004 |
| WO | 2008010038 | A2 | 1/2008 |

OTHER PUBLICATIONS

Chinese Office Action issued by the China National Intellectual Property Administration on Oct. 12, 2019, in corresponding Chinese Patent Application No. 201780049007.4, with English translation.

International Search Report dated Sep. 29, 2019 corresponding to Chinese Patent Applciation No. 201780049007.4.

International Search Report issued by the International Searching Authority/U.S. in connection to International Application No. PCT/US20/70839, dated Feb. 12, 2021.

International Search Report issued by the U.S. Patent and Trademark Office on Dec. 11, 2017 in corresponding International Application No. PCT/US2017/045651.

Written Opinion of the International Searching Authority issued by the International Searching Authority/U.S. in connection to International Application No. PCT/US20/70839 dated Feb. 12, 2021.

* cited by examiner

CIRCUIT BREAKERS INCORPORATING RESET LOCKOUT MECHANISMS

CROSS-REFERENCE TO RELATED APPLICATION

The present application is a continuation application of U.S. patent application Ser. No. 17/714,291, entitled "CIRCUIT BREAKERS INCORPORATING RESET LOCKOUT MECHANISMS," filed on Apr. 6, 2022, which is a continuation of U.S. patent application Ser. No. 16/322,039, entitled "CIRCUIT BREAKERS INCORPORATING RESET LOCKOUT MECHANISMS," filed on Jan. 30, 2019 (now U.S. Pat. No. 11,342,152), which claims the benefit of and priority to U.S. National Stage Application of PCT Application Serial No. PCT/US2017/045651, filed Aug. 5, 2017, which claims the benefit of U.S. Provisional Patent Application No. 62/371,312, entitled "RESET LOCKOUT MECHANISM FOR CIRCUIT BREAKERS," filed on Aug. 5, 2016, the entire contents of each of which are incorporated by reference herein.

BACKGROUND

Technical Field

The present disclosure relates to an electrical switching apparatus and, more particularly, but not exclusively, relates to circuit breakers including a reset lockout mechanism activated by a single actuator, such as a rocker actuator.

Background of Relevant Art

The electrical wiring device industry has witnessed an increasing call for circuit interrupting devices or systems which are designed to protect from dangers presented by overcurrent (e.g. overload/short circuits), ground faults, and arc faults. In particular, electrical codes require electrical circuits in home bathrooms and kitchens to be equipped with ground fault circuit protection. Presently available GFCI devices, such as the GFCI receptacle described in commonly owned U.S. Pat. No. 4,595,894, use an electrically activated trip mechanism to mechanically break an electrical connection between one or more input and output conductive paths. Such devices are resettable after they are tripped by, for example, the detection of a ground fault. In the device discussed in the '894 patent, the trip mechanism used to cause the mechanical breaking of the circuit (i.e., the connection between input and output conductive paths) includes a solenoid. A test button is used to test the trip mechanism and circuitry used to sense faults, and a reset button is used to reset the electrical connection between input and output conductive paths.

Commonly owned U.S. patent application Ser. No. 09/138,955 filed Aug. 24, 1998, now U.S. Pat. No. 6,040,967, describes a family of resettable circuit interrupting devices capable of locking out the reset portion of the device if the circuit interrupting portion is non-operational or if an open neutral condition exists, and is incorporated herein in its entirety by reference. Commonly owned U.S. patent application Ser. No. 09/175,228 filed Oct. 20, 1998, now U.S. Pat. No. 6,040,967 describes a family of resettable circuit interrupting devices capable of locking out the reset portion of the device if the circuit interrupting portion is non-operational or if an open neutral condition exists and capable of breaking electrical conductive paths independent of the operation of the circuit interrupting portion, and is incorporated herein in its entirety by reference.

Existing resettable circuit breakers that offer fault protection capabilities have both line and load phase neutral phase terminals. Additionally, resettable circuit breakers also have a switch for controlling power distribution to the load phase terminal. To provide fault protection, such circuit breakers have a sensing circuitry and a linkage coupled to the switch, which are capable of sensing faults (e.g., ground faults) between the load phase and the line neutral conductive paths and opening the switch. A test button accessible from an exterior of the breaker is used to test the operation of the fault protection portion of the breaker when depressed.

SUMMARY

Existing challenges associated with the foregoing, as well as other challenges, are overcome by systems and methods which operate in accordance with the present disclosure.

According to an example embodiment of the present disclosure, a circuit breaker includes a single actuator, a mechanism including a latch arm and a linkage mechanism, and circuitry. The single actuator is coupled to a housing and configured to move between an ON position and an OFF position. The mechanism is configured to selectively enable electrical communication between a line terminal and a load terminal in response to motion of the actuator. The mechanism may further include a latch arm having a proximal portion operably coupled to the single actuator and a distal portion including a latch portion. The linkage mechanism may electrically couple to a line terminal and operably couple to the distal portion of the latch arm. The linkage mechanism may have a first linkage configured to engage the latch portion. Movement of the linkage mechanism may selectively disable electrical communication between the line terminal and a load terminal. The circuitry may be configured to cause the latch portion to move from a first position associated with enabling electrical communication between the line terminal and the load terminal to a second position.

In aspects, moving the latch portion from the first position to the second position may disable electrical communication between the line terminal and the load terminal. The circuitry may be configured to sense a current flowing between the line terminal and the load terminal, analyze the sensed current, and determine whether a first fault exists based on the analysis of the current. The circuit breaker may further include a solenoid. The solenoid may be configured to selectively engage the linkage mechanism.

The circuitry may be configured to transmit control signals to the solenoid to engage the linkage mechanism. The circuitry may also be configured to transmit control signals to the solenoid based on determining that the first fault exists. The circuitry may be configured to transmit control signals to the solenoid to engage the linkage mechanism based on determining that the fault does not exist. In aspects, the circuitry may be further configured to sense a second current at the line terminal, analyze the second current, and determine whether a second fault exists based on the analysis of the second current. In aspects, the circuitry may be configured to transmit control signals to the solenoid to engage the linkage mechanism based on determining the second fault does not exist.

The circuit breaker may be a multi-pole circuit breaker.

According to another example embodiment herein, a circuit breaker includes an actuator, a latch arm, a linkage mechanism, and circuitry. The actuator is coupled to a housing and movable between an ON position and an OFF position. The latch arm has a proximal portion and a latch portion. The latch portion is located distal relative to the proximal portion and operably couples the latch arm to the actuator. The linkage mechanism operably couples to the latch portion and operably couples to a line terminal such that movement of the linkage mechanism selectively enables electrical communication between the line terminal and a load terminal. The circuitry is configured to move the latch portion relative to the linkage mechanism from a first position associated with enabling electrical communication between the line terminal and the load terminal to a second position. The circuitry is continuously powered via the line terminal when power is supplied to the line terminal.

In aspects, moving the latch portion from the first position to the second position disables electrical communication between the line terminal and the load terminal. The circuitry may be configured to sense a current sense a current flowing between the line terminal and the load terminal, analyze the sensed current, and determine whether a fault exists based on the analysis of the current. The circuit breaker may further include a solenoid configured to selectively engage the linkage mechanism. The circuitry may be further configured to transmit control signals to cause the solenoid to engage the linkage mechanism based on determining the fault does not exist. The circuitry may be further configured to sense a second current received at the line terminal, analyze the second current, and determine whether the fault exists based on the analysis of the second current. The circuitry may be configured to transmit control signals to the solenoid to engage the linkage mechanism based on determining the fault does not exist.

The circuit breaker may be a multi-pole circuit breaker.

In another example, a circuit breaker includes a single actuator, a latch arm, a linkage mechanism and circuitry. The single actuator couples to a housing and is movable between an ON position and an OFF position. The latch arm has a proximal portion and a latch portion. The latch portion is located distal relative to the proximal portion and operably coupling the latch arm to the actuator. The linkage mechanism operably couples to the distal portion of the latch arm and electrically couples to a line terminal such that movement of the actuator to the ON position causes the linkage mechanism to be moved to a first position enabling electrical communication between the line terminal and a load terminal. The control circuitry is configured to cause the linkage mechanism to move from the first position to a second, detect actuation of the single actuator, sense a current flowing between the line terminal and the load terminal, analyze the sensed current, and determine whether a fault exists based on the analysis.

According to aspects, movement of the latch portion from the first position to the second position disables electrical communication between the line terminal and the load terminal. The circuit breaker may further include a solenoid configured to selectively engage the linkage mechanism. The circuitry may be configured to transmit control signals to the solenoid to engage the linkage mechanism based on determining the fault exists. The circuitry may be configured to transmit a control signal to the solenoid to engage the linkage mechanism based on determining the fault does not exist. The circuitry may further configured to sense a second current received by the line terminal, analyze the sensed current, and determine whether the fault exists based on the analysis of the second current. The circuitry may be configured to transmit control signals to the solenoid to engage the linkage mechanism based on determining the fault does not exist. The linkage mechanism may be configured to move to a third position when the actuator is moved to the OFF position. The fault may be a fault selected from the group consisting of a ground fault, an arc fault, a shared-neutral condition, and an overcurrent condition.

According to an example of the present disclosure, a circuit breaker includes a single actuator, a linkage member, and a mechanism. The single actuator is coupled to a housing and configured to move between an ON position and an OFF position. The linkage member operably couples to the single actuator and is movable between a first position and a second position such that movement of the single actuator to the ON position moves the linkage member to the first position to enable electrical communication between the line terminal and a load terminal. The mechanism is configured to selectively enable electrical communication between a line terminal and a load terminal in response to motion of the actuator. The mechanism may include control circuitry configured to initiate a test in response to detecting movement of the linkage member from the second position toward the first position, determine a result of the test, and generate a signal to cause at least one indicator to show a state of the circuit breaker in response to determining the result of the test.

According to aspects, determining may include includes determining that a fault associated with the circuit breaker does not exist. Determining may include determining that a fault associated with the circuit breaker exists. The control circuitry may be configured to transmit control signals to cause the mechanism to move the linkage member to the second position. Movement of the linkage member to the second position may disable electrical communication between the line terminal and the load terminal. The circuit breaker may further include a solenoid configured to selectively engage the linkage member. The mechanism may be configured to transmit control signals to the solenoid to engage the linkage member based on determining the fault does not exist.

In aspects, the control circuitry is further configured to sense a second current received at the line terminal, analyze the second current, and determine whether the fault exists based on the analysis of the second current. The control circuitry may be configured to transmit a control signal to the solenoid to engage the linkage member based on determining the fault does not exist after analyzing the second current.

The circuit breaker may be a multi-pole circuit breaker.

In yet another example, a circuit breaker includes a single actuator, a latch arm, a linkage mechanism, and circuitry. The single actuator is coupled to a housing and configured to move between an ON position and an OFF position. The latch arm has a proximal portion and a latch portion. The latch portion is located distal relative to the proximal portion and operably couples the latch arm to the single actuator. The linkage mechanism operably couples to the single actuator and is electrically coupled to a line terminal such that movement of the linkage mechanism selectively enables electrical communication between the line terminal and a load terminal. The circuitry is configured to generate a signal to activate at least one electrical indicator while the circuit breaker is in an OFF state.

In aspects, the circuitry is further configured to sense a current, analyze the sensed current, and determine whether a predetermined condition exists based on the analysis of the sensed current. In aspects the predetermined condition is selected from the group consisting of ground faults, arc faults, shared-neutral conditions, and overcurrent conditions. The circuit breaker may further include a solenoid. The solenoid may be configured to engage the linkage mechanism. The circuitry may be configured to transmit a control signal to the solenoid to engage the linkage mechanism in response to determining that the predetermined condition exists. The circuitry may be configured to transmit control signals to the solenoid to engage the linkage mechanism based on determining that the fault does not exist and the single actuator has been actuated.

The circuitry may be further configured to sense a second current at the line terminal, analyze the second current, and determine whether a second fault exists based on the analysis of the second current. The circuitry may be configured to transmit control signals to the solenoid to engage the linkage mechanism based on determining that the second fault does not exist and the single actuator has been actuated.

The circuit breaker may be a multi-pole circuit breaker.

According to examples of the present disclosure, a circuit breaker includes an actuator, a latch arm, a linkage mechanism and a circuit. The actuator is coupled to a housing and is movable between an ON position and an OFF position. The latch arm has a proximal portion and a latch portion. The latch portion is located distal relative to the proximal portion and operably couples the latch arm to the actuator. The linkage mechanism operably couples to the latch portion such that movement of the linkage mechanism to a first position selectively enables electrical communication between a line terminal to a load terminal. The circuit is configured to sense a current flowing between the line terminal and load terminal, detect a shared neutral condition, and generate a signal to activate at least one indicator in response to detecting the shared neutral condition.

According to aspects, the circuit is further configured to cause the linkage mechanism to move from a first position corresponding to an ON state enabling electrical communication between the line terminal and the load terminal to a second position. The circuit breaker may further include a solenoid configured to operably engage the linkage mechanism, the solenoid in communication with the circuit. The circuit may be configured to transmit a control signal to the solenoid in response to detecting the shared neutral condition. The solenoid may be configured to move the linkage mechanism from the first position to the second position in response to receiving the signal from the circuit.

The circuit breaker may be a multi-pole circuit breaker.

In another example, a circuit breaker includes a line terminal, a load terminal, an actuator, a latch arm, a linkage mechanism, and a reset lockout mechanism. The actuator is movable between a first position and a second position. The latch arm has a proximal portion operably coupled to the actuator and a distal portion. The linkage mechanism operably couples to the distal portion of the latch arm. Movement of the actuator from the first position towards the second position actuates the latch arm. Actuation of the latch arm operates the linkage mechanism. Operation of the linkage mechanism selectively establishes electrical communication between the line terminal and the load terminal. The reset lockout mechanism is configured to selectively inhibit operation of the linkage mechanism.

According to aspects of the present disclosure the linkage mechanism includes a projection and the reset lockout mechanism includes an armature movable between a biased position and an actuated position. The armature may be configured to selectively disengage the projection when the armature is in the actuated position. The linkage mechanism may further include a slot configured to slidably receive the projection. The armature may be moved to the actuated position when a predetermined condition is detected by the circuit breaker. The first position of the actuator may be associated with an OFF state of the circuit breaker and the second position of the actuator may be associated with an ON state of the circuit breaker. The reset lockout mechanism may permit the actuator to move between the first position and the second position by disengaging the projection of the armature when the circuit breaker detects the predetermined condition. The predetermined condition is selected from the group consisting of a ground fault, a ground-neutral fault, an arc fault, and an overcurrent.

In aspects, the predetermined condition may be simulated. The circuit breaker may be a multi-pole circuit breaker. The actuator may be selected from the group consisting of a rocker, a toggle, a slider, and a push button.

The circuit breaker may further include control circuitry configured to perform a self-test and determine, based on the self-test, if the predetermined condition is present. The self-test may be performed in response to movement of the actuator from the first position towards the second position. The self-test may be performed automatically by the control circuitry when the actuator is located in the second position.

In aspects, the circuit breaker includes a sensor and the control circuitry performs the self-test by creating a simulated fault, obtaining a sensor signal from the sensor, analyzing the sensor signal, and determining whether the predetermined condition is present based on the sensor signal. The sensor may include at least one of a differential transformer, a ground neutral transformer, a high frequency transformer, and a voltage sensor.

In aspects, the latch portion includes at least one projection, the linkage mechanism having a first linkage including a toothed edge that defines a portion of a slot disposed along the first linkage, the slot configured to receive the at least one projection.

According to aspects, the circuit breaker may be in an ON state when the first linkage of the linkage mechanism is rotated such that the projection engages the toothed edge of the first linkage.

In aspects, the circuit breaker includes a solenoid disposed adjacent to the reset lockout mechanism and configured to selectively generate a magnetic field to draw the armature toward the solenoid. The linkage mechanism may include a second linkage coupled to the armature and a first linkage, the second linkage configured to selectively decouple the line terminal from the load terminal when the armature is drawn toward the solenoid.

According to aspects, the circuit breaker may further include a housing and an electrical test contact. The electrical test contact may be disposed within the housing. The housing may at least partially enclose the circuit breaker. The electrical test contact may be operable communication with the latch arm and configured to transmit to cause the circuit breaker to perform a self-test.

In examples a circuit breaker includes an actuator, a latch arm, a conductive path, a reset lockout mechanism, and an armature. The actuator may is movable between a first position and a second position. The latch arm has a proximal portion operably coupled to the actuator and a distal portion. The conductive path is configured to selectively electrically couple a line terminal and a load terminal. The reset lockout mechanism selectively opens the conductive path if a predetermined condition is detected. The reset lockout mechanism includes a linkage mechanism operably coupled to the distal portion of the latch arm. Movement of the actuator from the first position towards the second position actuates the latch arm. Actuation of the latch arm operates the linkage mechanism. Operation of the linkage mechanism selectively establishes electrical communication between the line terminal and the load terminal. The armature is movable between a biased position and an actuated position. The armature is configured to selectively engage the distal portion of the latch arm when the armature is in the actuated position.

According to aspects, the armature forms an interference fit with a projection extending from the distal portion of the latch arm. When the projection is in a first position relative to the linkage mechanism the line terminal is in electrical communication with the load terminal, and when the projection is in a second position relative to the linkage mechanism the line terminal is not in electrical communication with the load terminal.

In aspects the circuit breaker further includes an actuator configured to engage the armature to clear the interference fit between the projection of the first linkage and the extension of the armature. The actuator may be a solenoid. The first linkage of the linkage mechanism may defines a slot configured to receive a latch portion of the latch arm. The latch portion may include at least one projection configured to engage a toothed edge of the first linkage, the toothed edge formed along a portion of the slot. The latch arm may include a pair of springs on a rear end thereof for biasing the latch arm. The circuit breaker may further include an electrical test contact disposed within a housing enclosing the circuit breaker, the electrical test contact configured to cause the circuit breaker to perform a simulated test.

In yet another example a multi-pole circuit breaker includes an actuator, a latch arm, a first linkage, a first armature, a first solenoid, and a second linkage. The actuator is movably coupled to a housing between an ON position and an OFF position. The latch arm is operably coupled to the actuator. The first linkage mechanism is operably coupled to the latch arm and associated with a first line side terminal, the first linkage mechanism having a first linkage and a projection extending from the first linkage. The first armature is rotatably coupled to the first linkage mechanism and having an extension configured to form a mechanical engagement with the projection of the first linkage. The first solenoid is configured to rotate the first armature to disengage the projection of the first linkage from the extension of the first armature. The second linkage mechanism is mechanically coupled to the first linkage mechanism such that the second linkage mechanism moves in response to a movement of the first linkage mechanism.

According to aspects, the actuator is a component selected from the group consisting of rocker mechanisms, toggle mechanisms, and push buttons. The multi-pole circuit breaker may further include a coupler interposed between the first and second linkage mechanisms for mechanically coupling the first and second linkage mechanisms. The coupler may be secured to the first linkage of the first linkage mechanism and a first linkage of the second linkage mechanism.

In aspects the multi-pole circuit breaker may further include a second armature rotatably coupled to the second linkage mechanism. The second armature may contact a linkage of the second linkage mechanism in response to an activation of a second solenoid associated with the second linkage mechanism to open a second conductive path. The linkage of the second linkage mechanism may be configured to collapse upon the second armature making contact therewith.

According to aspects, movement of the actuator from an OFF state toward an ON state may cause the circuit breaker to test the first solenoid. Upon the test of the first solenoid failing to activate the first solenoid, the projection of the first linkage may remain in mechanical engagement with the extension of the first armature such that a further movement of the actuator toward the ON state is prevented. The first linkage mechanism may include a second linkage movably coupled to the first linkage and configured to collapse in response to the first armature making contact therewith.

In another example, a multi-pole circuit breaker includes a housing, a par of first and second contacts, a rocker actuator, a latch arm, a first linkage mechanism, a first armature, a first solenoid, and a second linkage mechanism. The pair of first and second contacts are fixed relative to the housing. The rocker actuator is coupled to the housing. The latch arm is in mechanical cooperation with the rocker actuator. The first linkage mechanism is operably coupled to the latch arm and has a third contact and a first linkage having a projection. The first linkage mechanism is movable relative to the first contact to control electrical coupling between the first and third contacts that form a first conductive path therebetween. The first armature rotatably coupled to the first linkage mechanism and having an extension configured to form a mechanical engagement with the projection of the first linkage. The first solenoid is configured to rotate the first armature to disengage the projection of the first linkage from the extension of the first armature. The second linkage mechanism has a fourth contact. The second linkage mechanism is movable relative to the second contact to control electrical coupling between the second and fourth contacts that form a second conductive path therebetween, the second linkage mechanism being mechanically coupled to the first linkage mechanism such that the second linkage mechanism moves in response to a movement of the first linkage mechanism.

According to aspects, the actuator is a component selected from the group consisting of rocker mechanisms, toggle mechanisms, and push buttons. The rocker actuator may be movable relative to the housing between a first position in which the third and fourth contacts of the respective first and second linkage mechanisms are spaced from the first and second contacts corresponding to an OFF state of the multi-pole circuit breaker, a second position in which a fault or overcurrent condition is present corresponding to a mid-trip state of the multi-pole circuit breaker, and a second position in which the third and fourth contacts of the respective first and second linkage mechanisms are engaged with the first and second contacts corresponding to an ON state of the multi-pole circuit breaker.

In aspects, the multi-pole circuit breaker may further include a coupler interposed between the first and second linkage mechanisms for mechanically coupling the first and second linkage mechanisms. The coupler is secured to the first linkage of the first linkage mechanism and a first linkage of the second linkage mechanism.

According to aspects, the multi-pole circuit breaker further includes a second armature rotatably coupled to the second linkage mechanism. The second armature contacts a linkage of the second linkage mechanism in response to an activation of a second solenoid associated with the second linkage mechanism to open the second conductive path. The linkage of the second linkage mechanism may be configured to collapse upon the second armature making contact therewith.

In aspects, movement of the rocker actuator from an OFF state toward an ON state causes the circuit breaker to test the first solenoid. Upon the test of the first solenoid failing to activate the first solenoid, the projection of the first linkage remains in mechanical engagement with the extension of the first armature such that a further movement of the rocker actuator toward the ON state is prevented. The first linkage mechanism may include a second linkage movably coupled to the first linkage and having the third contact attached thereto, the second linkage of the first linkage mechanism being configured to collapse in response to the first armature making contact therewith.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the present invention may be more readily understood by one skilled in the art with reference being had to the following detailed description of several embodiments thereof, taken in conjunction with the accompanying drawings wherein like elements are designated by identical reference numerals throughout the several views, and in which:

Figure 1:
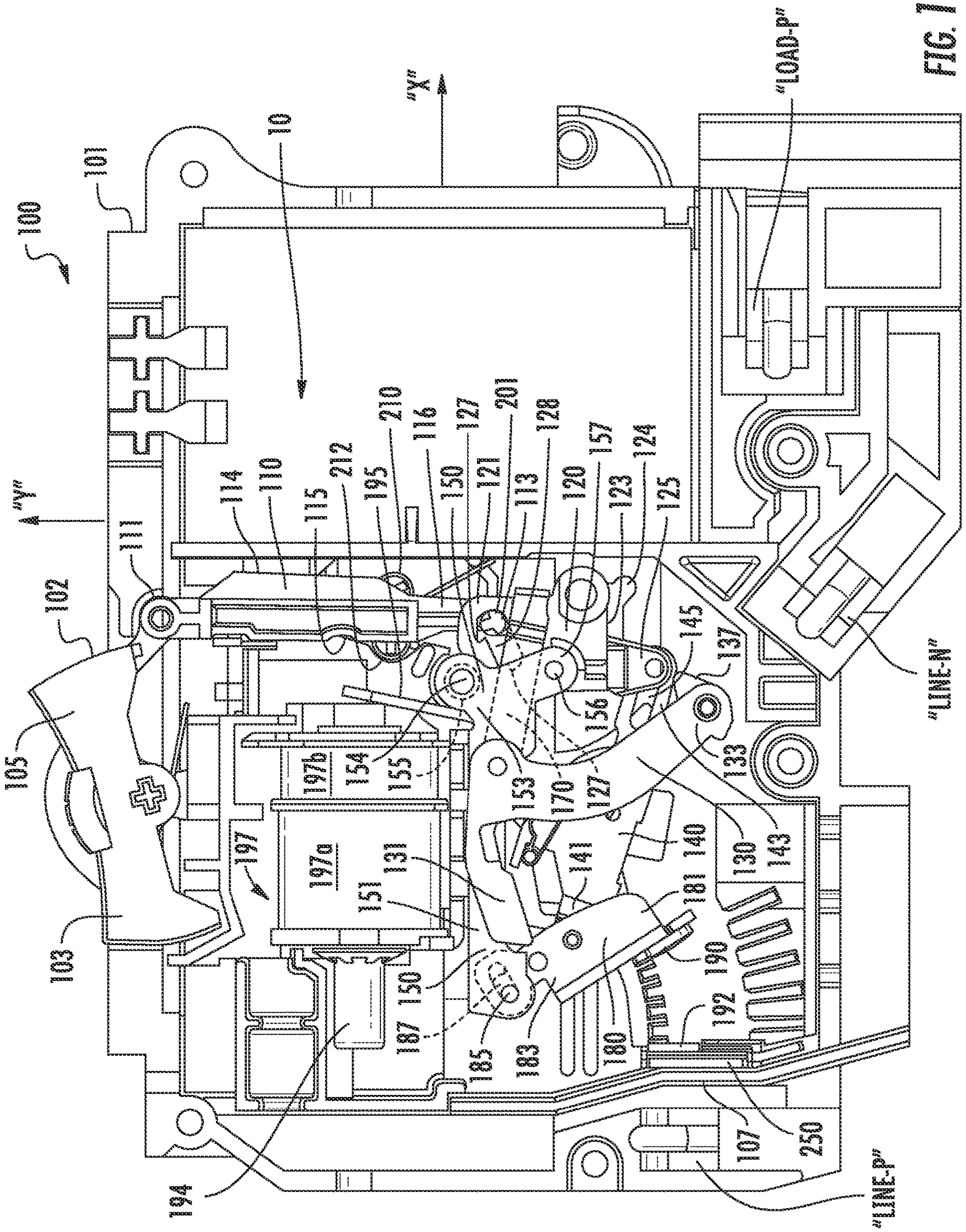
FIG. 1 is a side plan view of internal components of a circuit breaker in an OFF state.

The figures depict preferred embodiments of the present disclosure for purposes of illustration only. One skilled in the art will readily recognize from the following discussion that alternative embodiments of the structures and methods illustrated herein may be employed without departing from the principles of the present disclosure described herein.

DETAILED DESCRIPTION

The present disclosure relates to resettable circuit interrupting devices or circuit breakers for disabling or breaking and enabling or reestablishing electrical communication between input or line terminals and output or load terminals of a device. Electrical communication between the line and load terminals may be enabled by establishing a conductive path between the line and load terminals. The devices described herein may be of any suitable type such as, without limitation, ground fault circuit interrupters (GFCIs) and arc fault circuit interrupters (AFCIs). Generally, circuit interrupting devices according to the present disclosure include a circuit interrupting portion, a reset portion, a reset lockout mechanism, and a trip portion. It is contemplated that the circuit interrupting portion, reset portion, reset lockout mechanism and trip portion may be combined or otherwise implemented in a variety of ways without departing from the spirit or scope of the present disclosure.

The circuit breaker includes line side phase and neutral terminals as well as load side phase and neutral terminals which receive and transmit electrical power therebetween. The line and neutral terminals connect to a power source and the load and neutral terminals connect to a branch circuit having one or more loads. Terminals are defined herein as points where external conductive paths (e.g. conductors or wires) can be connected. These terminals may be, for example, any suitable electrical fastening devices, such as but not limited to binding screws, lugs, binding plates, jaw contacts, pins, prongs, sockets, and/or wire leads, which secure the external conductive path to the circuit breaker, as well as conduct electricity.

The circuit interrupting and reset portions generally use electromechanical component(s) to break and reestablish the conductive path between power input ("line") and output ("load") phase terminals formed along conductive paths. The conductive path is typically defined as an electrical path which couples a line terminal and a load terminal. Examples of such electromechanical components include solenoids, bimetallic, hydraulic components, switches, or any other suitable components capable of being electromechanically engaged so as to break or reestablish conductive paths between the line and load terminals. In some embodiments, circuit interrupting portions are separated so as to react to specific fault types, such as the presence of an overcurrent, a ground fault, or an arc fault. Additionally, the same circuit interrupting portion may be used to protect against identified overcurrent, ground fault, and arc fault conditions. Additionally, there may be individual circuit interrupting portions configured to react to overcurrent, ground fault, or arc fault protection, with the individual circuit interrupting portions configured to share certain components.

To protect against overcurrent, arc faults, and ground faults, the circuit interrupting portion breaks the electrical continuity between the line and load phase terminals by opening the circuit when a fault is detected, thereby severing at least one mechanical connection between components associated with the conductive paths. Operation of the reset portion and reset lockout mechanism may occur in conjunction with the operation of the circuit interrupting portion, so that resetting the electrical connections along the conductive paths cannot occur when a predefined condition exists such as, without limitation, the circuit interrupting portion being nonoperational or when an "open neutral" condition exists.

Once the circuit interrupting portion breaks the conductive path, the reset lockout mechanism is configured to prevent the circuit breaker from resetting or reestablishing a continuous or closed conductive path while a predefined condition or fault exists. The reset lockout mechanism may be any lockout mechanism capable of preventing the reestablishment of the conductive path such as a mechanical componentry or a routine performed by a control circuit which causes the mechanical componentry of the circuit breaker to transition to a lockout configuration.

Various types of circuit interrupting devices are contemplated by the present disclosure. Generally, circuit breakers are used as resettable branch circuit protection devices that are capable of opening conductive paths supplying electrical power between line and load terminals in a power distribution system (or sub-system). The conductive paths transition between an OPEN or TRIP configuration if a fault is detected or if the current rating of the circuit breaker is exceeded. Detection of faults may be performed by mechanical components or electrical components. Once a detected fault is cleared, the circuit breaker, and more particularly the reset lockout mechanism, may be reset to permit reestablishment of the conductive path.

The circuit breakers can provide fault protection for various types of faults or combination of faults. Faults, as defined herein, refer to conditions which render the circuit unsafe due to the presence of an abnormal electric current. Examples of faults contemplated include, without limitation, ground faults, arc faults, immersion detection faults, appliance leakage faults, and equipment leakage faults. Although various types of fault protection circuit breakers are contemplated, for purposes of clarity the following descriptions will be made with reference to GFCI circuit breakers and AFCI circuit breakers.

An exemplary embodiment of a GFCI circuit breaker incorporating a reset lockout mechanism will now be described. Generally, each GFCI circuit breaker has a circuit interrupting portion, a reset portion, a reset lockout mechanism for selectively locking the circuit breaker in either an OFF, TRIP, or MID-TRIP configuration. Each GFCI circuit breaker may further include a trip portion which operates independently of the circuit interrupting portion. The trip portion may selectively transition the circuit breaker into a MID-TRIP or TRIP configuration.

In the GFCI circuit breaker, the circuit interrupting and reset portions may include electromechanical components configured to selectively open or break and close or reestablish conductive paths between the line and load phase terminals. Additionally, or alternatively, components such as solid state switches or supporting circuitry may be used to break or reestablish the conductive path. The circuit interrupting portion automatically breaks electrical continuity along the conductive path (i.e., opens the conductive path) between the line and load phase terminals upon detection of a ground fault, overcurrent, or arc fault, or any combination thereof. The reset portion permits reestablishing electrical continuity along the conductive path between the line phase terminal to the load phase terminal. In embodiments, the reset portion may cause the reset lockout mechanism to transition to a MID-TRIP configuration, thereby permitting reestablishment of the conductive path while the reset lockout mechanism remains engaged. Operation of the reset portion and reset lockout mechanism may occur in conjunction with operation of the circuit interrupting portion so that the conductive path between the line and load phase terminals cannot be reestablished if the circuit interrupting portion is non-operational or if a fault is detected.

Particular embodiments of the present disclosure are described herein with reference to the accompanying drawings. However, it is to be understood that the disclosed embodiments are merely exemplary embodiments of the present disclosure and may be embodied in various forms. Well-known functions or constructions are not described in detail so as to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

For the purposes of promoting an understanding of the principles of the present disclosure, reference will now be made to particular embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the spirit and scope of the present disclosure.

FIG. 1 illustrates a side view of the internal components of a circuit breaker 100 generally including a housing 101 and a reset lockout mechanism 10 disposed within the housing 101. The housing 101 defines an axis "X" (oriented horizontally in FIG. 1) and an axis "Y" (oriented vertically in FIG. 1), such that axis "X" is perpendicular to axis "Y."

Figure 3:
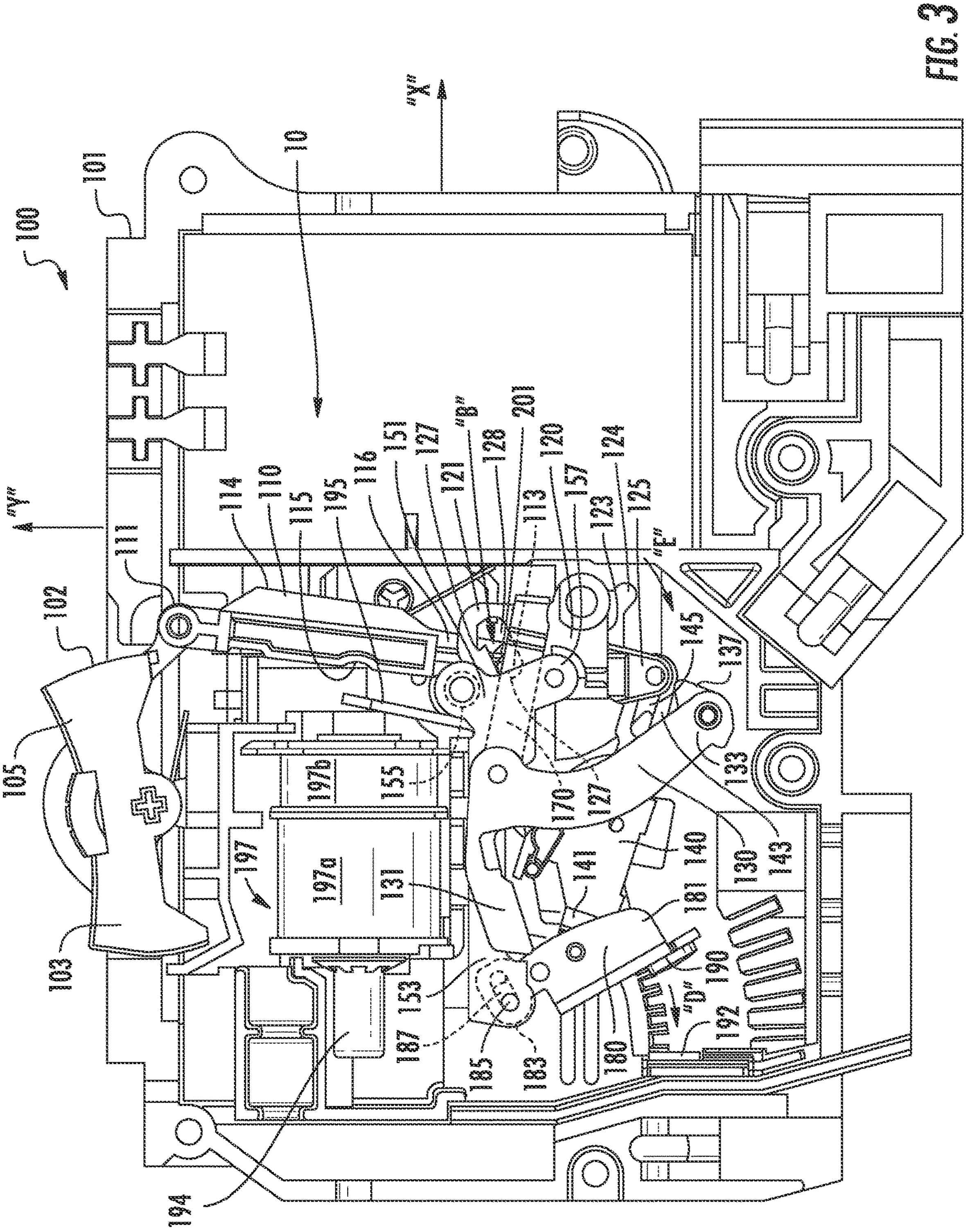
FIG. 3 is a side view of the internal components of the circuit breaker of FIG. 1 when a reset lockout mechanism is activated.
Figure 3A:
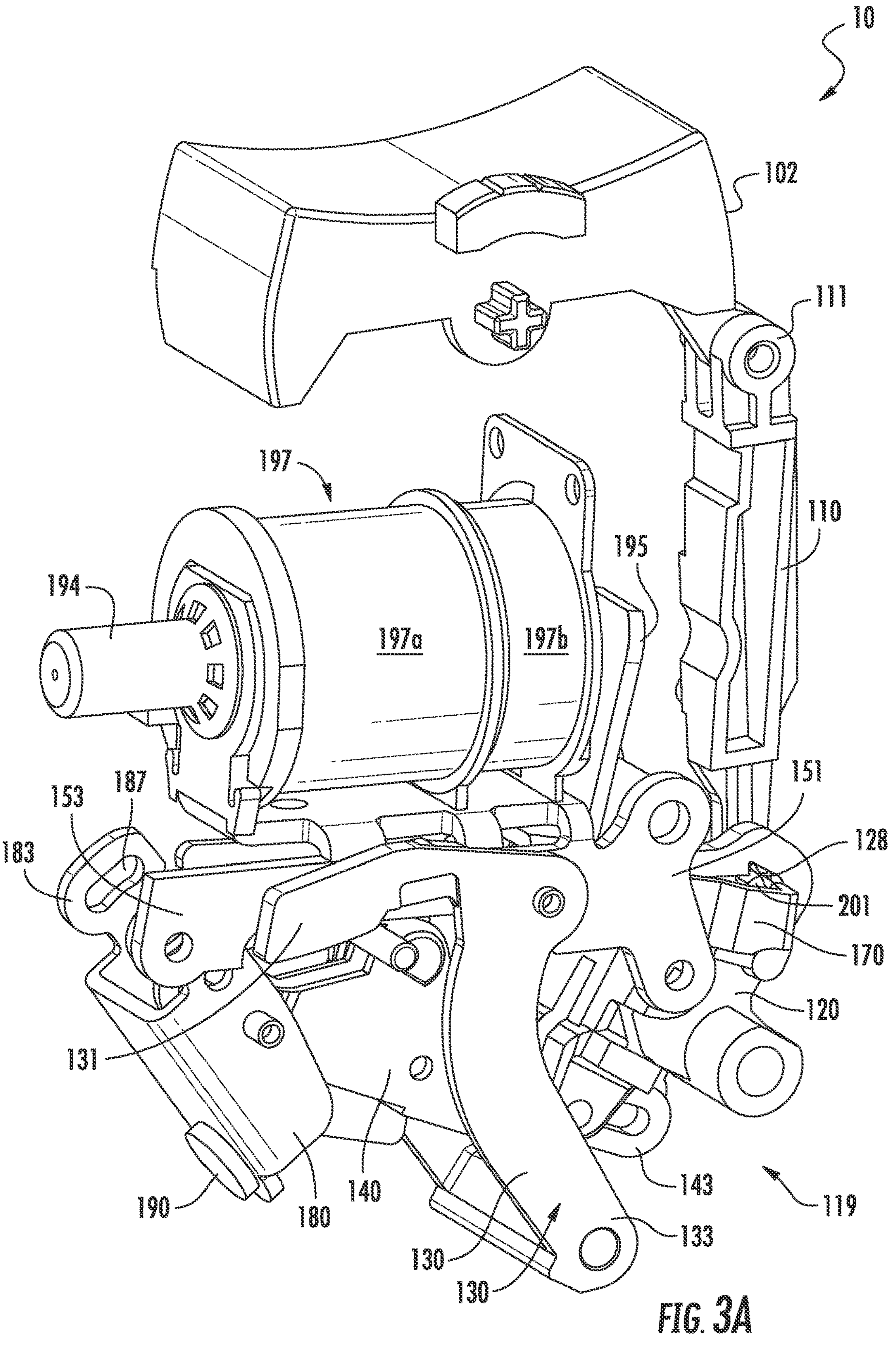
FIG. 3A is a perspective view of the internal components of the circuit breaker of FIG. 1 illustrating a linkage mechanism mechanically connected to a rocker actuator via a latch arm.

The reset lockout mechanism 10 generally includes a rocker actuator 102, a latch arm 110, and a linkage mechanism 119 (see FIG. 3A). The rocker actuator 102 of the reset lockout mechanism 10 is disposed partially within the housing 101 of the circuit breaker 100 and in may transition between an OFF position corresponding to an OFF configuration of the circuit breaker 100. When in the OFF configuration, a line phase terminal "LINE-P" and line neutral terminal "LINE-N" are not in electrical communication with a load phase terminal "LOAD-P" and a load neutral terminal "LOAD-N". For purposes of clarity, unless explicitly stated, the line phase terminal "LINE-P" and line neutral terminal "LINE-N" will collectively be referred to as a line terminal "LINE-T", and similarly the load phase terminal "LOAD-P" and load neutral terminal "LOAD-N" will collectively be referred to as a load terminal "LOAD-T". Thus, when in the OFF configuration, the line terminal "LINE-T" and the load terminal "LOAD-T" are prevented from an electric current therebetween. Alternatively, when in an ON configuration (see FIG. 7), the line and load terminals "LINE-T", "LOAD-T" are mechanically coupled via electrically conductive components, permitting transmission of electrical power therebetween.

The rocker actuator 102 partially extends outward through housing 101 of the circuit breaker 100, and has a first side 103 and a second side 105. The first side 103 is associated with an OFF state of the rocker actuator 102, and more generally, an OFF or TRIP configuration of the circuit breaker 100. The second side 105 is associated with an ON state of the rocker actuator 102, and more generally, an ON configuration of the circuit breaker 100. The second side 105 of the rocker actuator 102 is configured to mechanically engage a latch arm 110.

When the circuit breaker 100 is in the OFF state, the first and second contacts 190, 192 are in an OPEN configuration (i.e., not physically touching). Additionally, the reset lockout mechanism 10 is activated and prevents reestablishment of a conductive path between the line terminal "LINE-T" and the load terminal "LOAD-T". When the reset lockout mechanism 10 is in the ACTIVATED configuration, the circuit breaker 100 may be in either the OFF, TRIP or MID-TRIP configuration. More particularly, when the reset lockout mechanism 10 is activated the circuit breaker 100 is prevented from returning to the ON state until a controller "C" (FIG. 7D) determines that the components of the circuit interrupting portion, including a solenoid 197 having a first portion 197*a* and a second portion 197*b*, are operational.

The first portion 197*a* of the solenoid 197 is associated with overcurrent conditions and generates a magnetic field when the current passing through the solenoid 197 is beyond a predetermined threshold. The second portion 197*b* of the solenoid 197 is configured to receive control signals from the controller "C" to selectively generate a magnetic field sufficient to draw the armature 195 toward the solenoid 197. The second contact 192 is adjacent, and in electrical communication with, the line terminal "LINE-T", which is connected to a plate 255 (FIGS. 3F, 9A).

To clear the reset lockout mechanism before returning the circuit breaker 100 to the ON configuration, and to verify that the circuit interrupting portion is operational (i.e., that the solenoid 197 and/or an armature 195 are functioning), electrical power needs to be available to a control circuit or controller "C" (FIG. 7D) of the circuit breaker 100. This is achieved by supplying power to the controller "C" from the line terminal "LINE-T". Power is supplied to the controller "C" from the line side by a DC power supply circuit including a bridge rectifier "R" (FIG. 7A) as well as various other electronic components known to those skilled in the art (see FIGS. 7A-7D). The DC power supply circuit (see FIG. 7A) outputs a DC voltage to the GFI POWER and GFCI POWER outputs with respect to a circuit ground (e.g. a common). Note that the illustrated grounds located throughout the illustrated circuitry of FIGS. 7A-7D do not necessarily need to be the same as the ground of the AC power source.

Additional circuit protection components may be included as well including, without limitation, metal oxide varistors (MOVs) and fuses. By powering the controller "C" with power supplied by the line terminal "LINE-T", the circuit interrupting portion, including the solenoid 197 and components associated with the solenoid 197, may be tested (since power is available via a controller power supply "C-P") prior to resetting the circuit breaker 100 (e.g., prior to engaging the reset lockout mechanism to allow the circuit breaker 100 to return to the ON configuration). As a result, the load terminal "LOAD-T", as well as components of the circuit breaker 100 coupled to the load side contact 250, do not receive electrical power during testing of the circuit interrupting portion.

Figure 2:
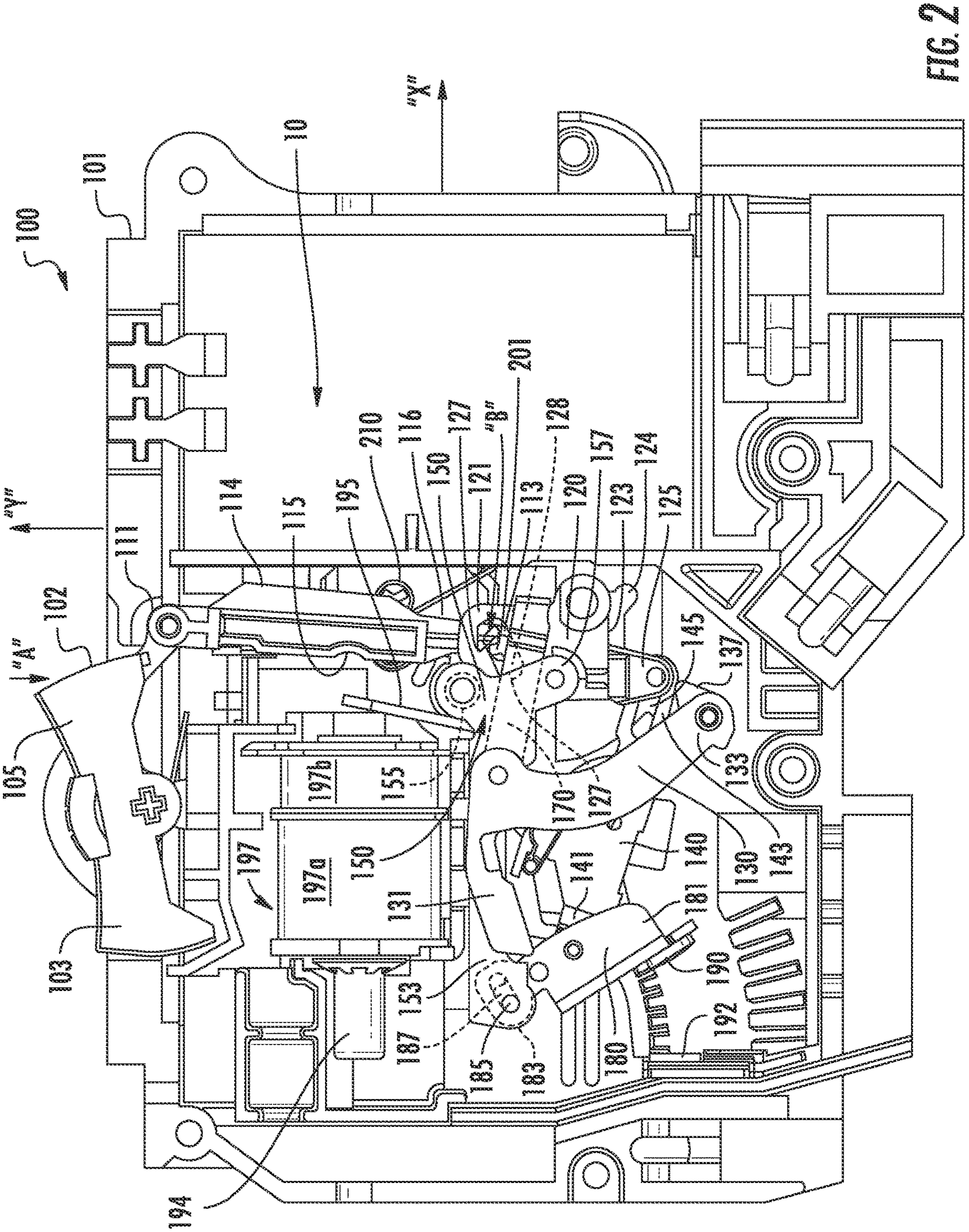
FIG. 2 is a side plan view of the internal components of the circuit breaker of FIG. 1 in an ON state.

The latch arm 110 includes a link portion 111, a first latch arm section 114, a second latch arm section 116, and a latch portion 113. The latch arm 110 is a substantially linear structure. The link portion 111 of the latch arm 110 is coupled to and mechanically engaged by the second side 105 of the rocker actuator 102. The latch portion 113 includes two opposing projections 201 (FIGS. 2 and 3). It is contemplated that the latch portion 113 may include only one projection 201 or more than two projections 201.

A first linkage 120 of a linkage mechanism 119 mechanically cooperates with the latch arm 110. The first linkage 120 includes a proximal linkage member 121 and a distal linkage member 123 (see FIG. 3F). The proximal linkage member 121 defines two spaced apart portions, each having a slot 128. Slots 128 are in mirrored relation and define asymmetrical openings therethrough. Each slot 128 further defines at least one toothed edge 127. As illustrated in FIGS. 1 and 3F, the slots 128 define two toothed edges 127. The slots 128 may be formed as elongate slots with toothed edges 127 on opposed ends thereof. The slots 128 are configured to receive the projections 201 extend from the latch portion 113 of latch arm 110 at least partially therein. The distal linkage member 123 includes an extension portion 125. The extension portion 125 may define a substantially round portion. The distal linkage member 123 also includes a rounded tip 124 in opposed relation to the extension portion 125. The extension portion 125 has a first size and the rounded tip 124 has a second size, the first size being greater than the second size.

A second linkage 130 of the linkage mechanism 119 mechanically cooperates with a fourth linkage 150 of the linkage mechanism 119. The second linkage 130 has a first linkage portion 131 and a second linkage portion 133. The second linkage 130 has a substantially inverted L-shape. The second linkage portion 133 further includes a tip portion 137. Tip portion 137 is configured to contact rounded tip 124 of the first linkage 120 when the circuit breaker 100 is in a mid-trip state, as described below with reference to FIG. 9.

Figure 14A:
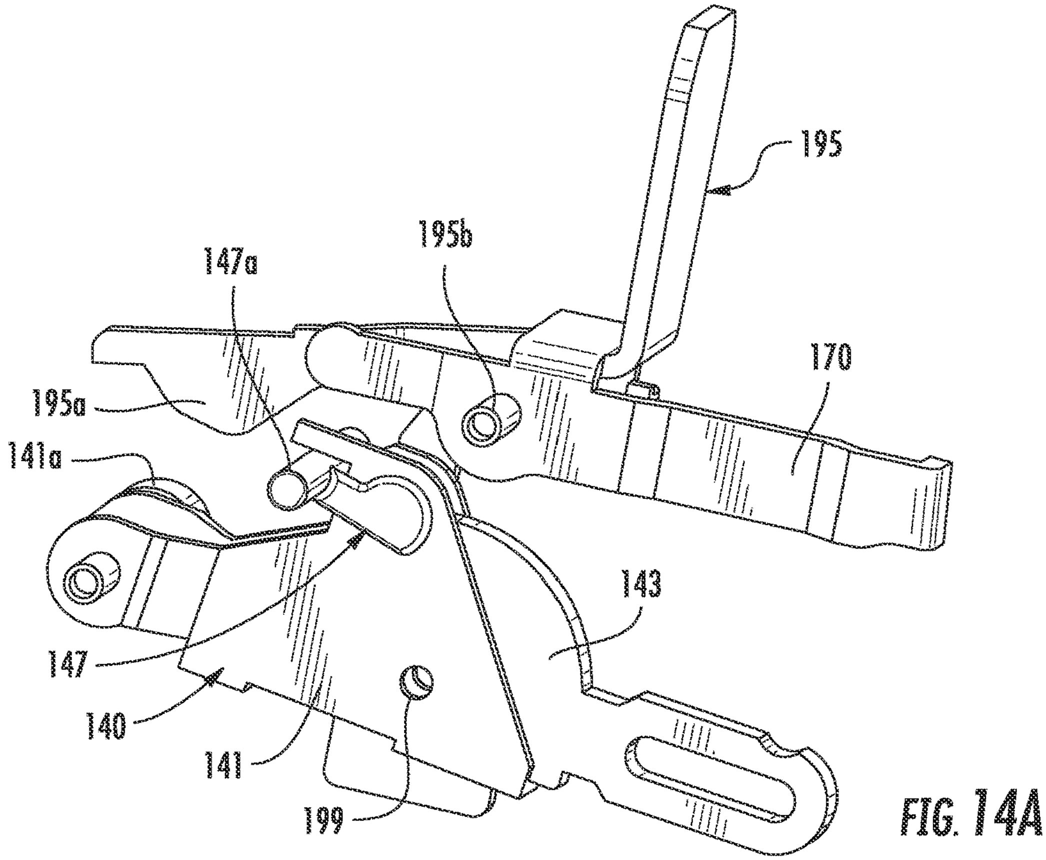
FIG. 14A is a front perspective view of the armature of FIG. 3J coupled to the third linkage of the linkage mechanism.

A third linkage 140 of the linkage mechanism 119 (see FIG. 3F) mechanically cooperates with the first linkage 120. The third linkage 140 includes a first linkage portion 141, a second linkage portion 143, and a release member 147 (FIGS. 3E and 14A). The second linkage portion 143 defines a slot 145. The slot 145 is an elongate slot is operably coupled to the extension portion 125 of the first linkage 120 via a pin therethrough (not explicitly shown). The pin slidably travels along the slot 145. The slot 145 does not include any toothed edges as opposed to the slots 128 of the first linkage 120. When the first linkage 120 is operably coupled by the pin to the third linkage 140, the first linkage 120 is configured to actuate the third linkage 140. As illustrated in FIG. 1, when the linkage mechanism 119 is assembled the second linkage 130 is configured to partially surround the third linkage 140. The first linkage portion 141 of the third linkage 140 is pivotally connected to a support structure 180.

With continued reference to FIG. 1, support structure 180 includes a contact support section 181 and a pivot support section 183. The pivot support section 183 has an outer perimeter, a portion of which is substantially oval-shaped. The pivot support section 183 further defines a slot 187 therethrough for receiving a pivot pin 185. The slot 187 is a substantially elongate slot with no toothed edges, as opposed to the slots 128 of the first linkage 120. The support structure 180 includes a first contact 190 configured to mechanically couple with a second contact 192 attached to a housing portion 107 of housing 101. When the first contact 190 and the second contact 192 are mechanically coupled, electrical power may conduct therebetween. As shown in FIG. 1, when the rocker actuator 102 is in the OFF state (which corresponds to the OFF configuration of the circuit breaker 100), the first and second contacts 190, 192 are not mechanically coupled. The pivot support section 183 of the support structure 180 mechanically cooperates with a fourth linkage 150 via the pivot pin 185.

The fourth linkage 150 of the linkage mechanism 119 has a proximal end 151 and a distal end 153. The distal end 153 includes a first linkage portion 155 and a second linkage portion 157. A part of the first linkage portion 155 has a substantially round shape and a part of the second linkage portion 157 also has a substantially round shape. The first linkage portion 155 has an opening 154 and the second linkage portion 157 has an opening 156. The fourth linkage 150 is substantially parallel to the axis "X" defined by the housing 101 of the circuit breaker 100.

Figure 14B:
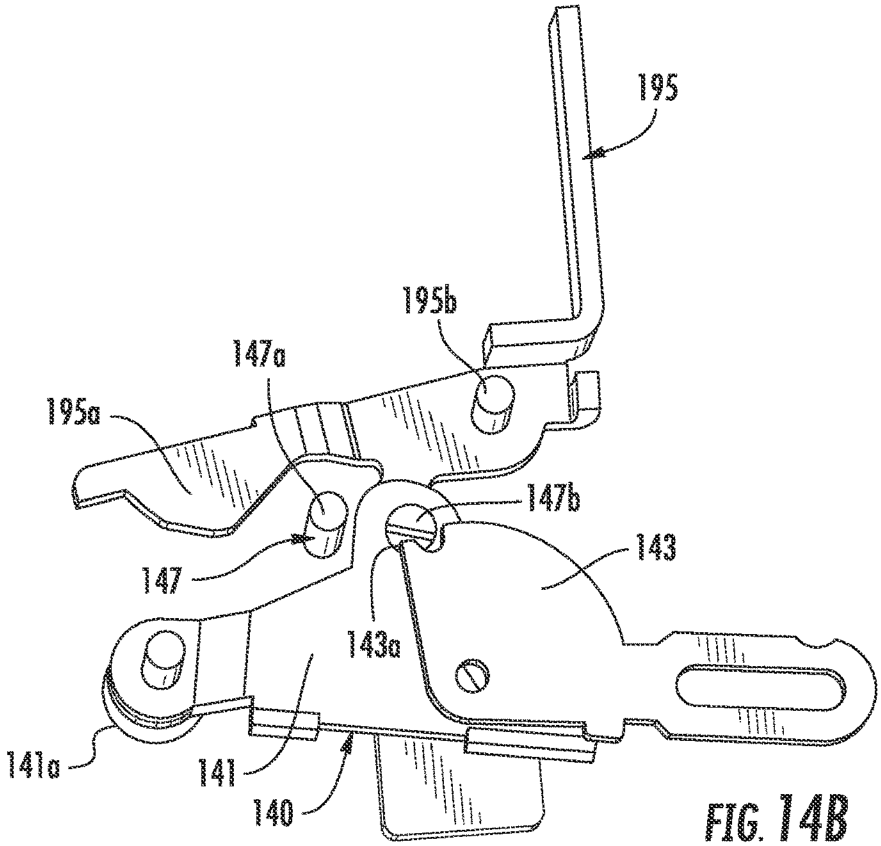
FIG. 14B is a front perspective view, with parts removed, of the armature coupled to the third linkage of the linkage mechanism.
Figure 14C:
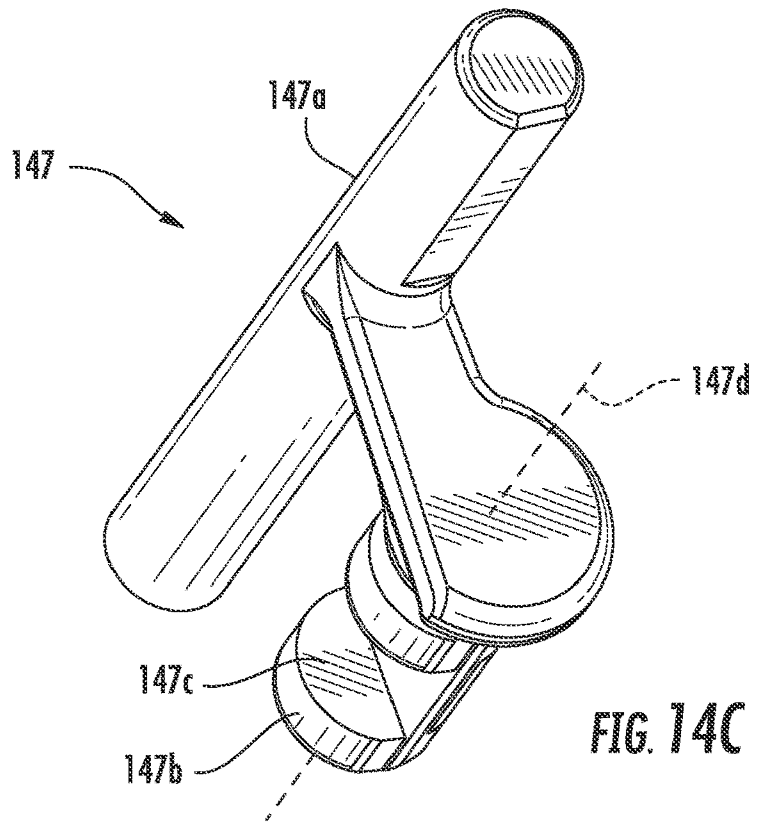
FIG. 14C is a perspective view of a release member of the third linkage of FIG. 14A.
Figure 14D:
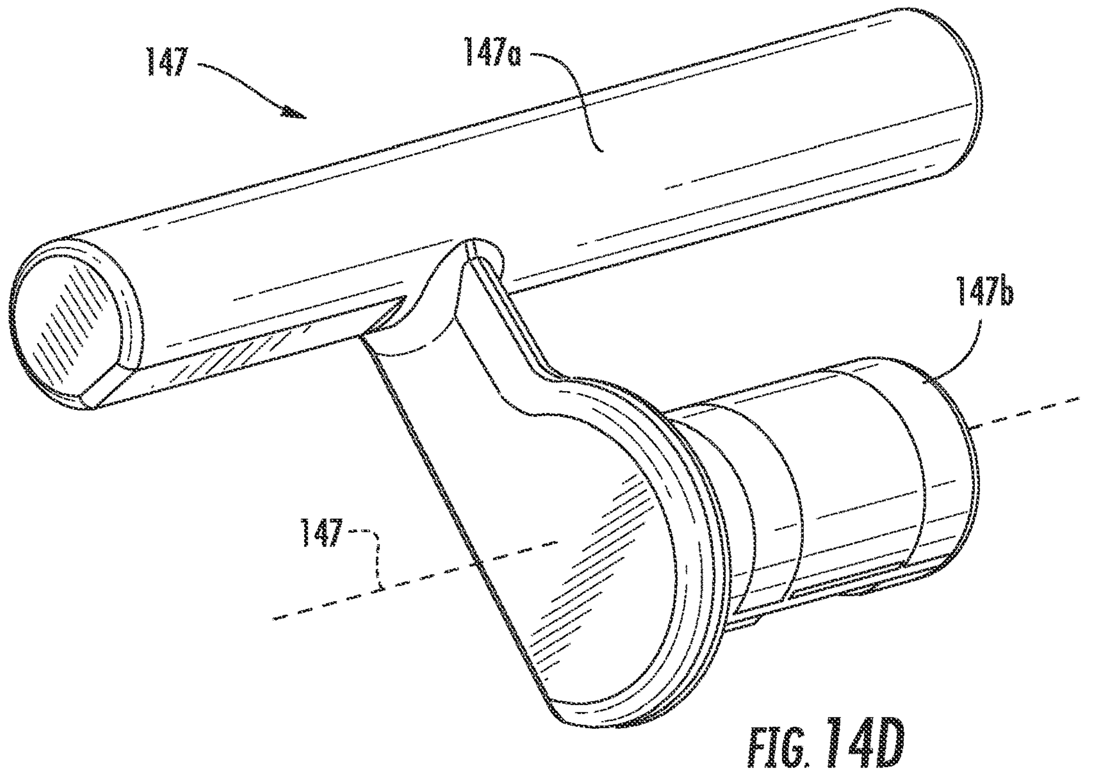
FIG. 14D is another perspective view of the release member of FIG. 14C.
Figure 14E:
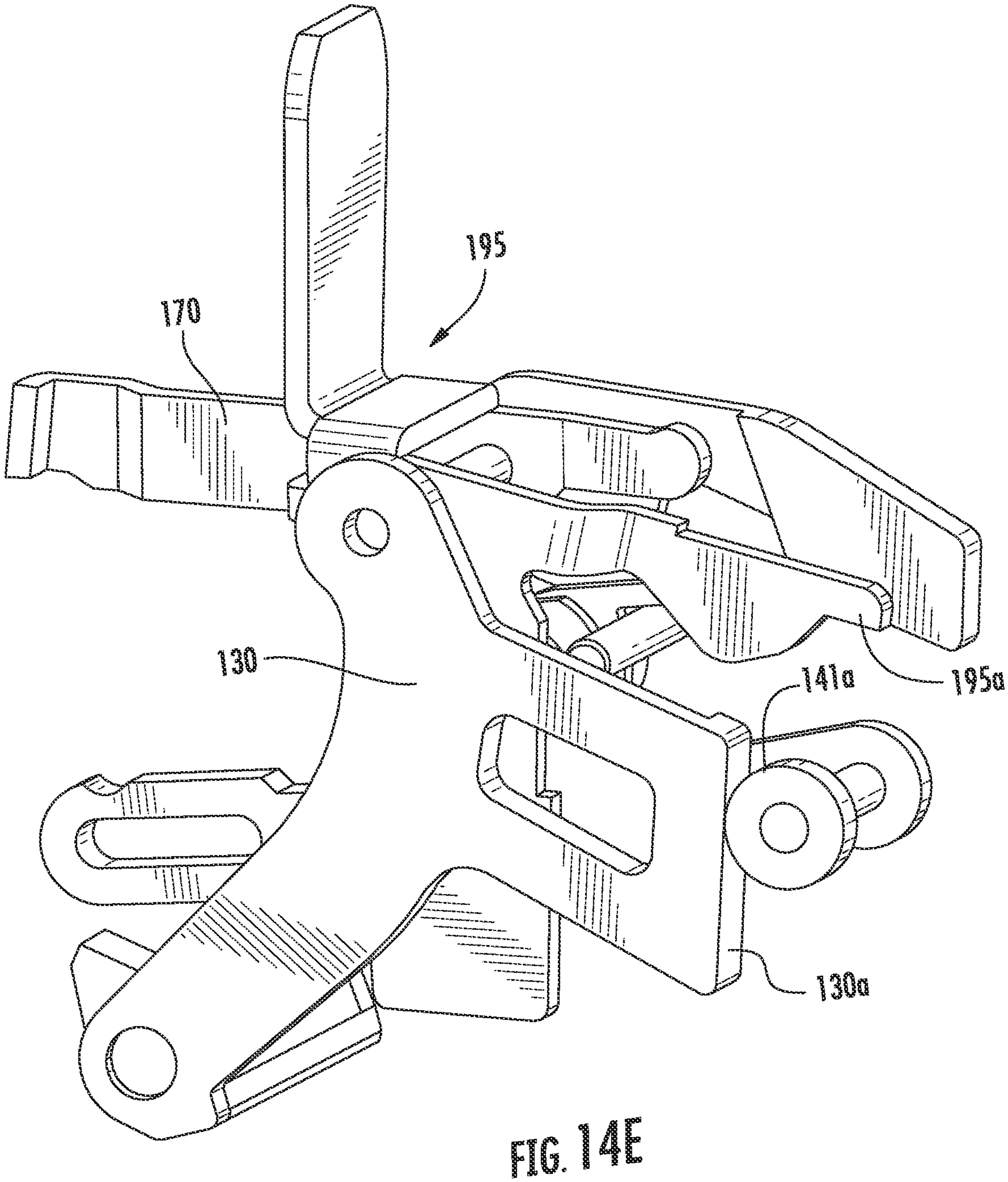
FIG. 14E is a rear perspective view of the armature coupled to the third linkage of the linkage mechanism

An armature 195 is rotatably coupled to the fourth linkage 150 such that the armature 195 moves relative to a solenoid 197. A plunger 194 extends through the solenoid 197 and partially outward relative to the solenoid 197. In the present embodiment, the plunger 194 is in fixed relation to the housing. When the solenoid 197 receives an overcurrent which does not immediately cause the solenoid 197 to create a magnetic field and draw the armature 195 toward the solenoid 197, internal components (not explicitly shown) of the plunger 194 are drawn into the solenoid 197. When the overcurrent exceeds a certain threshold or exists for a certain period of time, the plunger 194 engages with the solenoid 197, thereby causing the solenoid 197 to generate a magnetic field, thereby drawing the armature 195 toward the solenoid 197. When the rocker actuator 102 is in the OFF state (FIG. 1), the armature 195 is not in contact with the solenoid 197, causing the first and second contacts 190, 192 to remain in an open configuration (i.e., do not touch each other). The armature 195 further includes an extension 170 and a projection 195*a* (see FIGS. 4C and 14B). The extension 170 extends beyond the distal end 153 of the fourth linkage 150. The extension 170 has several bends and is generally hook shaped. The projection 195*a* facilitates tripping of the circuit breaker 100 as will be discussed further below.

Referring now to FIGS. 2-6, the reset lockout mechanism 10 is configured to transition generally between an ACTIVATED configuration and a DEACTIVATED configuration. Further, in the ACTIVATED configuration, the circuit breaker 100 may exist in either the TRIP configuration or the MID-TRIP configuration. The first and second contacts 190, 192 remain in the OPEN configuration (i.e., not touching each other) when reset lockout mechanism 10 is in the ACTIVATED configuration. Likewise, when the reset lockout mechanism 10 is in the ACTIVATED configuration (the circuit breaker 100 is either in the TRIP or MID-TRIP configuration) the circuit breaker 100 cannot be reset, i.e., the conductive path cannot be closed, unless the circuit interrupting portion is operational. For a description of the possible configuration transitions of the circuit breaker 100, see FIG. 7E.

FIG. 2 illustrates a side plan view of the internal components of the circuit breaker 100 with the rocker actuator 102 transitioning toward a MID-TRIP or ON configuration. As shown in FIG. 2 the circuit breaker 100 is shown prior to the application of a force to the second side 105 of the rocker actuator 102 in a direction "A". The force exerted on the second side 105 of the rocker is applied by a user to activate the circuit breaker 100, either transitioning from an OFF, TRIP, or MID-TRIP configuration. The applied force causes the link portion 111 of the latch arm 110 to move such that the projections 201 of latch portion 113 of the latch arm 110 transfer the force downward to the first linkage 120. As the downward force is applied to the first linkage 120, the projections 201 travel along the slots 128 of the first linkage 120. More particularly, the projections 201 move in a direction "B" (generally, leftward as shown in FIG. 2) along the slots 128. Thus, the projections 201 move from a rightmost position to a midpoint position along the slots 128. All the other mechanical components within the circuit breaker 100 remain in their initial position.

In FIG. 3, the force continues to be applied by the user to the second side 105 of the rocker actuator 102 in the direction "A" in order to activate the circuit breaker 100. The force applied to the second side 105 of the rocker actuator 102 causes the link portion 111 of the latch arm 110 to continue to move the projections 201 along the slots 128 in a direction "B". As a result, the projections 201 are caused to move from the midpoint position relative to the slots 128 to a leftmost position along the slots 128.

Figure 3B:
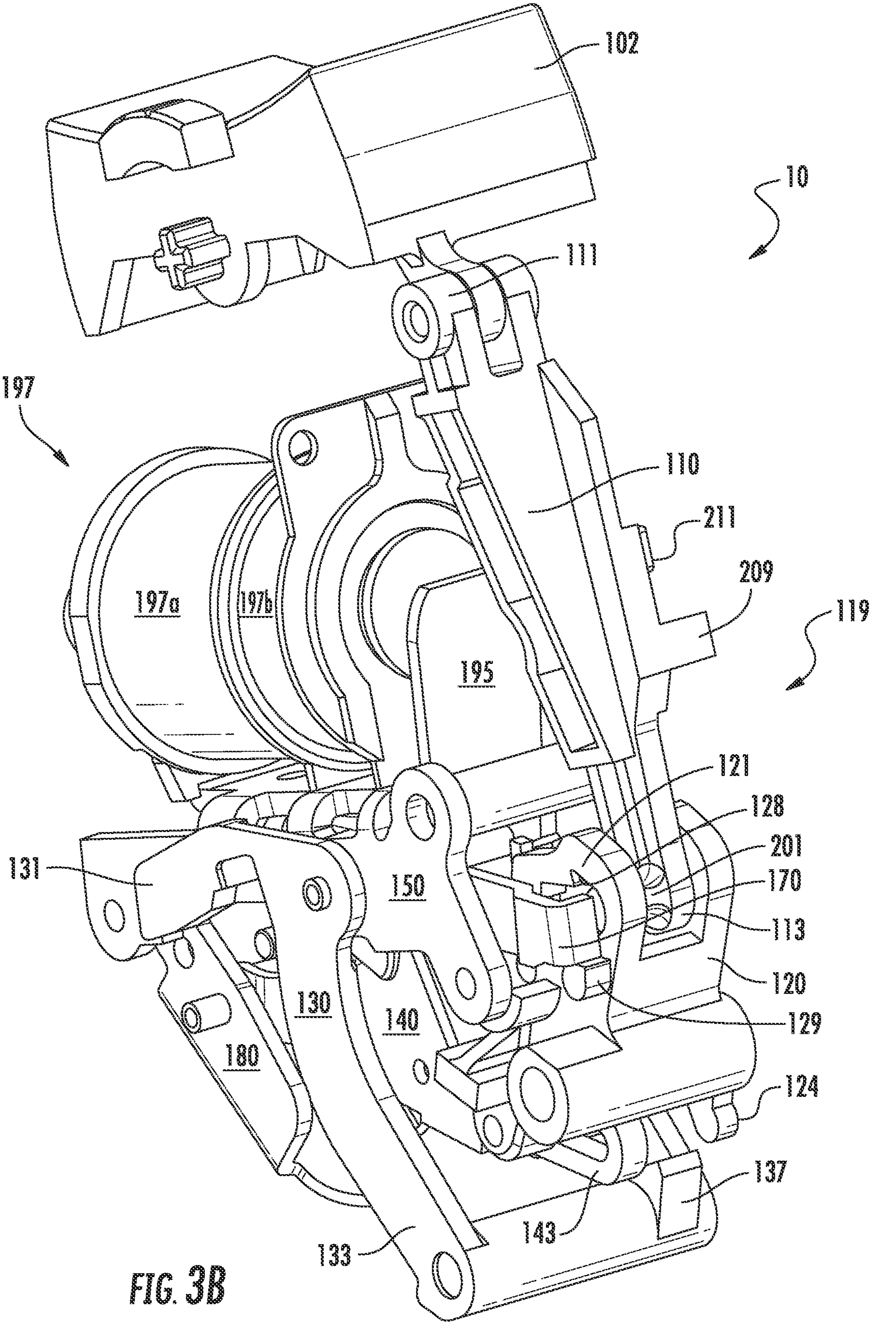
FIG. 3B is an alternate perspective view of the linkage mechanism of FIG. 3A mechanically connected to the rocker actuator via the latch arm.
Figure 3C:
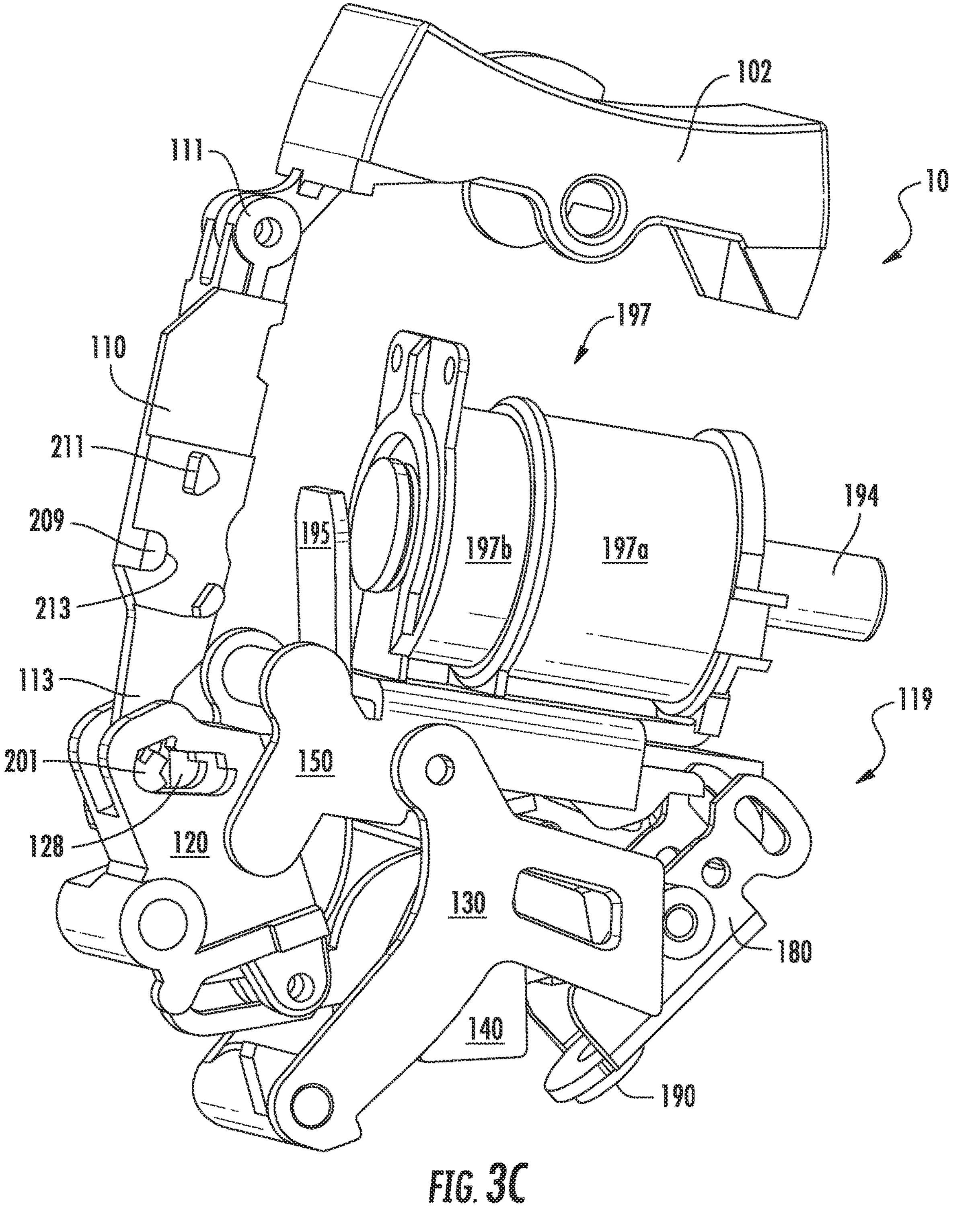
FIG. 3C is an alternate perspective view of the linkage mechanism mechanically connected to the rocker actuator via the latch arm.

FIGS. 3A-3C illustrate perspective views of the linkage mechanism 119 having first, second, third, and fourth linkages or members 120, 130, 140, 150 mechanically connected to the rocker actuator 102 via the latch arm 110, according to the disclosure.

Figure 3D:
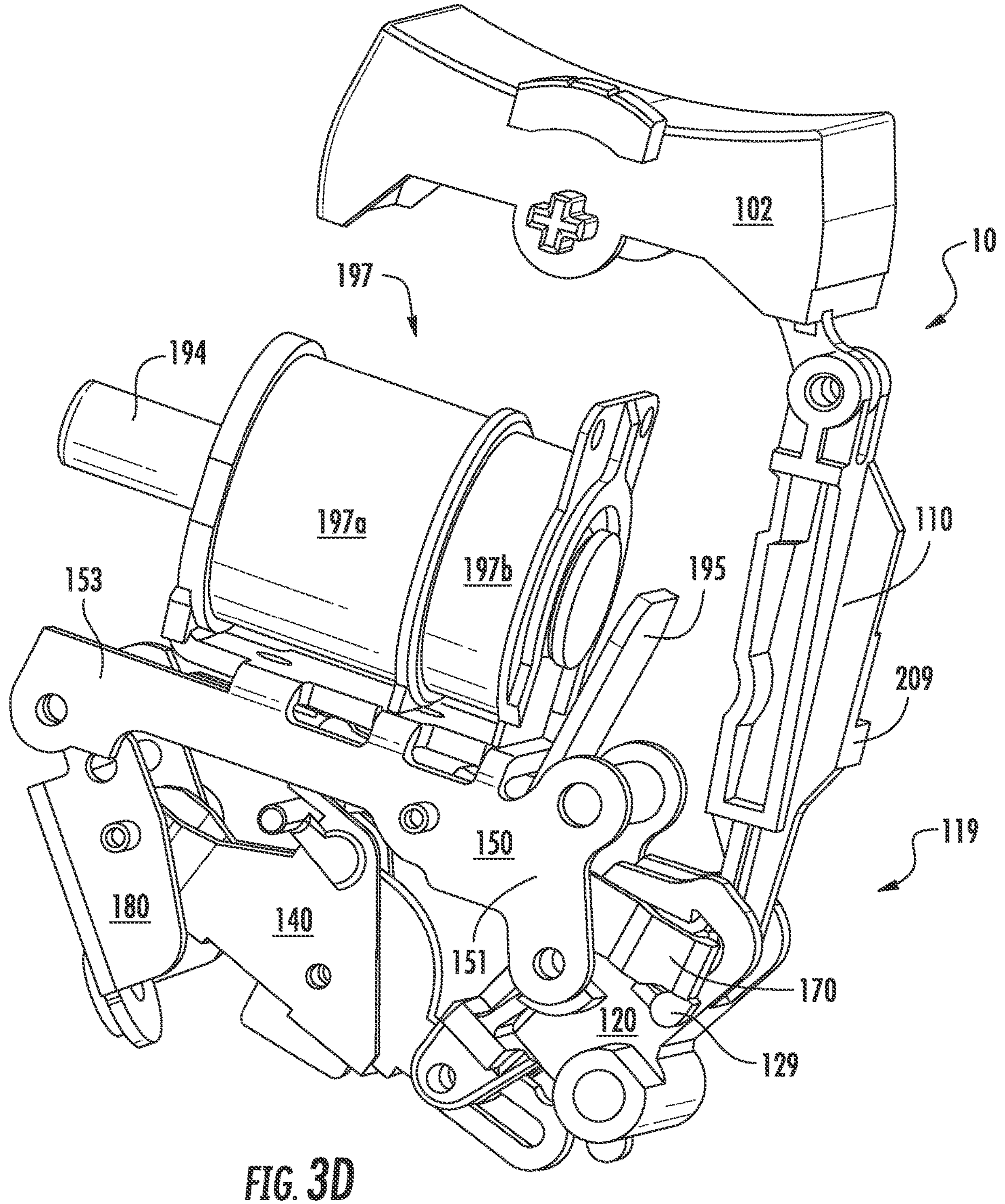
FIG. 3D is a perspective view of three linkages of the linkage mechanism mechanically connected to the rocker actuator via the latch arm.
Figure 3E:
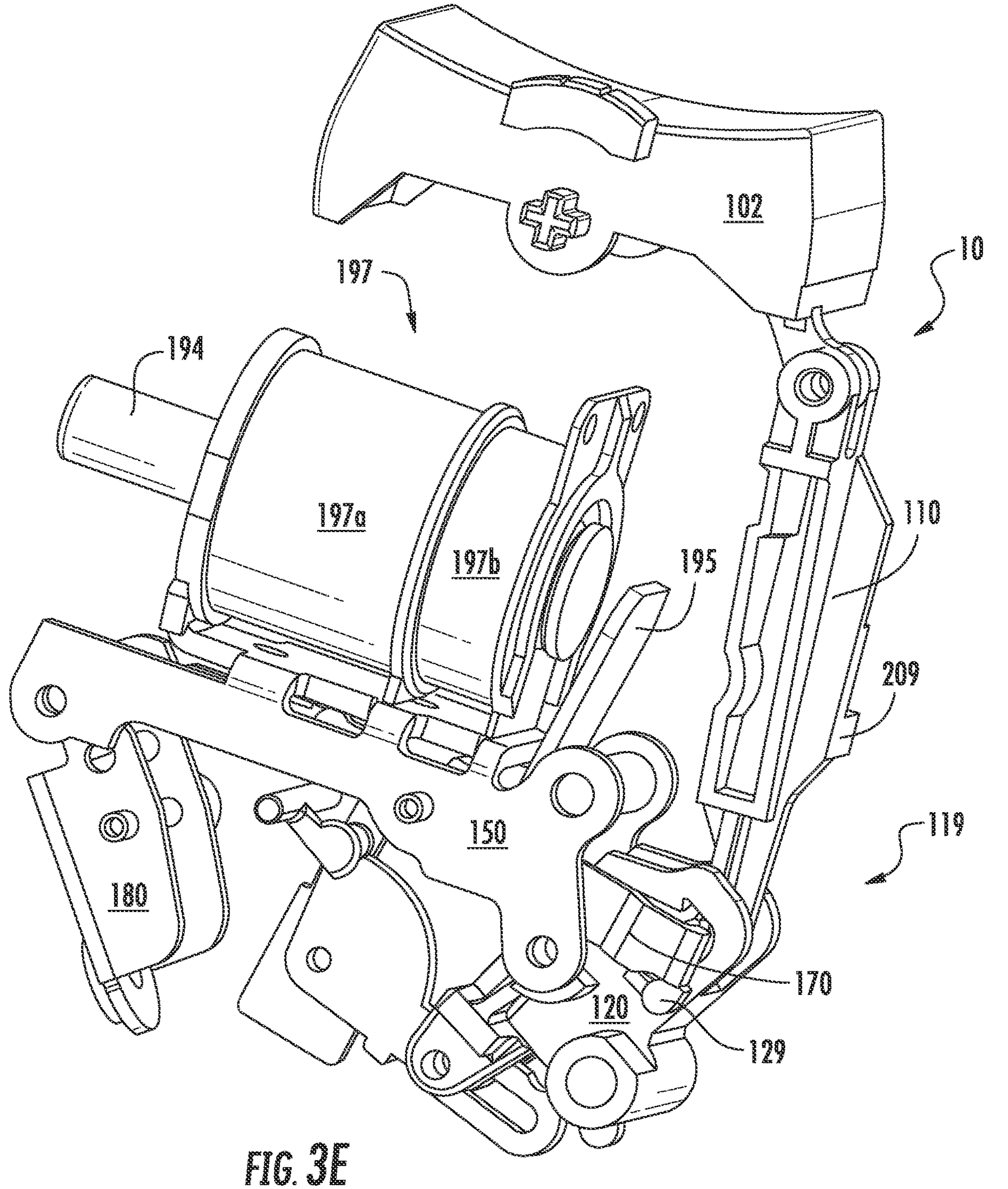
FIG. 3E is a perspective view of two linkages of the linkage mechanism mechanically connected to the rocker actuator via the latch arm.
Figure 3F:
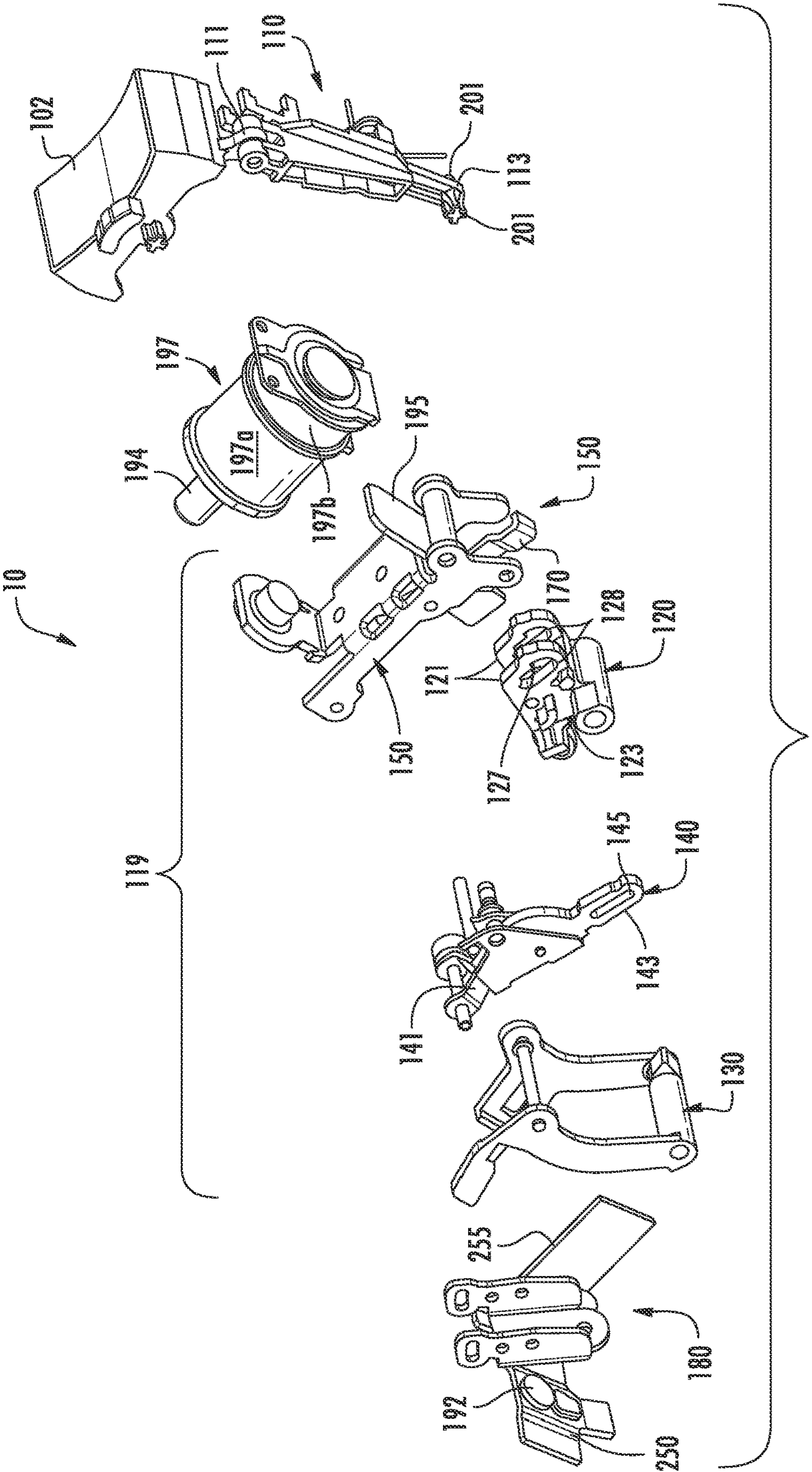
FIG. 3F is an exploded perspective view of the linkage mechanism, rocker actuator, and latch arm.

FIG. 3D illustrates a perspective view of the first, third, and fourth linkages 120, 140, 150 of the linkage mechanism 119 mechanically connected to the rocker actuator 102 via the latch arm 110. The second linkage 130 is removed to better illustrate the third linkage 140 and its connection to the first linkage 120, as well as its connection to the support structure 180.

FIG. 3E is a perspective view of the first and fourth linkages 120, 150 of the linkage mechanism 119 mechanically connected to the rocker actuator 102 via the latch arm 110, according to the disclosure. The second linkage 130 and the third linkage 140 are removed to better illustrate the fourth linkage 150 and its connection to the first linkage 120, as well as its connection to the support structure 180.

FIG. 3F is an exploded view of the linkage mechanism 119, rocker actuator 102, and latch arm 110, according to the disclosure.

Figure 3G:
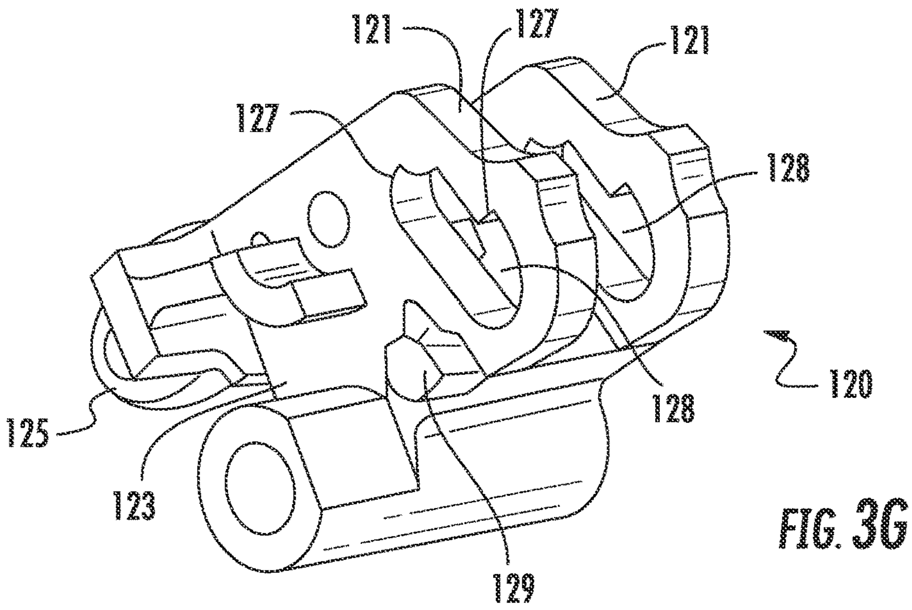
FIG. 3G is a perspective view of the first linkage of the linkage mechanism.
Figure 3H:
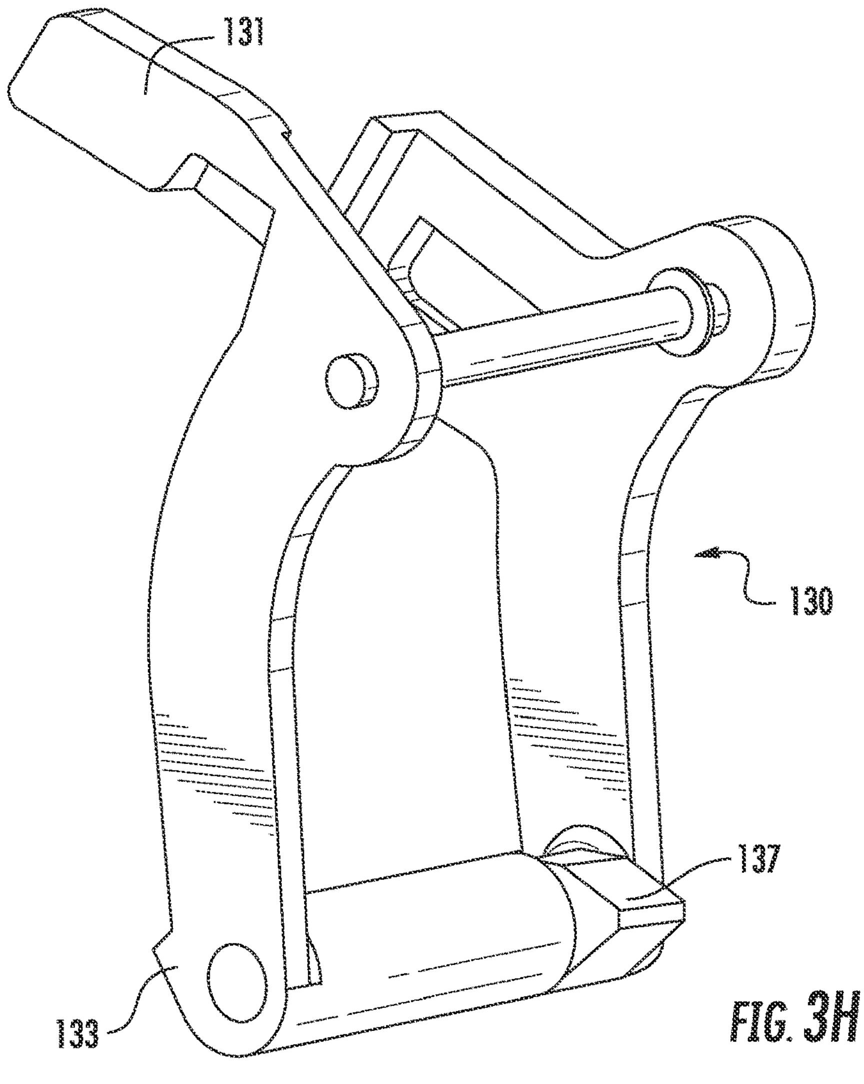
FIG. 3H is a perspective view of the second linkage of the linkage mechanism.

FIG. 3G is a perspective view of the first linkage 120 of the linkage mechanism 119, according to the disclosure, whereas FIG. 3H is a perspective view of the second linkage 130 of the linkage mechanism 119, according to the disclosure.

Figure 3I:
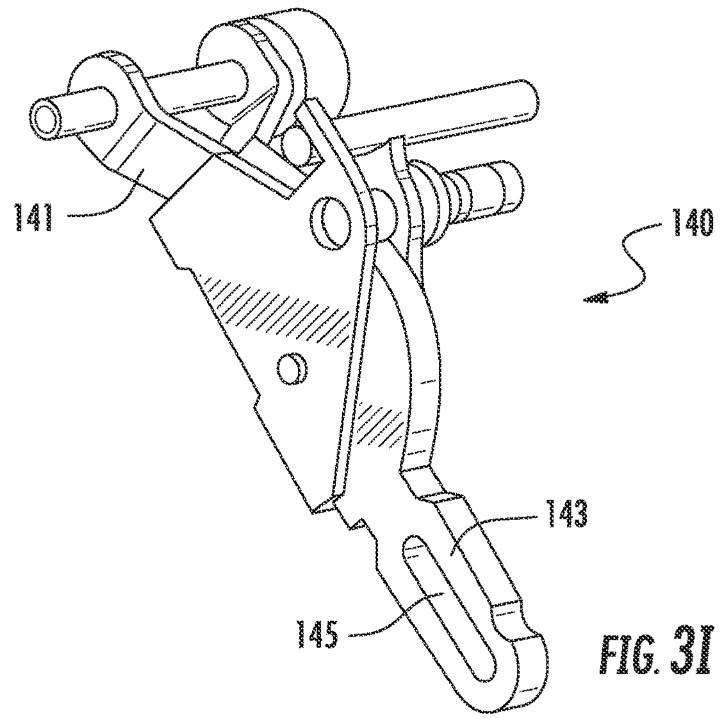
FIG. 3I is a perspective view of the third linkage of the linkage mechanism.
Figure 3J:
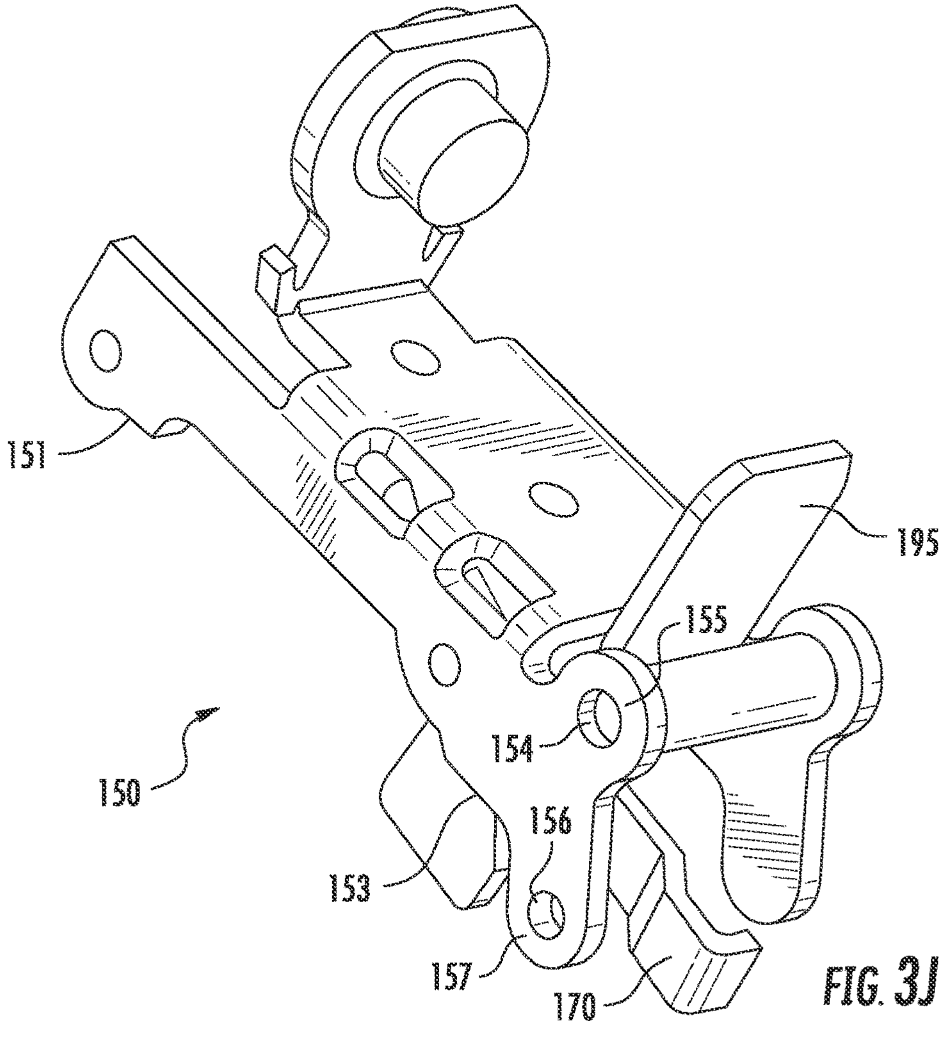
FIG. 3J is a perspective view of the fourth linkage of the linkage mechanism and an armature rotatably coupled to the fourth linkage.

FIG. 3I is a perspective view of the third linkage 140 of the linkage mechanism 119, according to the disclosure, whereas FIG. 3J is a perspective view of the fourth linkage 150 of the linkage mechanism 119, according to the disclosure.

Figure 4A:
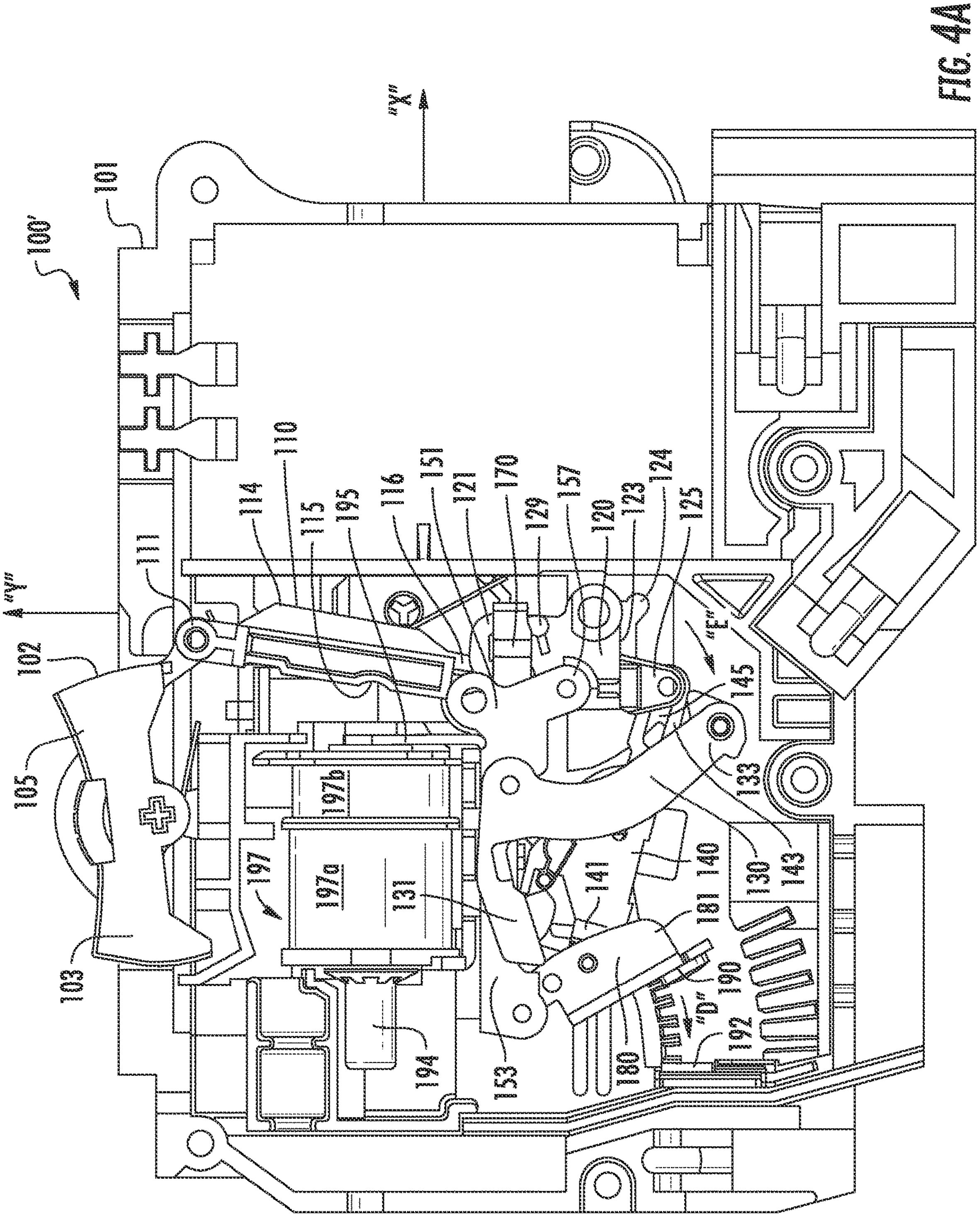
FIGS. 4A, 5A, and 5B are a sequence of side views of the internal components of the circuit breaker illustrating deactivation of the reset lockout mechanism.
Figure 4B:
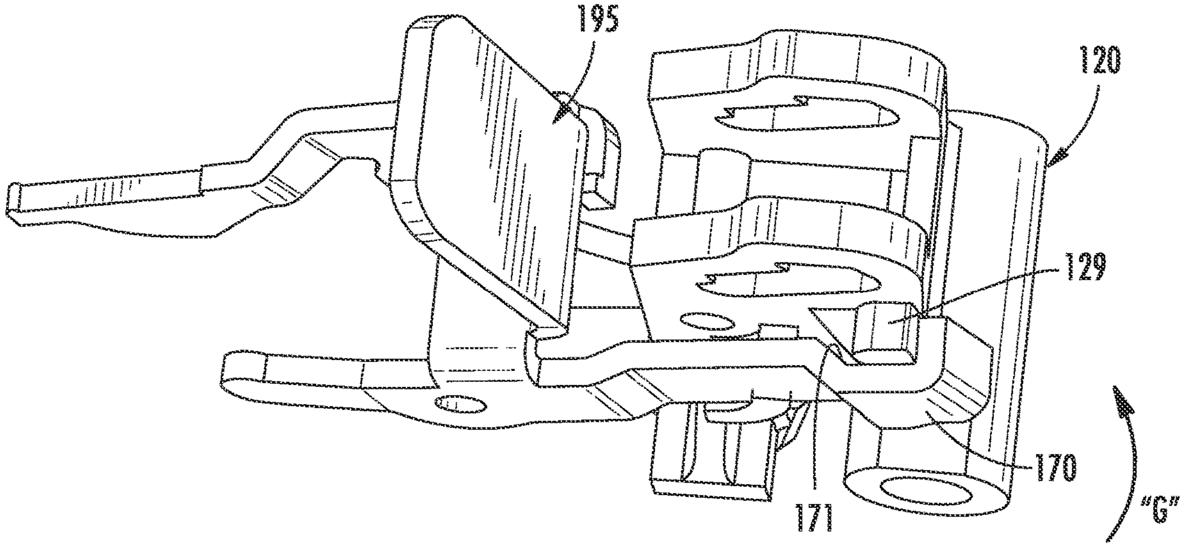
FIG. 4B is top perspective view of the armature of FIG. 3J in an interference fit with a boss of the first linkage.
Figure 4C:
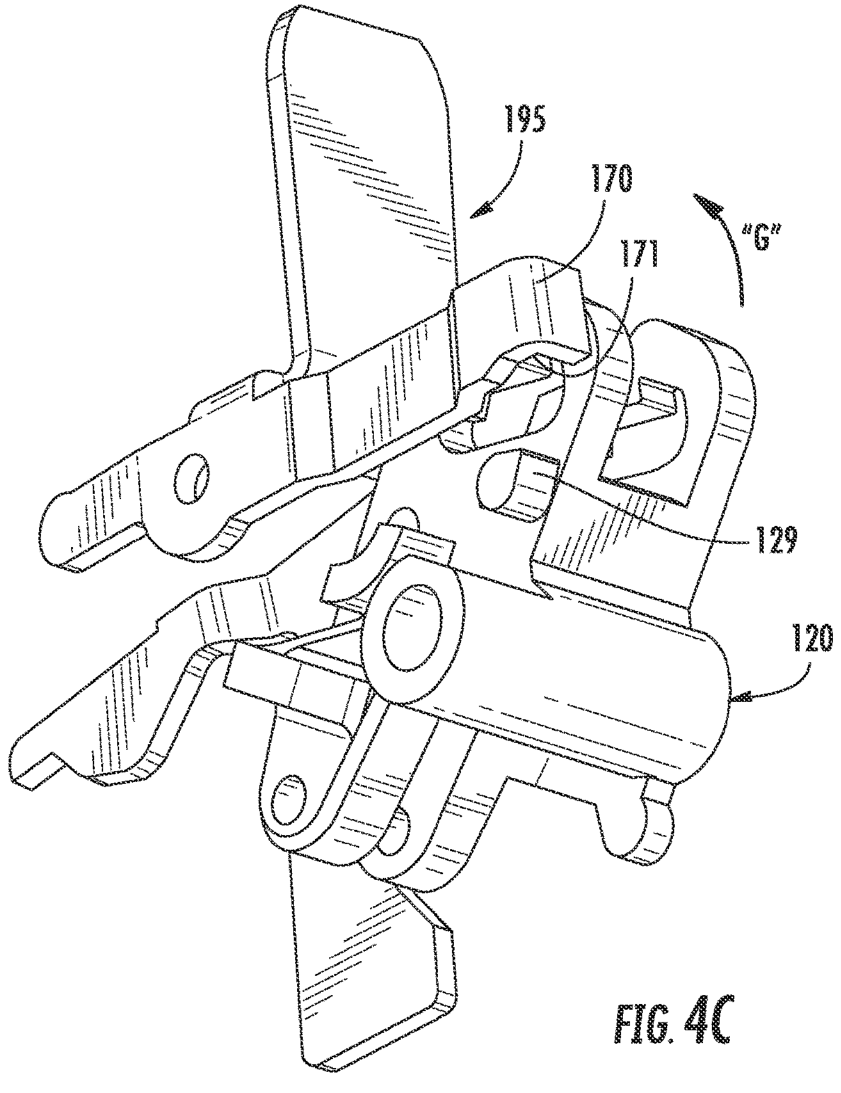
FIG. 4C is a perspective view of the armature of FIG. 3J moved out of the interference fit with the boss of the first linkage.
Figure 4D:
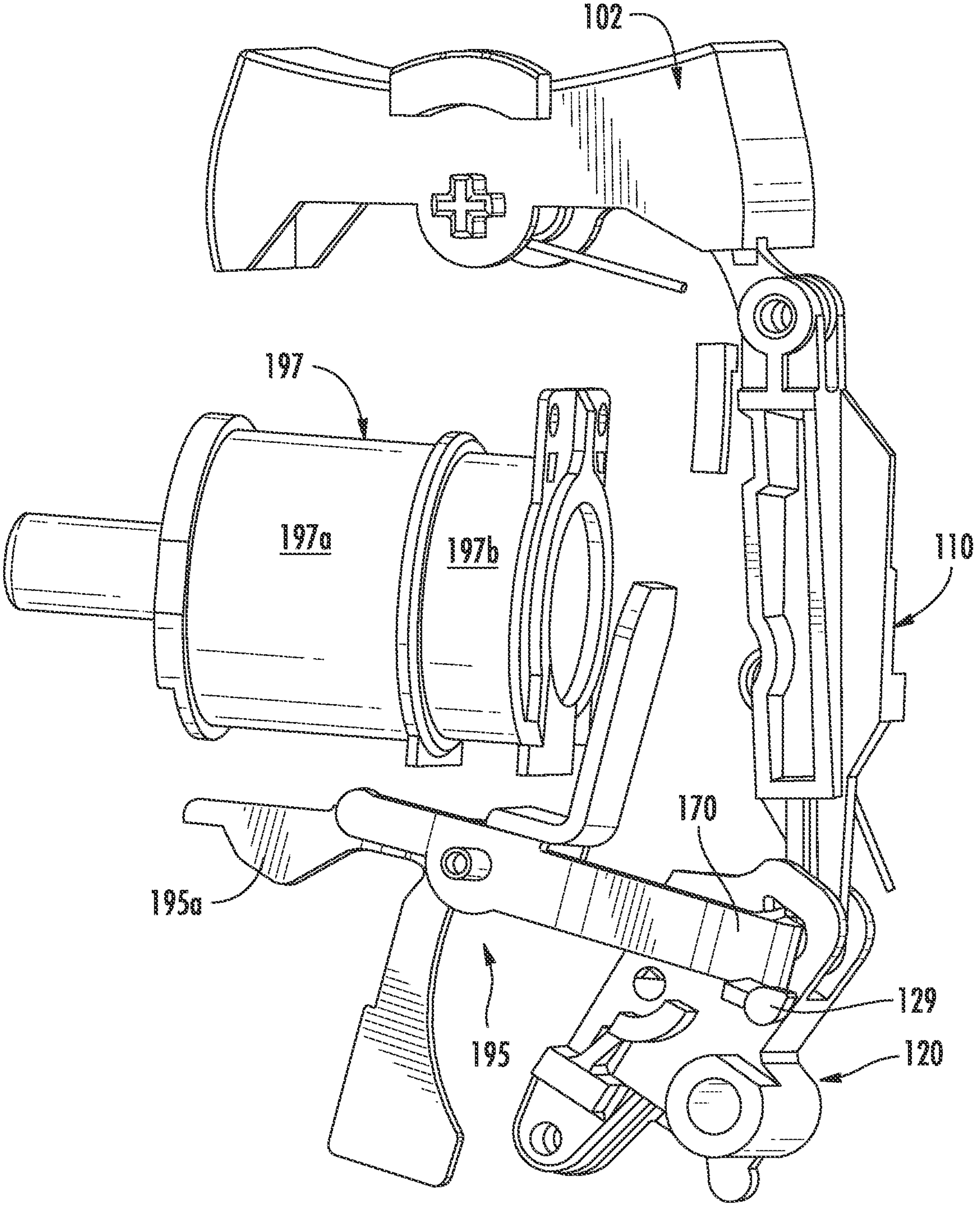
FIG. 4D is a perspective view, with parts removed, of the armature of FIG. 3J moved out of the interference fit with the linkage mechanism.
Figure 5A:
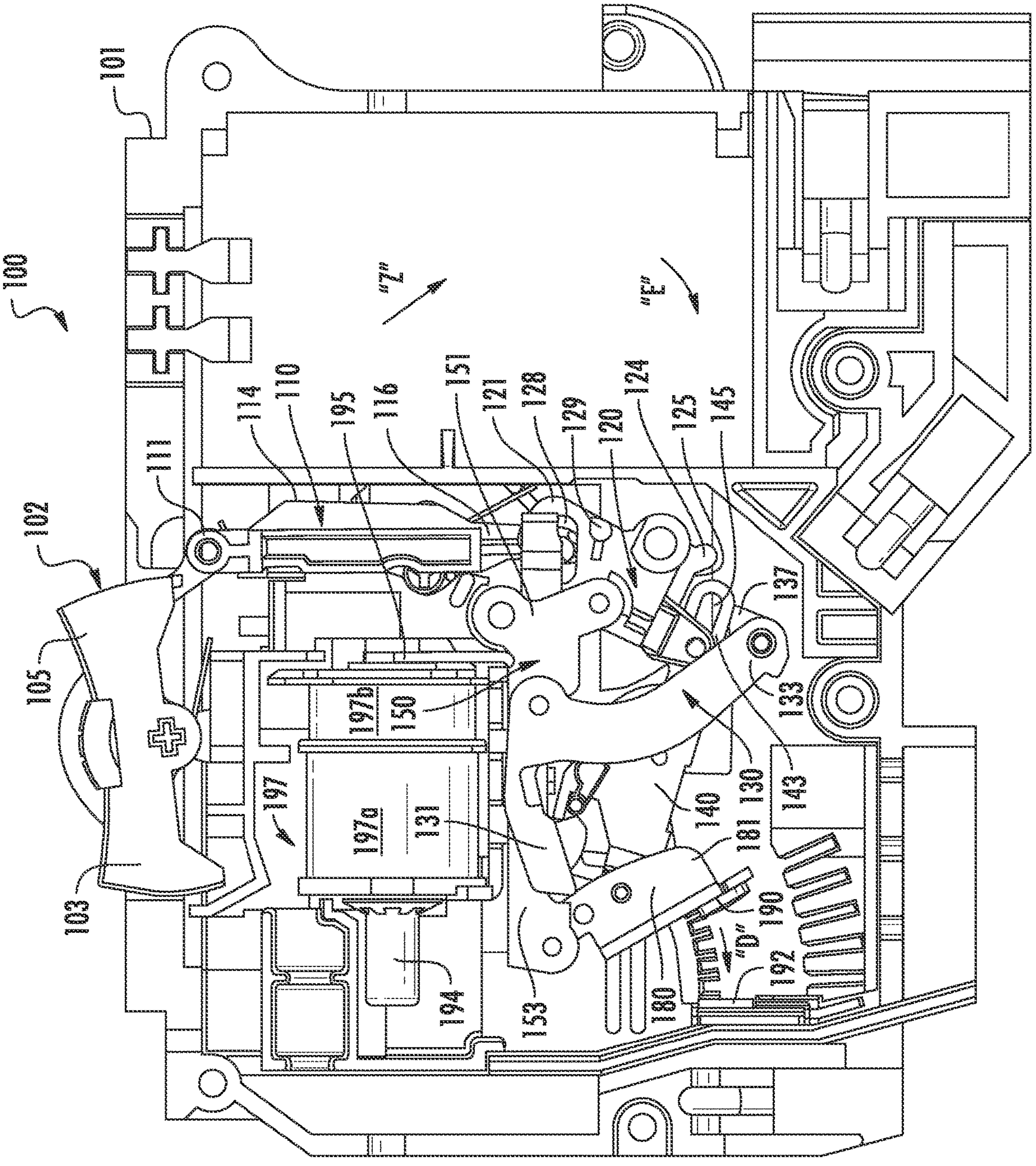

FIGS. 4A and 5A are front views of internal components of the circuit breaker 100 with the reset lockout mechanism 10 being deactivated (e.g., cleared) as a result of continued force being applied to the second side 105 of the rocker actuator 102 in a direction "A" in order to activate the circuit breaker 100.

As illustrated in FIGS. 4A-4D, once a test circuit 720 (FIG. 7C) is energized, a fault is simulated, and if the circuit breaker 100 is functioning properly, the solenoid 197 is energized. Once the solenoid 197 is energized, the armature 195 is drawn toward the solenoid 197 (FIG. 4). Energization of the test circuit 720 is discussed in greater detail below with respect to FIGS. 11-13. To draw the armature 195 toward the solenoid 197, a current is applied to the solenoid 197. The solenoid 197 includes a coil of wire which, as the electric current passes through, induces a magnetic field. The magnetic field magnetizes plunger 194 which, in turn, attracts armature 195 towards the solenoid 197 until armature 195 contacts the solenoid 197. When the armature 195 is attracted to the solenoid 197, the armature 195 is rotated counterclockwise within the circuit breaker 100 about a pin 195*b* and the extension 170 of armature 195 is rotated upward in a direction "G" toward the latch arm 110 away from a boss 129 of first linkage 120. Prior to energizing the solenoid 197, the boss 129 of first linkage 120 is captured in a cavity or pocket 171 defined in the generally hook shaped extension 170 of armature 195. When the boss 129 is captured by the pocket 171 of the first linkage 120 of the armature 195, the boss 129 is prevented by the first linkage 120 from rotating relative to extension 170 of armature 195. By rotating extension 170 upward in the direction "G" away from first linkage 120 (see FIGS. 4A and 4C), the interference between the extension 170 and the boss 129 of the first linkage 120 is cleared. With the interference cleared, the first linkage 120 is allowed to swivel or rotate in a direction "E" (FIG. 4A) as force is applied to the second side 105 of the rocker actuator 102 since boss 129 of first linkage 120 is no longer captured by extension 170 of armature 195. Upon such movement in a direction "E," the extension portion 125 of the first linkage 120 is rotated counterclockwise and moved leftward along the slot 145 of the third linkage.

Figure 5B:
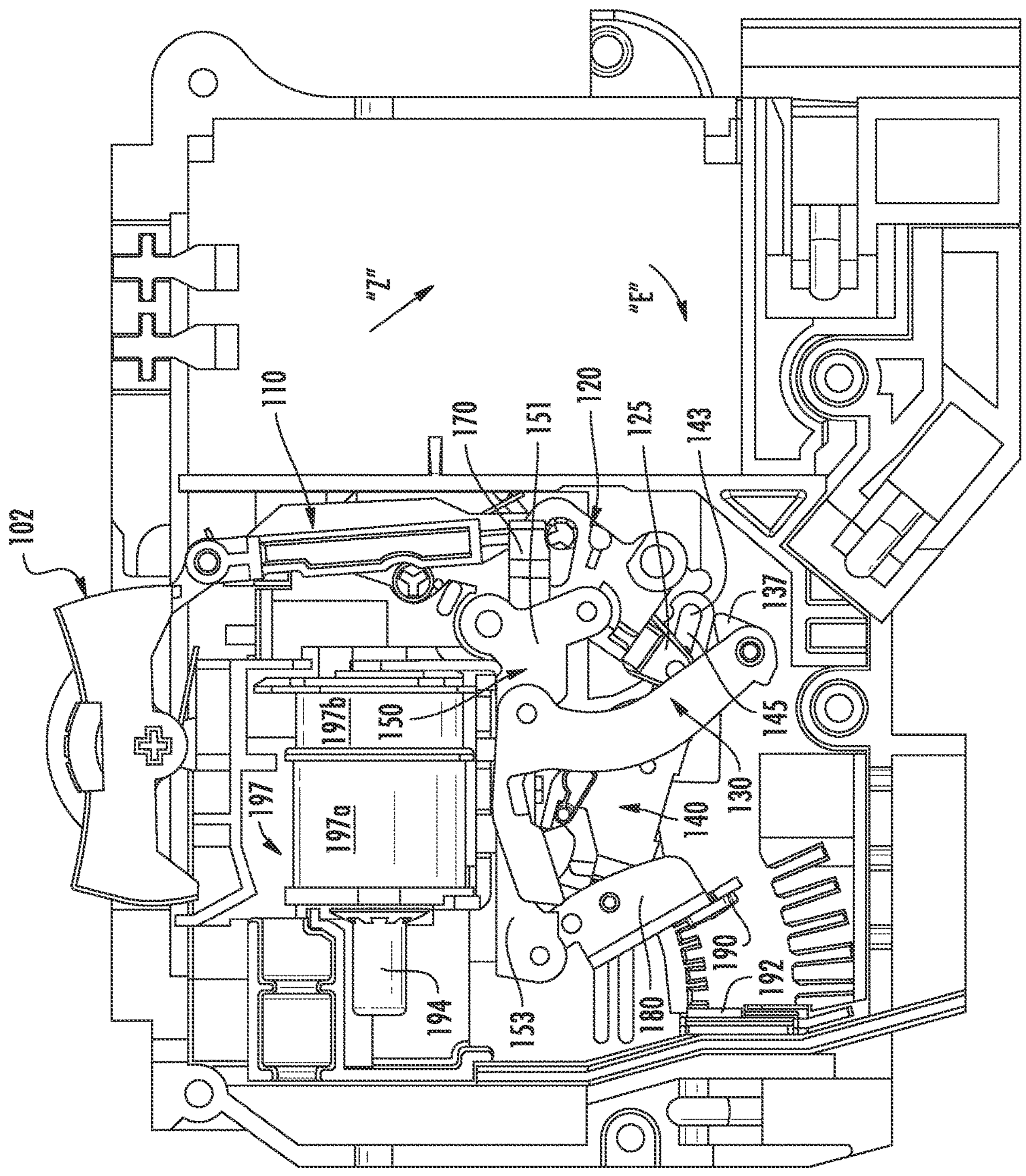

In FIG. 5A, the first linkage 120 continues to swivel or rotate in a clockwise direction "E," so that the latch arm 110 moves downward in a direction "Z," bringing the latch arm 110 parallel with the axis "Y" defined by the housing 101. As the latch arm 110 moves downward, the projections 201 travel along the slots 128 toward the right (FIG. 5B). Moreover, the extension portion 125 of the first linkage 120 moves further leftward along the slot 145 of the third linkage 140. As the described components of the circuit breaker 100 move in response to rotation of the first linkage 120, the armature 195 remains in contact with the solenoid 197 (see FIGS. 4A and 5A).

In FIG. 5B, the movement of the first linkage 120 causes the latch arm 110 to move further in a direction "Z." The rotating movement of the latch arm 110 causes the projections 201 to slide to the rightmost position within slots 128 of the first linkage 120. In addition, the extension portion 125 moves to the leftmost position of slot 145.

Figure 6:
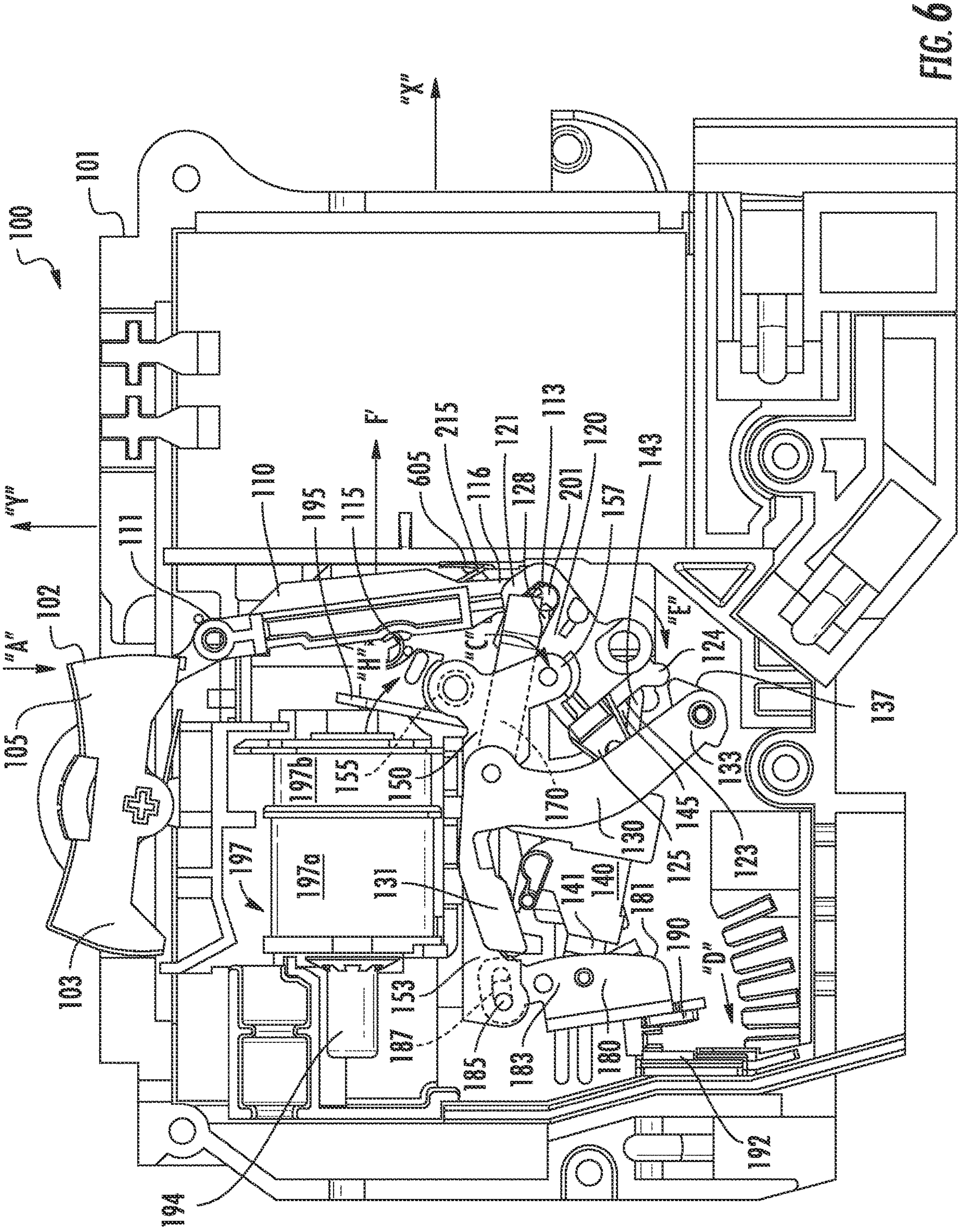
FIG. 6 is a side plan view of internal components of the circuit breaker with the reset lockout mechanism being activated to a first position.

In FIG. 6, the process of resetting the circuit breaker 100, and the transition of the circuit breaker toward the ON state continues. The solenoid 197 is de-energized (discussed further below with respect to FIGS. 11-13) which allows the armature 195 to rotate clockwise, away from the solenoid 197, in a direction "H" due to a bias. Specifically, when de-energized, a torsion spring applies force which causes the armature 195 to rotate away from the solenoid 197 when the magnetic field does not attract the armature 195 to the solenoid 197 with sufficient force. As the armature 195 rotates away from the solenoid 197, the extension 170 of the armature 195 moves in a direction "C". Continued downward pressure on the second side 105 of the rocker actuator 102 causes the first linkage 120 to swivel or rotate further in a direction "E." The swiveling or rotating movement of the first linkage 120 causes the third linkage 140 to shift to the left and to rotate further counterclockwise. As a result of the leftward motion and counterclockwise rotation of the third linkage 140, the support structure 180 swivels or rotates in a direction "D", such that the first contact 190 approaches the second contact 192. The second contact 192 is fixed to the housing portion 107 of the housing 101.

With reference to FIGS. 7A-7D, an electrical schematic diagram is illustrated identifying interconnecting components which enable the circuit breaker 100 to detect fault conditions such as grounded neutral (G/N) faults, and overcurrents. While FIGS. 7A-7D illustrate a one-pole configuration, alternate configurations, including other one-pole and two-pole configurations, are contemplated. Additional configurations are illustrated in FIGS. 22A-22D, 23A-24F, and 24A-24D. For purposes of clarity, a detailed description of a one-pole circuit breaker will now be made, though similar configurations to those provided throughout the present disclosure may be implemented by embodiments of the present disclosure.

Electrical power is received by the componentry of the circuit breaker 100 at the first phase input "PH-In" from the line terminal "LINE-T" (FIG. 1). The electrical power, generally AC power, is then passed through a rectifier "R" to rectify the electrical power. The rectified signal is then transmitted to a controller power circuit "C-P", and a line monitor "M". When the circuit is presented with an overcurrent sufficient to engage the overcurrent portion 197*a* of the solenoid 197, the trip coil "T2" trips the circuit breaker 100, causing the overcurrent portion 197*a* to transition the circuit breaker 100 to the TRIP configuration by drawing the armature 195 toward the solenoid 197 (see FIG. 1). The rectified signal then passes through a diode "D1" which is ultimately transmitted to power the controller "C" via the controller power circuit "C-P", and the line monitor "M".

Figure 7:
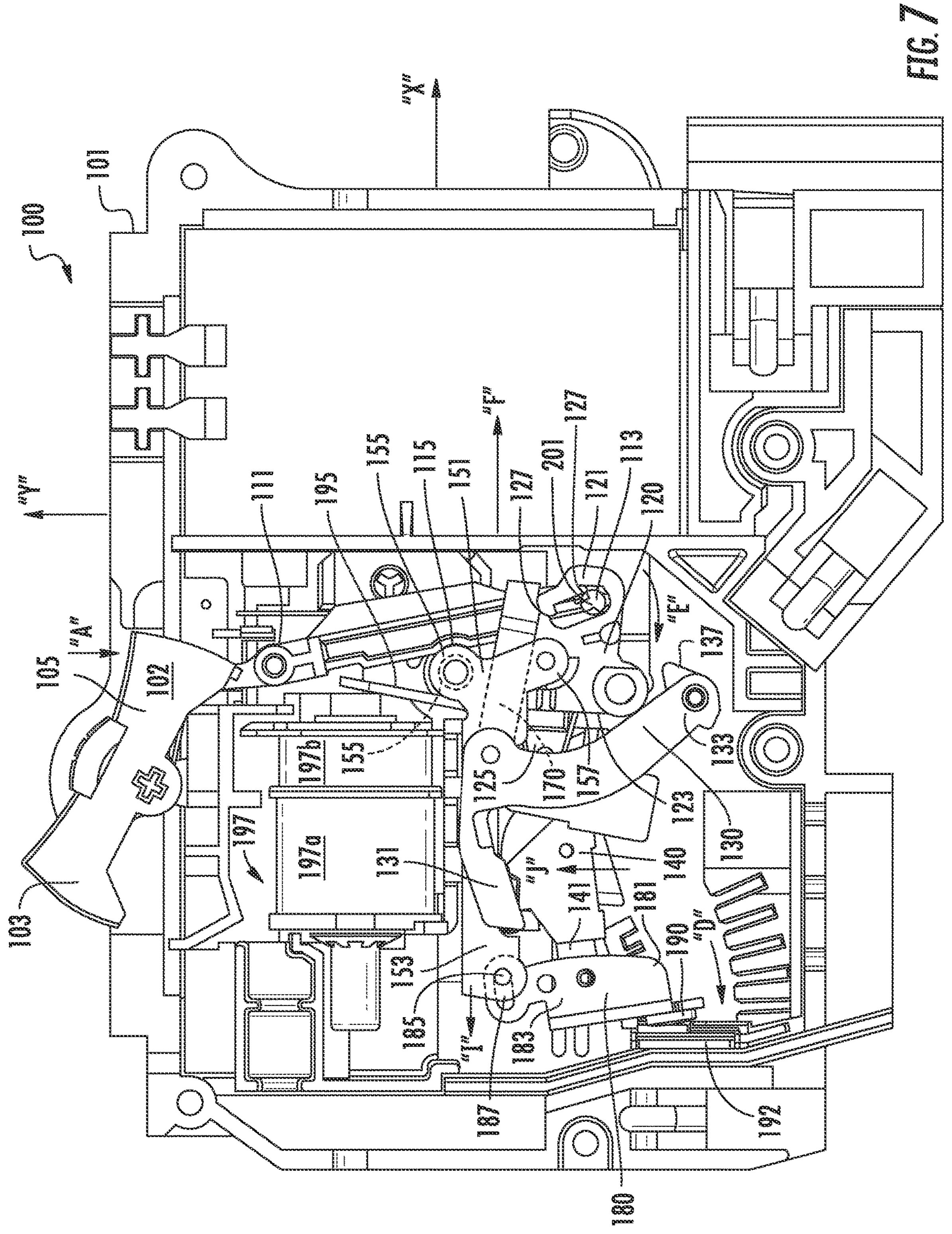
FIG. 7 is a side plan view of internal components of the circuit breaker with the reset lockout mechanism being activated from the first position to a second position.
Figure 7A:
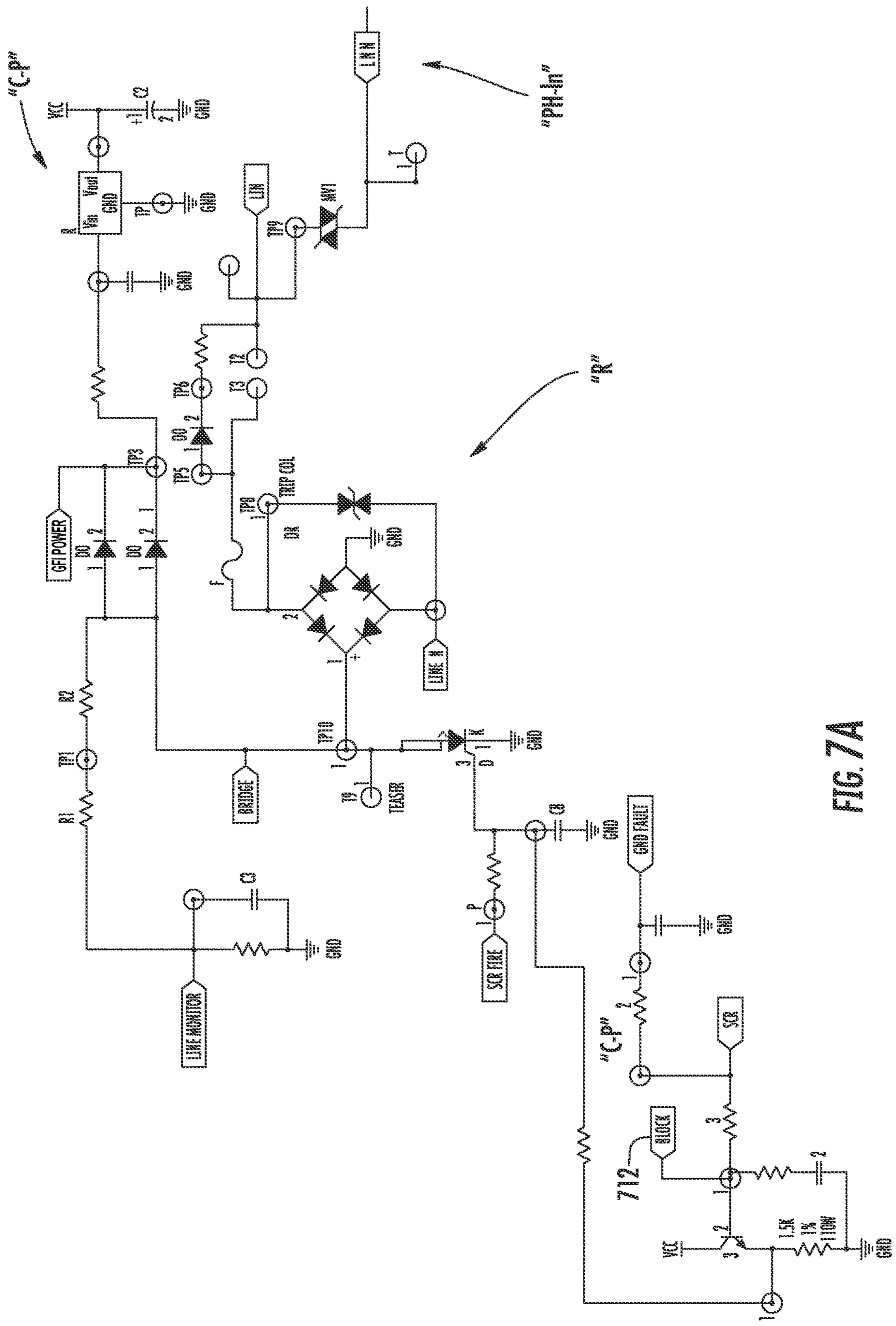
FIGS. 7A-7D illustrate interconnected portions of a schematic diagram (see FIG. 25) of the circuit breaker of FIG. 1, illustrating a control circuit for detecting ground faults and resetting the circuit breaker of FIG. 1.
Figure 7B:
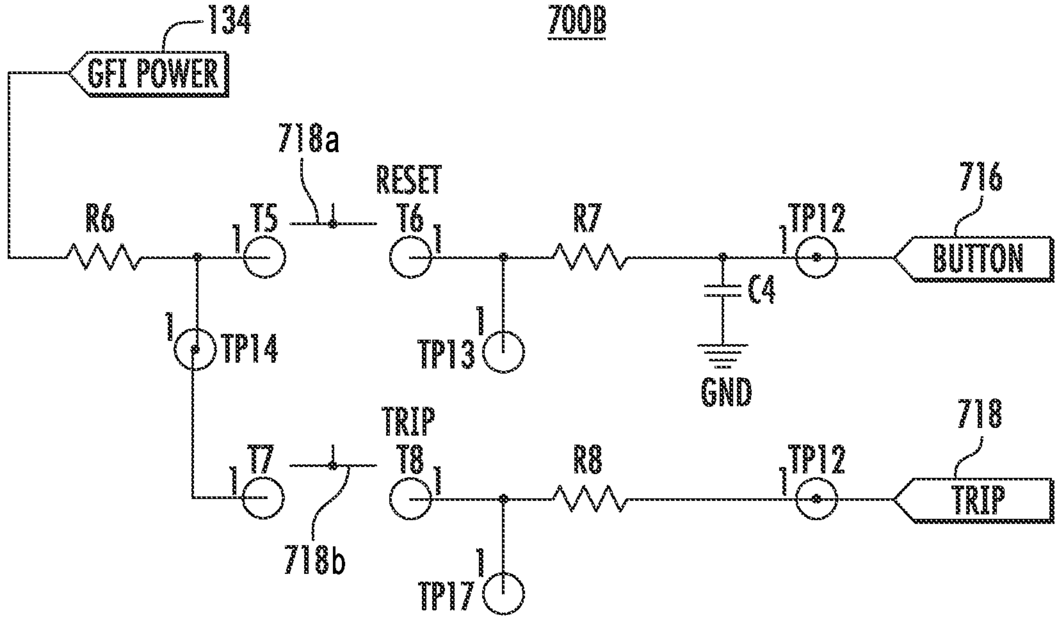

Referring now to FIG. 7B, electric power passes from the GFI input through the trip/reset circuit 700B, and is selectively transmitted to the controller "C" as signal inputs. More particularly, when users engage the second side 105 of the rocker actuator 102, the reset switch 718*a* is closed, thereby allowing the GFI power to be transmitted to the controller "C" via the button input 716. Likewise, when a fault is mechanically sensed via internal componentry of the circuit breaker 100, the respective internal components may cause a G/N switch 718*b* to close, thereby causing a trip signal to be transmitted to the controller "C" via the trip input 718.

A G/N fault occurs when there is a connection between load neutral and the ground conductor. Such a G/N fault may reduce the sensitivity for the detection of ground fault current which, in turn, may cause circuit breaker 100 to either not trip or delay tripping. This is due to the fact that since a ground fault may occur simultaneous to a G/N fault, a portion of the ground fault current may flow back through the core of the differential transformers 728*a* of the circuit breaker 100. In other words, a ground fault may exist but the amount of current imbalance measured by the differential transformer 728*a* may be reduced due to the presence of a G/N fault. In order to mitigate this, the controller "C" detects the G/N fault and causes the circuit breaker 100 to transition to the TRIP configuration when the G/N fault is detected.

Figure 6A:
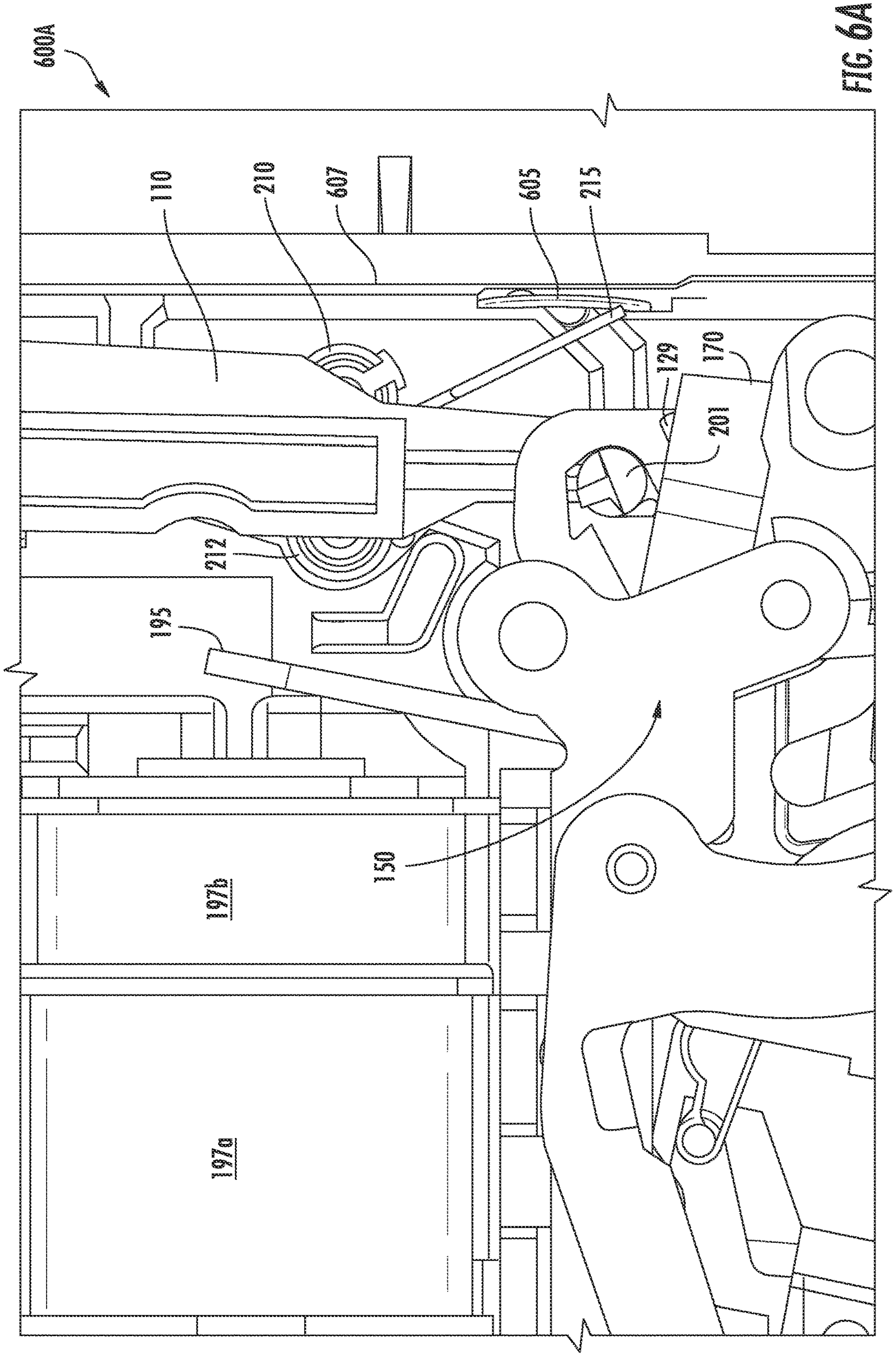
FIG. 6A is an enlarged view of a grounded neutral (G/N) switch contact in a first configuration where the biasing spring and the G/N switch contact touch each other.
Figure 7C:
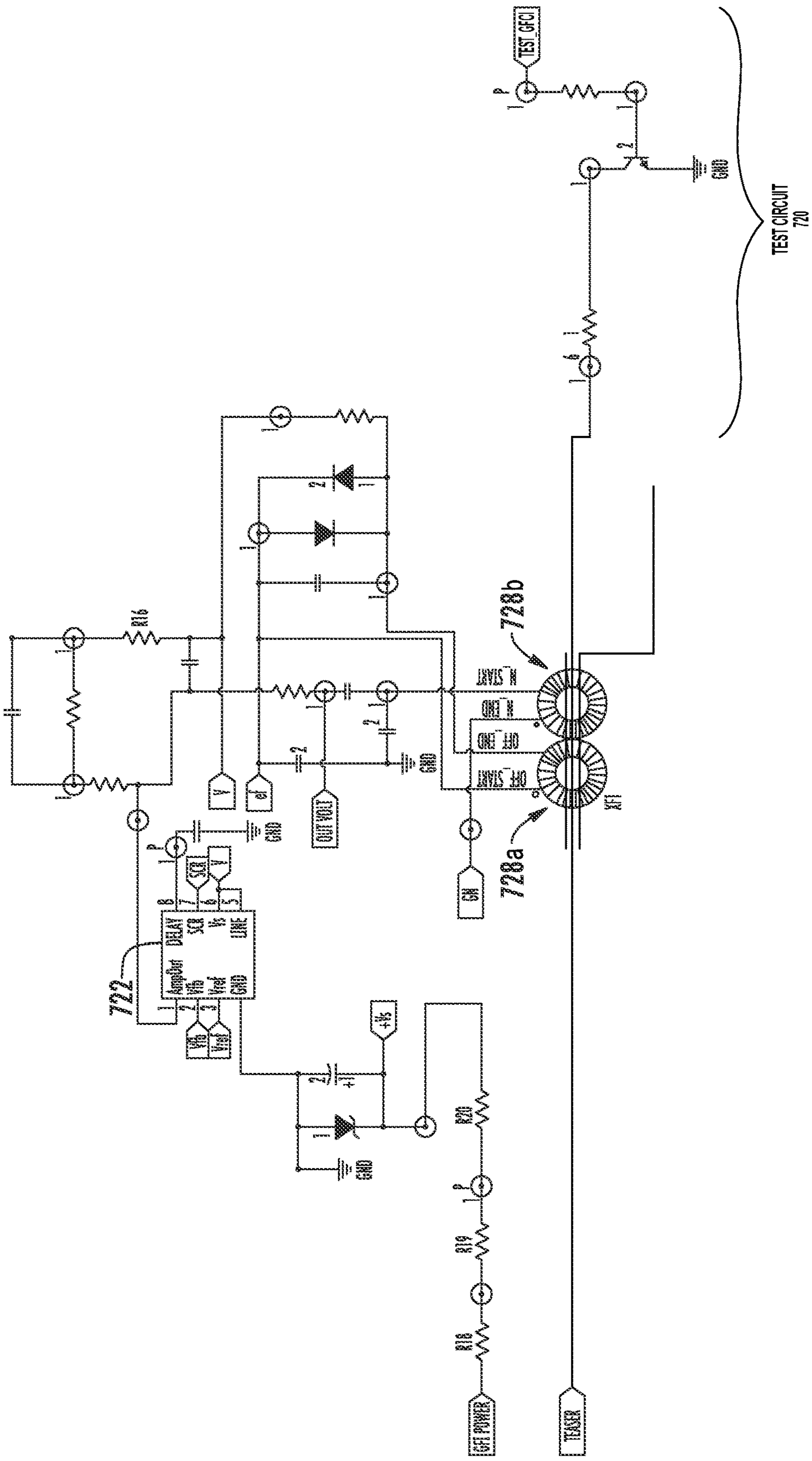

Referring now to FIG. 7C, the presence of a G/N fault occurs when neutral and ground conductors are connected both on the line side and the load side of the differential transformer 728*a* and the G/N transformer 728*b*. This results in a conductive loop which then magnetically couples the differential transformer 728*a* and the G/N transformer 728*b* together. When this happens, the differential transformer 728*a* and G/N transformer 728*b* create positive feedback which causes an amplifier of the GFCI integrated circuit (IC) 722 (FIG. 7C) coupled to the sensing circuitry to oscillate. When the amplifier—oscillates, the sensing circuitry interprets this as a high frequency ground fault and engages the circuit interrupting portion (i.e., solenoid 197), which in turn causes the circuit breaker 100 to transition to the TRIP configuration. When the circuit breaker 100 transitions to the TRIP configuration, the reset lockout mechanism 10 interrupts the phase conductor but does not interrupt the neutral conductor. As such, there needs to be a way for the circuit breaker 100 to disable the detection of the G/N fault if the circuit breaker 100 trips. Otherwise, since the circuit breaker 100 is line side powered, if a G/N fault occurs, the circuitry would attempt to trip the circuit breaker 100 (e.g., fire the solenoid 197) to clear the G/N fault. However, since the circuit breaker 100 does not interrupt the neutral conductor, the G/N fault would not be able to be cleared by the circuit breaker 100. As a result, the circuitry would continually fire the solenoid 197 which could lead to the solenoid 197 overheating and burning out, resulting in a non-operational circuit breaker 100. For this reason, detection of a G/N fault by the circuit breaker 100 may be disabled when the circuit breaker 100 enters the TRIP or MID-TRIP configuration. However, once reset, the detection of a G/N fault by the circuit breaker 100 may then be enabled. In order to disable and enable detection of a grounded neutral (G/N) fault, a grounded neutral (G/N) switch is used. The G/N switch includes a G/N switch contact 605 (FIG. 6A) and a distal end 215 of the biasing spring 210.

FIG. 6A is an enlarged view 600A of a G/N switch contact 605 in a first configuration with a distal end 215 of the biasing spring 210 and the G/N switch contact 605 in mechanical communication. When the circuit breaker 100 is in the OFF configuration (i.e., no power is transmitted to the load terminal "LOAD-T"), a distal end 215 of the biasing spring 210 touches the G/N switch contact 605. The G/N switch contact 605 is fixed to a housing component 607 disposed along the housing 101. Additionally, the latch arm 110 does not push on the biasing spring 210 in the first configuration. Therefore, when the circuit breaker 100 is tripped, a G/N switch 718*b* (FIG. 7B) is closed. Closing the G/N switch 718*b* results in the G/N transformer 728*b* being disconnected from the circuit ground of the DC power supply. This in turn prevents the G/N transformer 728*b* from injecting the 120 Hz signal in the conductors passing therethrough, and in turn, prevents the circuit breaker 100, and more particularly the controller "C", from detecting a G/N fault.

Figure 7D:
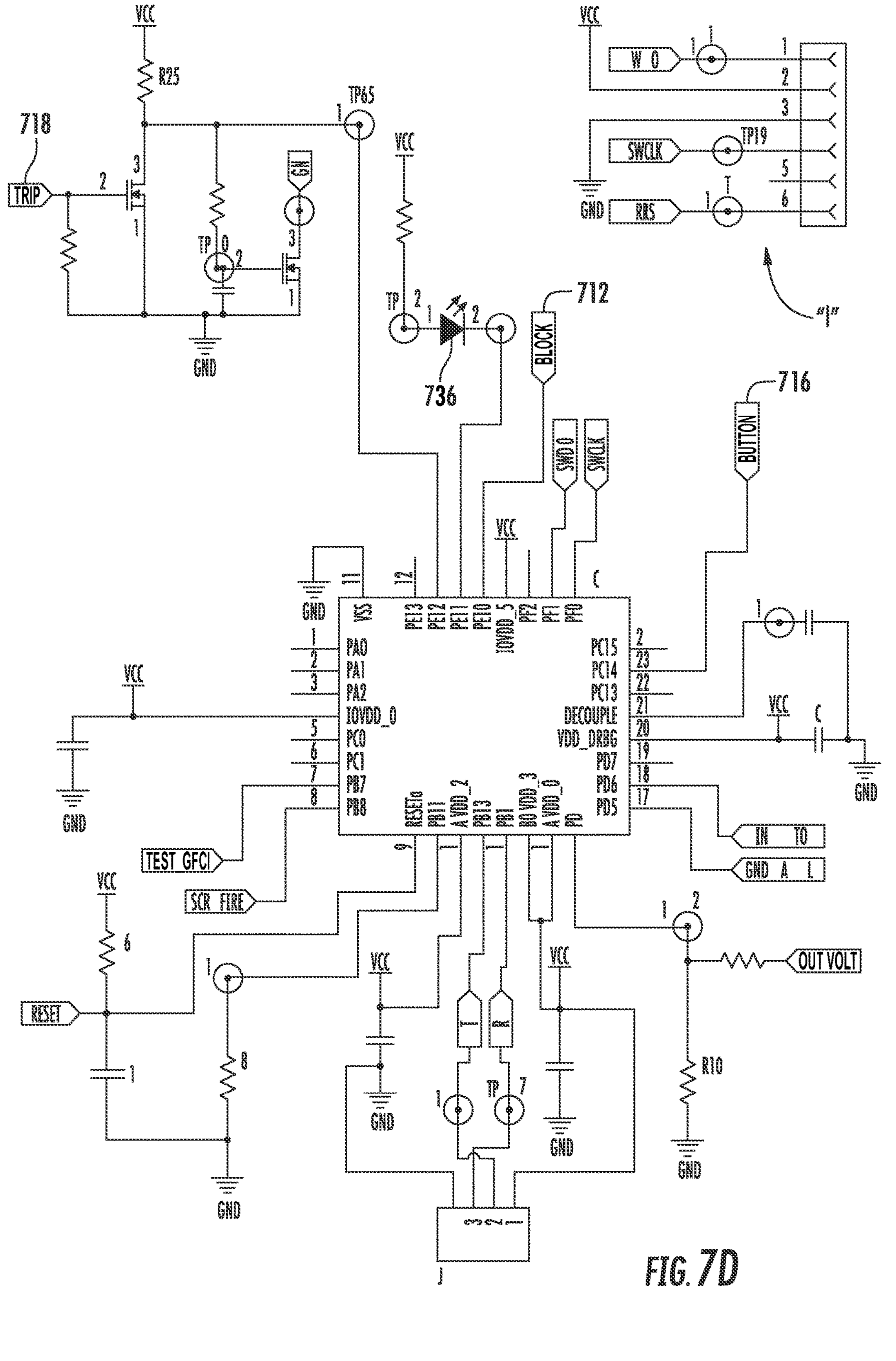

The circuitry of circuit breaker 100 includes a GFCI integrated circuit (IC) 722 (FIG. 7C) and a controller "C" (FIG. 7D). The GFCI IC 722 is used to detect ground faults and G/N faults and is electrically coupled to the differential transformer 728*a* and the G/N transformer 728*b*. The microprocessor or controller "C" (FIG. 7D) can perform additional functionality, such as event logging and self-testing.

Event logging may include recording a history of tripping (transitioning to the TRIP configuration), resetting (transitioning to the MID-TRIP configuration), manual OFF, component failure, and any other suitable event. Self-testing by the controller "C" enables the automatic or selective testing of the components of the circuit breaker 100 without the need for user intervention. In embodiments, the controller "C" may temporarily disable firing the solenoid 197 during the self test by applying a signal at the BLOCK 712 (FIG. 7A) output of the controller "C". In embodiments, the G/N switch 718*b* may be opened when the device is tripped, i.e., in the TRIP or MID-TRIP configuration. In this embodiment, the G/N switch 718*b* may open up an electrical path between the winding of the G/N transformer 728*b* and the GFCI IC 722. Alternatively, the G/N switch 718*b* may short out the winding of the G/N transformer 728*b*. In embodiments, there can be a "disable" input on the GFCI IC 722, controller "C", or both that may be configured to disable G/N fault detection. The "disable" input may be electrically coupled to the G/N switch 718*b*.

Additionally, the controller "C" may energize the solenoid 197*b* to cause the circuit breaker 100 to transition from a TRIP or MID-TRIP configuration to an ON configuration. To energize the solenoid 197 when transitioning the circuit breaker 100 from the TRIP or MID-TRIP configuration to the ON configuration, the controller "C" transmits a signal to the SCR (FIG. 7A). Subsequently, the solenoid 197 is energized, thereby drawing the armature 195 toward the solenoid 197. If the solenoid 197 generates a magnetic field to draw the armature 195 toward the solenoid 197, a signal is transmitted to the controller "C" indicative of the functioning of the solenoid 197. If the solenoid 197 fails, then the controller "C" does not receive a signal, and may determine that the solenoid 197 has failed.

State and/or configuration information is communicated to the controller "C". The controller "C" uses this information for event logging of the tripping and resetting of circuit breaker 100. The controller "C" can also monitor other portions of the circuitry to detect whether various portions of the circuitry have failed. In addition, the controller "C" is electrically coupled to an output or LED light assembly 736 to alert users to any number of conditions such as end of life of the circuit breaker 100, or the presence and/or type of a fault detected by the controller "C".

In FIG. 7, resetting the circuit breaker 100 to the ON configuration continues by maintaining force applied in a direction "A" to the second side 105 of the rocker actuator 102. The continued force to the rocker actuator 102 causes the latch arm 110 to move in a direction "F".

The first linkage 120 swivels or rotates such that the extension portion 125 is parallel to the axis "X," which in turn pulls the third linkage 140 upward in a direction "J." Movement of the third linkage 140 causes the support structure 180 to swivel or rotate in a clockwise direction "D", such that the first contact 190 is advanced toward the second contact 192. Movement of the support structure 180 causes the pivot support section 183 to move in a direction "I", such that the pivot pin 185 travels along the slot 187. The pivot pin 185 travels from the leftmost position to the rightmost position of slot 187. As a result, with respect to FIGS. 4A-7, the first linkage 120 is rotated by approximately 90 degrees in the clockwise direction "E" to transition the circuit breaker 100 to the ON configuration (i.e. fully reset).

Figure 7E:
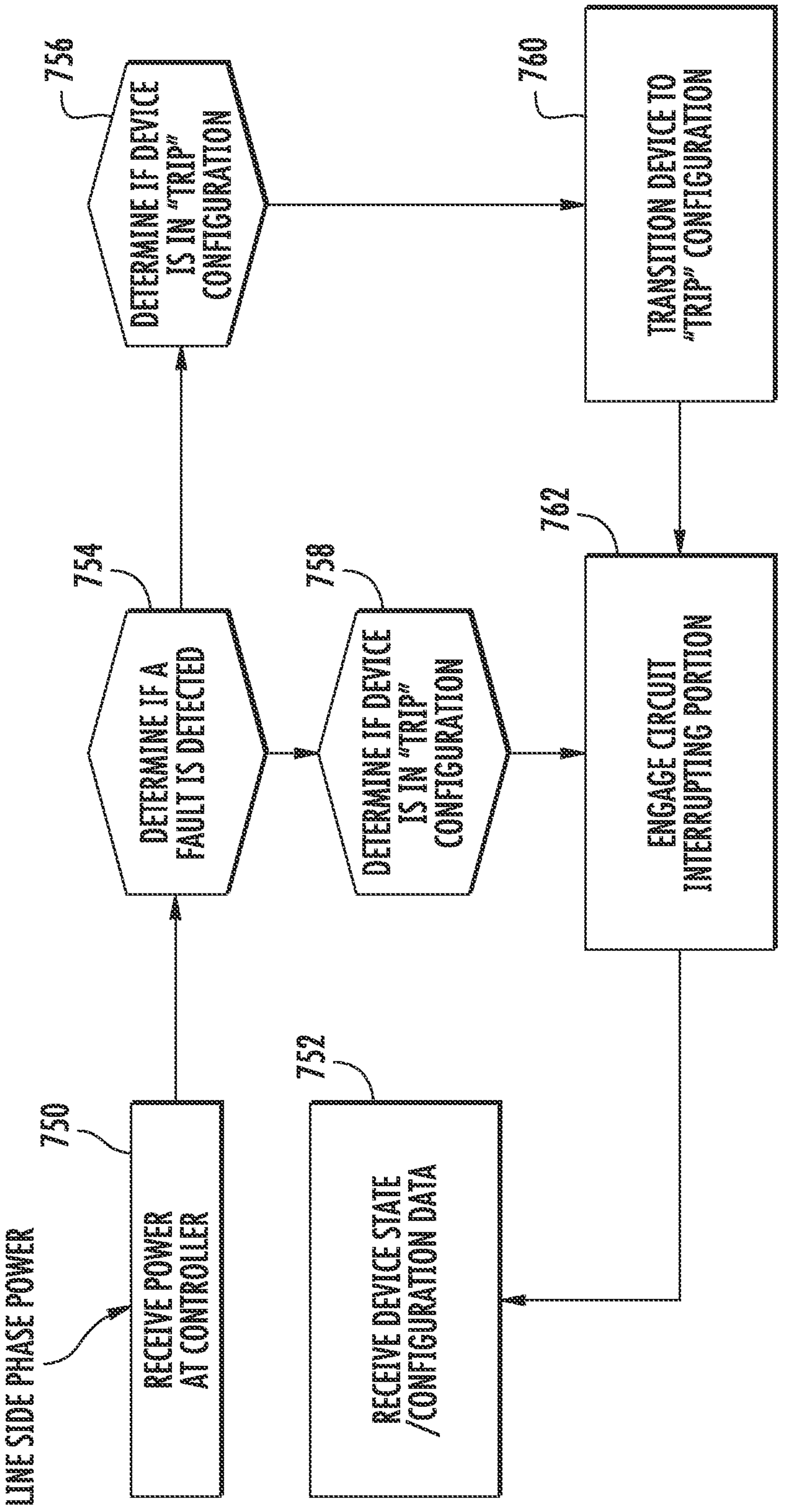
FIG. 7E is a flow diagram illustrating a circuit test process according to aspects of the present disclosure.

Referring now to FIG. 7E, a flow diagram is provided illustrating the operation of the circuit breaker 100. More particularly, FIG. 7E illustrates a process 700E executed by the controller "C". Initially, the controller "C" receives electrical power from the line terminal "LINE-T" (S750) via a rectifier and a voltage regulator circuit. The controller "C" receives information associated with the components of the circuit breaker 100. which are monitored by the controller "C" (S752). The information received by the controller "C" may include voltage measurements taken at line terminal "LINE-T" and the load terminal "LOAD-T", and current measurements obtained by the transformers "T" which are used to determine whether there is a current imbalance, a low current, a high current, etc. More particularly, current measurements obtained via the transformers "T" enable the controller "C" to determine if one or more predetermined conditions or faults exist such as, without limitation, ground faults, arc faults, shared-neutral conditions, overcurrent conditions, etc. The controller "C" may update an event log with the information received and the existence or occurrence of any predetermined conditions or faults. Additionally, the controller "C" may determine, based on the voltage measured at the line terminal "LINE-T" and the load terminal "LOAD-T", whether the circuit breaker is in the TRIP configuration or the ON configuration.

If the measurements of the current between the line terminals "LINE-T" and the load terminals "LOAD-T" indicate a current mismatch or vary beyond a predetermined threshold, the controller "C" may determine that a ground fault or G/N fault condition is present. Additionally, the controller "C" may receive sensor signals indicative of an arc fault or a ground fault. For example, a high frequency transformer and/or other components/circuitry of transformer assembly 808 may provide sensor signals indicative of an arc fault.

Upon determining that any of the faults described throughout this disclosure are present (S754), the controller "C" further determines whether the circuit breaker 100 is in the TRIP configuration (S758). Alternatively, if no fault is detected, the controller "C" determines whether the circuit breaker 100 is in the TRIP configuration (S756). The controller "C" may further determine whether a predetermined condition exists while the circuit breaker 100 is in the OFF configuration. Once a fault is detected while the circuit breaker is in the OFF configuration, the circuit breaker 100 may display an indication to users indicative of the presence or type of fault (see FIG. 21).

If a fault is detected (S754) and the circuit breaker 100 is determined not to be in the TRIP configuration, the controller "C" sends a control signal to engage the circuit interrupting portion, which may be a solenoid 197*b* (S762). Once the solenoid 197*b* receives the control signal from the controller "C", the solenoid 197 generates a magnetic field, thereby drawing the armature 195 (FIG. 1) toward the solenoid 197*b*. Drawing the armature 195 toward the solenoid 197*b* transitions the circuit breaker from the ON configuration to the TRIP configuration. As a result, the circuit breaker 100 must, once a fault is no longer detected (S754), reengage the solenoid 197*b* to transition the circuit breaker 100 to the ON configuration.

If no fault is detected (S754), the controller "C" determines whether the circuit breaker 100 is in the TRIP or ON configuration (S756). If the controller "C" determines the circuit breaker is in the TRIP configuration, the controller "C" sends a control signal to the solenoid to draw the armature 195 in to transition the circuit breaker 100 to the MID-TRIP configuration (S760). Once the circuit breaker 100 is in the MID-TRIP configuration, force applied to the second side 105 of the rocker actuator 102 in the direction "A" (FIG. 2) transitions the circuit breaker 100 to the ON configuration. As illustrated, as the controller "C" determines whether a fault is present (S754), and causes the circuit breaker 100 to transition to a TRIP, MID-TRIP, or maintain an ON configuration, process 700E is reiterated to provide continuous analysis of the state of the circuit breaker 100.

Figure 8:
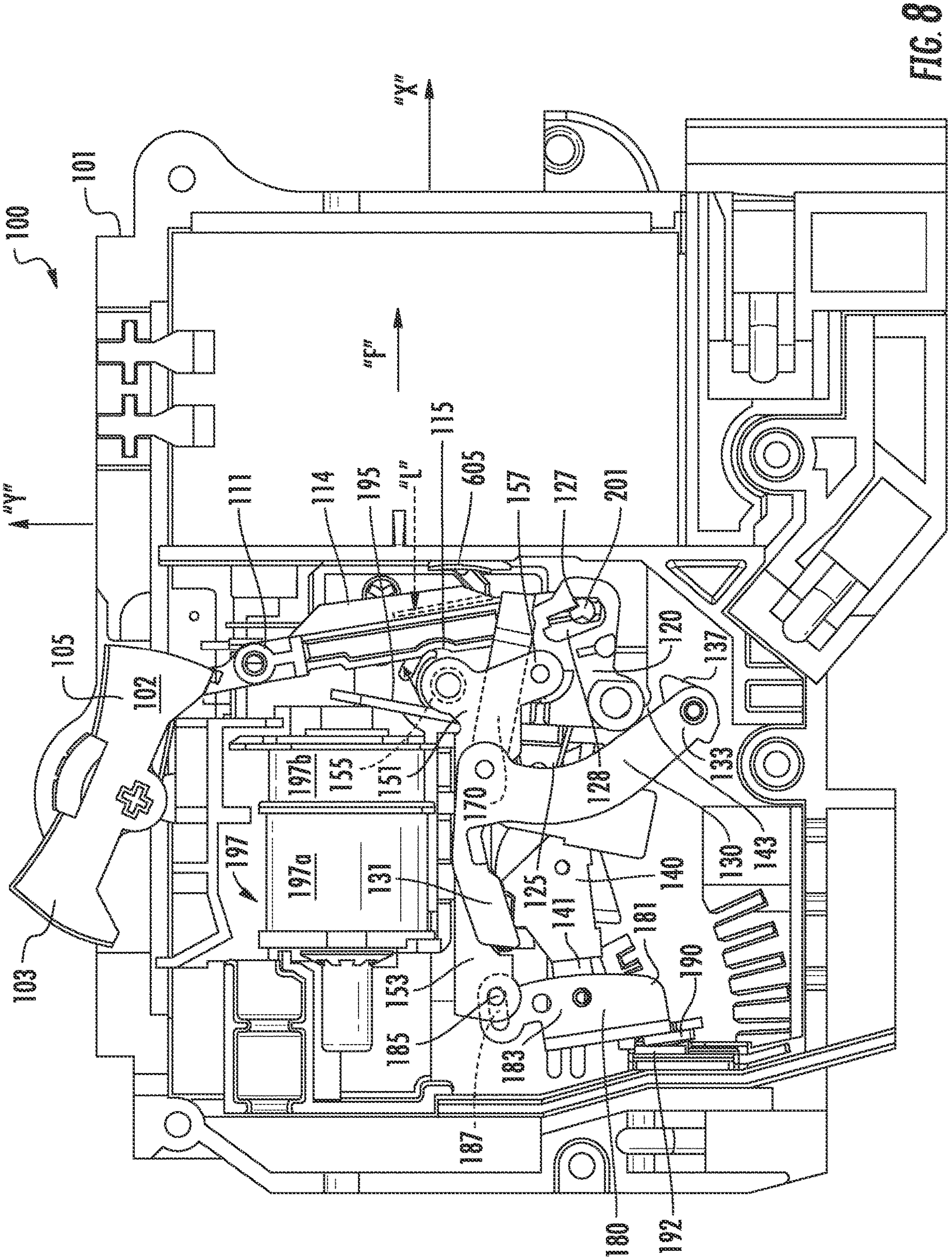
FIG. 8 is a side plan view of the internal components of the circuit breaker of FIG. 1 in a reset configuration.

FIG. 8 is a front view of the internal components of the circuit breaker 100 that is fully reset (i.e. the ON configuration).

In addition to its role with respect to the G/N switch contact 605, the biasing spring also biases latch arm 110. In FIG. 8, the force that was previously applied to the second side 105 of the rocker actuator 102 has been removed (i.e., the user has stopped pressing on the rocker actuator 102). Due to biasing spring 210, the latch arm 110 is shifted upward and in the direction of "F" such that the projection 201 of the latch portion 113 is received and engaged with a toothed edge 127 defined by the slots 128 of the first linkage 120. When the projection 201 is received and engaged with the toothed edge 127, the circuit breaker 100 is fully reset and the rocker actuator 102 remains in the position shown in FIG. 8. Moreover, in FIG. 8, the first contact 190 is touching the second contact 192.

Thus, in FIGS. 7 and 8, the circuit breaker 100 is in the ON configuration with the first and second contacts 190, 192 in the closed position (i.e., contacting each other), enabling current to flow between the first and second contacts 190, 192. At this point, the ground fault protection is armed and the circuit breaker 100 is capable of tripping.

Figure 8A:
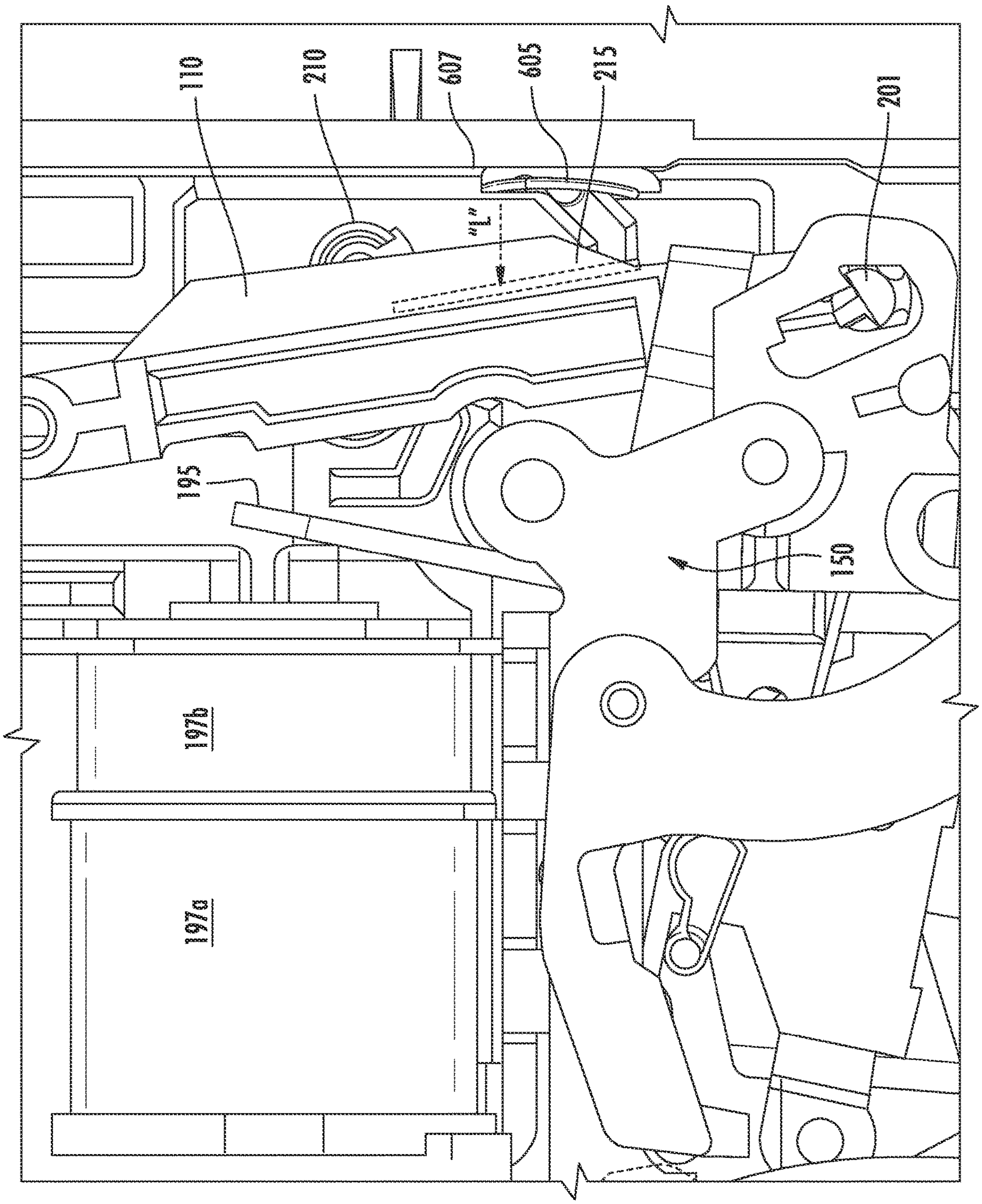
FIG. 8A is an enlarged view of the G/N switch contact of FIG. 6A in a second configuration where the biasing spring and the G/N switch contact are not in mechanical communication.
Figure 8B:
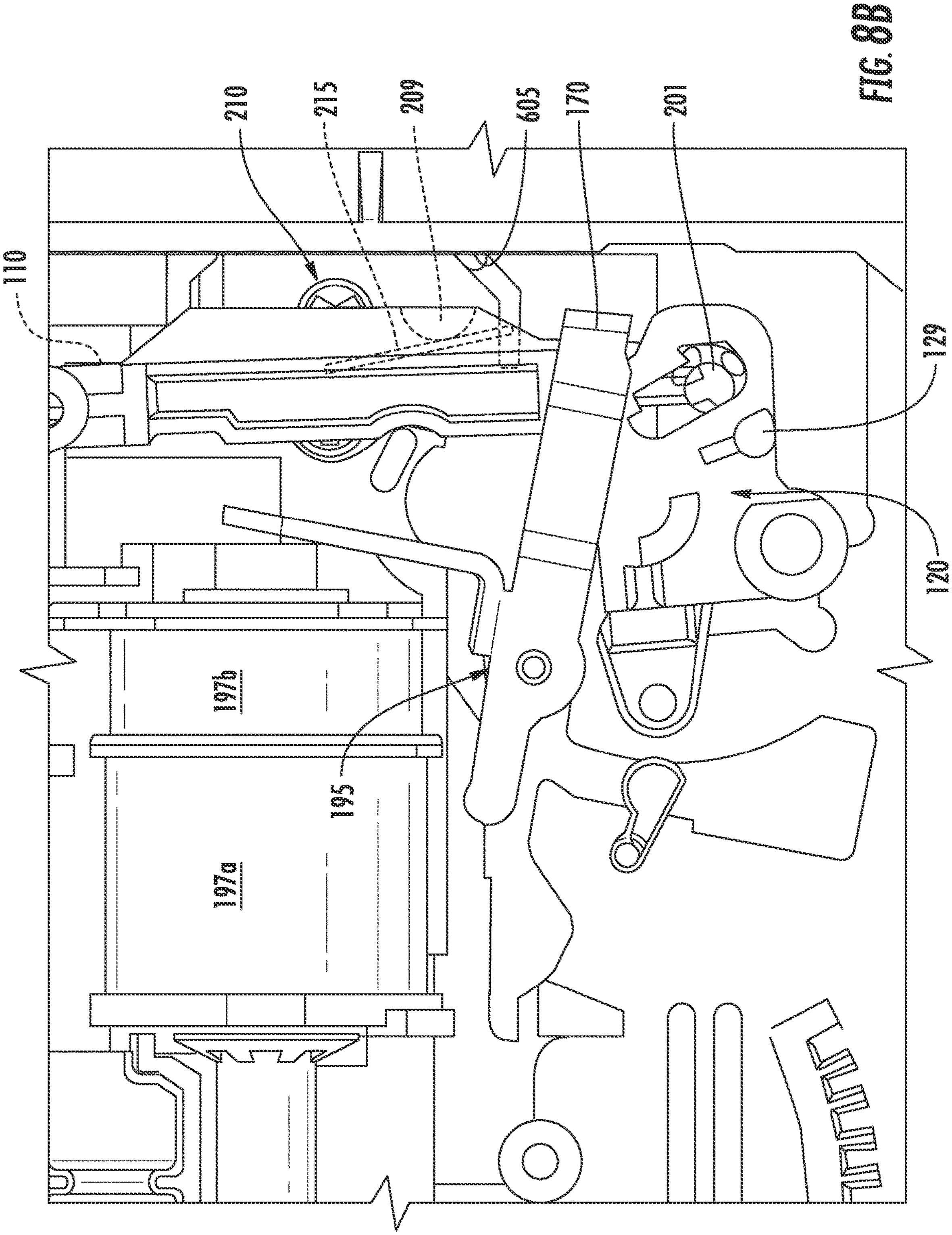
FIG. 8B is an enlarged view, with the latch arm shown in phantom, illustrating the biasing spring spaced from the G/N switch contact by a projection member of the latch arm.

With reference to FIGS. 8A and 8B, the G/N switch contact 605 is in a second configuration where the distal end 215 of the biasing spring 210 and the G/N switch contact 605 do not touch each other, according to the disclosure. When the circuit breaker 100 is in the reset or ON configuration (i.e., power is provided to the load terminal "LOAD-T"), a distal end 215 of the biasing spring 210 does not touch the G/N switch contact 605. The first projection member 209 of the latch arm 110 abuts the distal end of the biasing spring 210 to move biasing spring 210 away from G/N switch contact 605. The distal end 215 of the biasing spring 210 is moved in a direction "L" by the first projection member 209 to disengage the two components from each other. The G/N switch contact 605 remains fixed to the housing component 607. Additionally, the latch arm 110 prevents the biasing spring 210 from moving out of the second configuration to maintain disengagement between the G/N switch contact 605 and the biasing spring 210 until latch arm 110 is moved back to the first configuration shown in FIGS. 6 and 6A. As a result, the winding of the G/N transformer 740 is then connected to the circuit ground of the DC power supply and detection of a G/N fault is enabled. Moreover, when the grounded neutral (G/N) condition is detected the circuit breaker 100 trips to disconnect power from the load to prevent a possible undetected fault.

Figure 9:
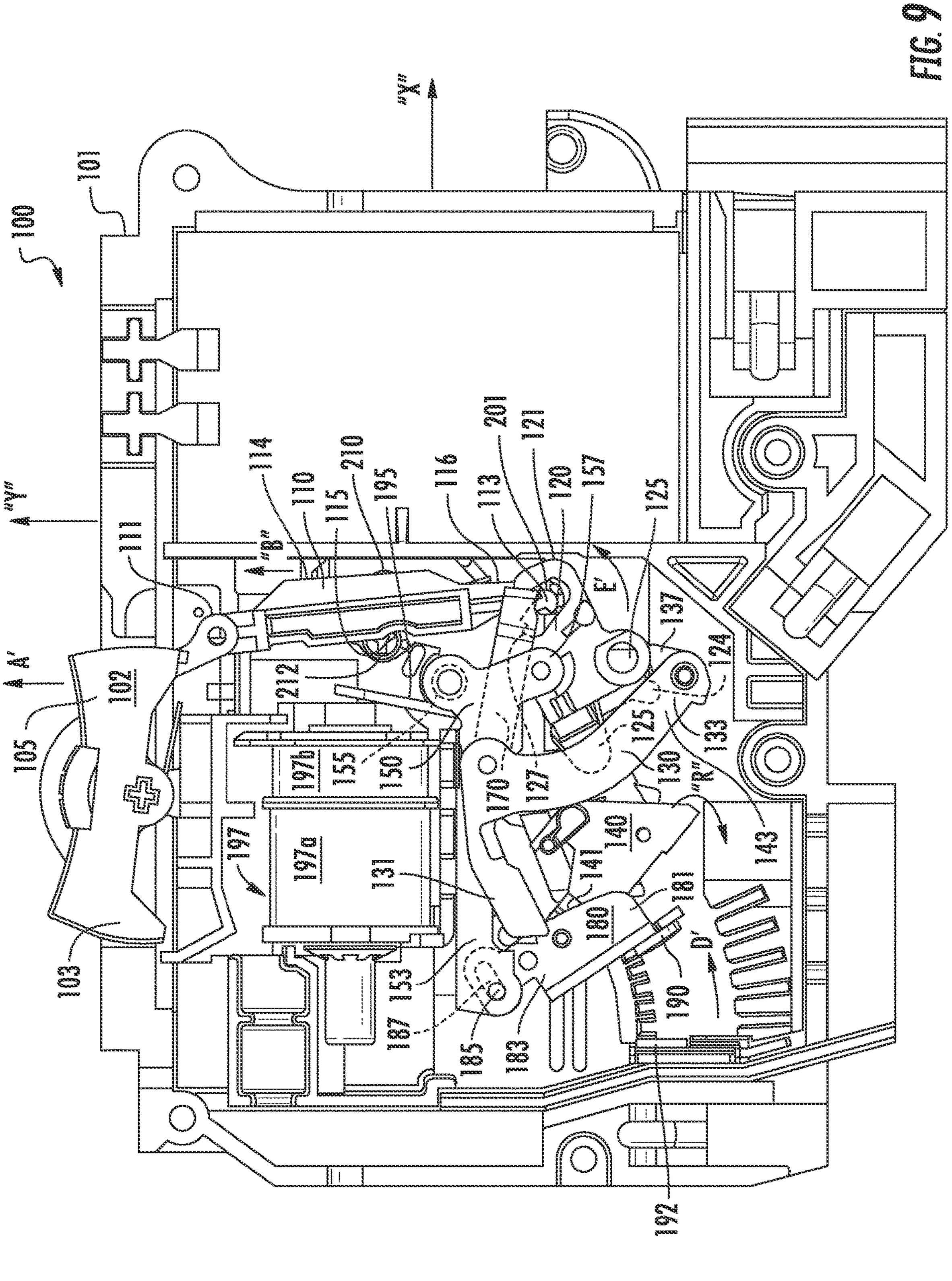
FIG. 9 is a front view of internal components of the circuit breaker in a mid-trip state with the rocker actuator in a corresponding mid-trip position.
Figure 9A:
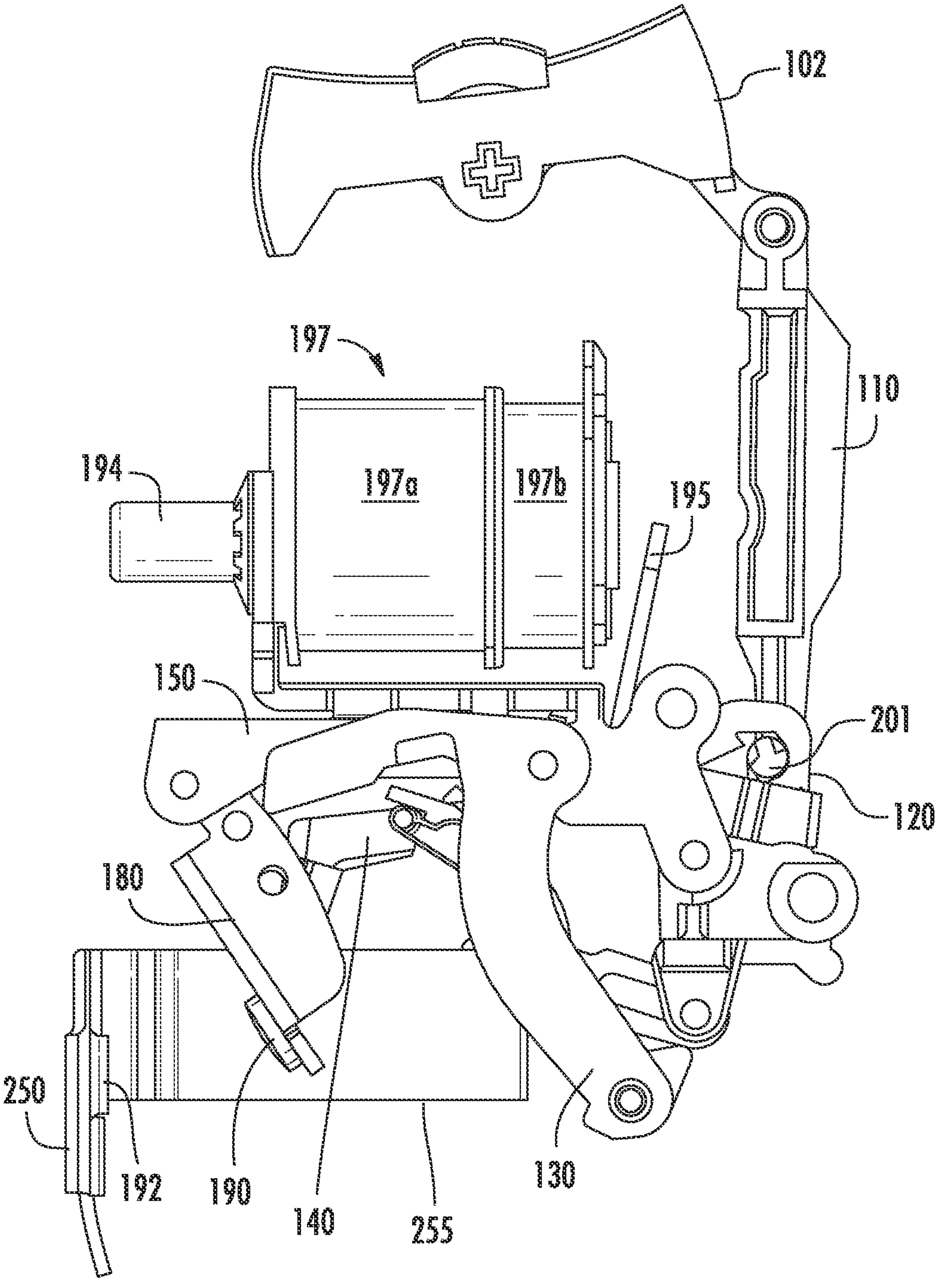
FIGS. 9A-9F illustrate a sequence of movements of the linkage mechanism.

FIG. 9 is a side view of internal components of the circuit breaker 100 illustrated in a MID-TRIP configuration with the rocker actuator 102 in a corresponding MID-TRIP configuration. It should be understood that the circuit breaker 100 may be referred to as in the TRIP configuration when in the MID-TRIP configuration.

With reference to FIGS. 14A-14E, the armature 195 and the third linkage 140 are illustrated in detail. The armature 195 includes a projection 195*a* and is configured to rotate about a pivot axis defined by a pivot pin or rod 195*b*. As described previously, the third linkage 140 includes the first linkage portion 141, the second linkage portion 143, and the release member 147. The first linkage portion 141 and second linkage portion 143 are rotatably coupled to one another about a pivot axis defined by a hole or opening 199 in first linkage portion 141. The release member 147 of third linkage 140 includes a release arm 147*a* connected to a release shaft 147*b*. The release shaft 147*b* defines a channel 147*c*. The release shaft 147*b* is received through a hole (not explicitly shown) in the first linkage portion 141 and configured to rotate, about a pivot axis 147*d* defined by the release shaft 147*b*, with respect to the first linkage portion 141. The release member 147 is biased in the clockwise direction (in FIG. 14A) and has a resting position when the circuit breaker 100 is in the reset or MID-TRIP configuration. The resting position of the release member 147 maintains the first linkage portion 141 and second linkage portion 143 in the position shown in FIG. 3I. This is due to the fact that when the release member 147 is in the resting position, an edge 143*a* of the second linkage portion 143 is received within the channel 147*c* and engages an inner surface that defines the channel 147*c* of the release shaft 147*b*.

With continued reference to FIGS. 14A-14E and FIG. 9, the circuit breaker transitions to the TRIP configuration when, for example, an AFCI fault, GFCI fault, or overcurrent condition is present. When one of these conditions is present, the solenoid 197 is electrically engaged such that the armature 195 is rotated counterclockwise or drawn toward the solenoid 197. When this occurs, projection 195*a* of the armature 195 moves downward and engages or pushes on the release arm 147*a* of release member 147. This, in turn, causes the release member 147 to rotate counterclockwise about the pivot axis 147*d*. When this occurs the inner surface that defines the channel 147*c* clears the edge 143*a* of the second linkage portion 143 causing the first linkage portion 141 and the second linkage portion 143 to move and rotate to their respective positions shown in FIG. 9 (the first linkage portion 141 moves in a direction "R"). In other words, the first linkage portion 141 and the second linkage portion 143 collapse toward each other. After this occurs, the support structure 180 shifts such that the first contact 190 is disengaged from the second contact 192. The pivot support section 183 of the support structure 180 also shifts such that the pivot pin 185 moves from the rightmost position to the leftmost position within the slot 187. Furthermore, the movement of the first linkage portion 141 and second linkage portion 143 causes the first linkage 120 to rotate in a direction "E". The rotation of the first linkage 120 causes upward motion in a direction "B" of the latch arm 110 (via latch portion 113) which in turn causes the second side 105 of the rocker actuator 102 to move in a direction "A'."

The movement of the first linkage portion 141 and second linkage portion 143 also causes a roller 141*a* (FIGS. 14A and 14E) to move generally horizontally closer towards latch arm 110. Roller 141*a* bears on an edge 130*a* of second linkage 130 which causes second linkage 130 to rotate (referring to FIG. 9, the direction of rotation of second linkage 130 is counterclockwise). In turn, the second linkage portion 133 (FIG. 9) of the second linkage 130 contacts the rounded tip 124 of the first linkage 120 to retain a secure engagement therebetween. This connection ensures that the latch arm 110 stabilizes the rocker actuator 102 in this position (when the circuit breaker 100 is in a mid-trip state). Moreover, the circuit breaker 100 cannot be put directly into the reset state from the mid-trip state by pressing on the second side 105 of the rocker actuator 102 since the first linkage portion 141 and second linkage portion 143 are already collapsed toward each other. The connection between the rounded tip 124 of the first linkage 120 and the second linkage portion 133 of the second linkage 130 can be cleared when a user presses the first side 103 of the rocker actuator 102.

One benefit of including a MID-TRIP configuration with a corresponding position of the rocker actuator 102 is that users can distinguish between when the circuit breaker 100 has tripped due to a fault verses when the circuit breaker 100 has been put in the OFF configuration by the user manually (e.g. to service the branch circuit). Such an indication may be provided in any suitable manner in addition to, or in place of, a MID-TRIP configuration such as visual indication, audible indication, remote indication, electrical/electronic indication, etc. As such, alternative embodiments may omit the MID-TRIP configuration and the rocker would simply have two positions corresponding to the ON and OFF configurations. When circuit breaker 100 includes a MID-TRIP configuration, the operation of the circuit breaker may progress as follows. Beginning in the OFF configuration, users may attempt to reset the circuit breaker 100, thereby transitioning the circuit breaker to the ON configuration. If the circuit breaker 100 is operational, the reset lockout mechanism 10 is cleared and the rocker actuator 102 is allowed to be moved all the way to the position corresponding to the ON configuration. The circuit breaker 100 is now reset, thereby reestablishing the conductive path between the line and load terminals "LINE-T", "LOAD-T". If users desire to service the branch circuit, the rocker actuator 102 may be moved to the position corresponding to the OFF configuration, thereby de-energizing the branch circuit. In order to transition the circuit breaker 100 to the ON configuration, the reset lockout mechanism 10 must be cleared before the circuit breaker 100 may return to the ON configuration.

If the circuit breaker 100 is in the ON configuration, and a ground fault or an overcurrent occurs, the circuit breaker 100 would trip and enter the MID-TRIP configuration. In order for the circuit breaker 100 to return to the ON configuration, the rocker actuator 102 would first have to be moved to the position corresponding to the OFF configuration. Once in the OFF configuration, the circuit breaker 100 may be reset as described above. The circuit breaker 100 cannot go directly from the MID-TRIP configuration to the ON configuration. This ensures that the circuit breaker 100 can only be reset if the circuit breaker 100 is operational and the reset lockout mechanism 10 can be cleared. This is due to the connection between the rounded tip 124 of the first linkage 120 and the second linkage portion 133 of the second linkage 130 that is cleared only when users press the first side 103 of the rocker actuator 102. In an alternate embodiment, the circuit breaker 100 may be configured such that the reset lockout mechanism 10 would not have to be cleared for the circuit breaker 100 to transition from the OFF configuration to the ON configuration. In a further alternate embodiment, the circuit breaker 100 could be configured such that the reset lockout mechanism would need to be cleared when the circuit breaker 100 goes from the MID-TRIP configuration to the OFF configuration but not when the circuit breaker 100 goes from the OFF configuration to the ON configuration.

FIGS. 9A-9F illustrate a sequence of movements of the linkage mechanism and correspond with FIGS. 1, 2, 3, 4A, 5A, 5B, and 6, respectively, according to the disclosure.

Figure 9B:
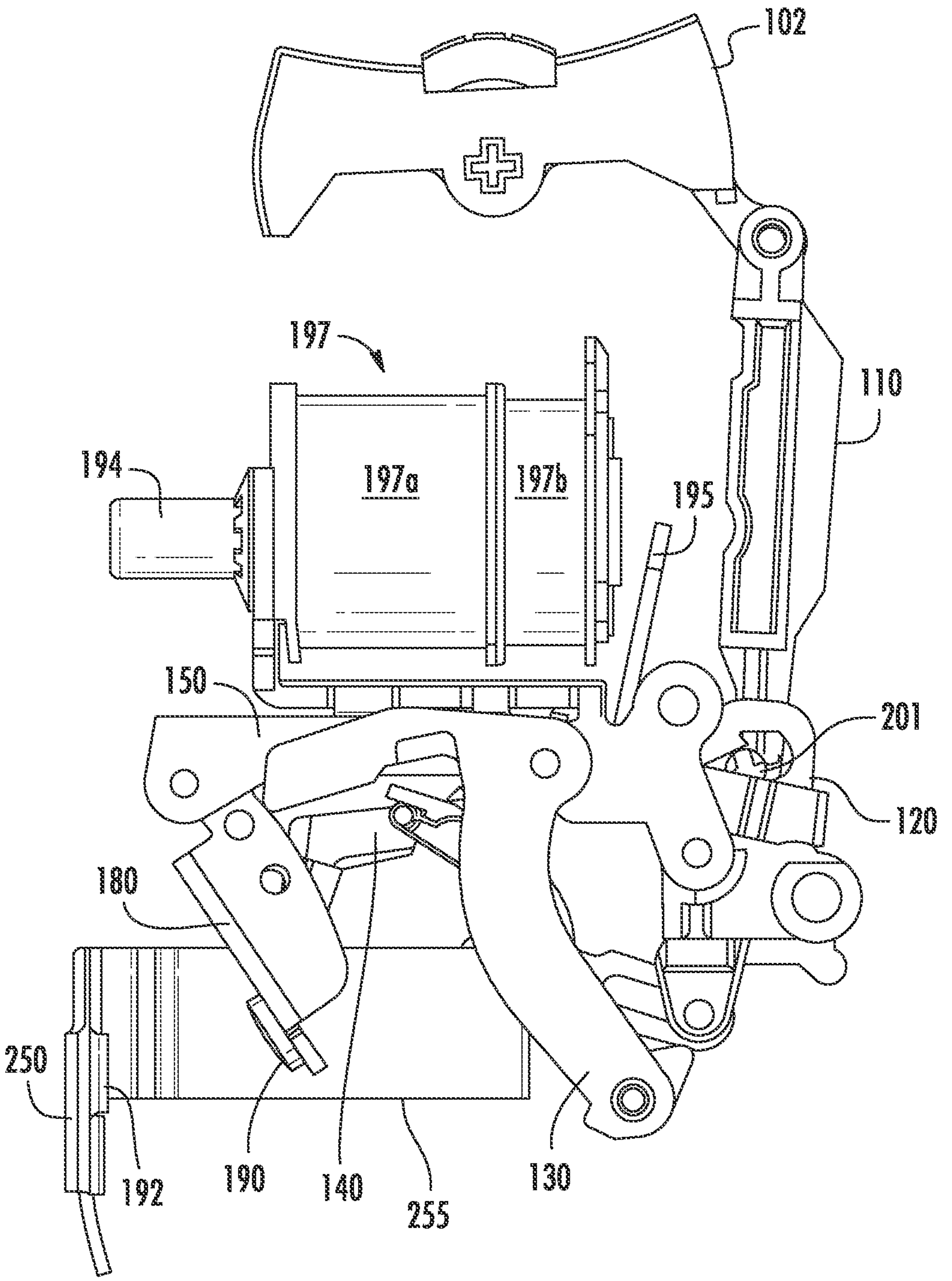
Figure 9C:
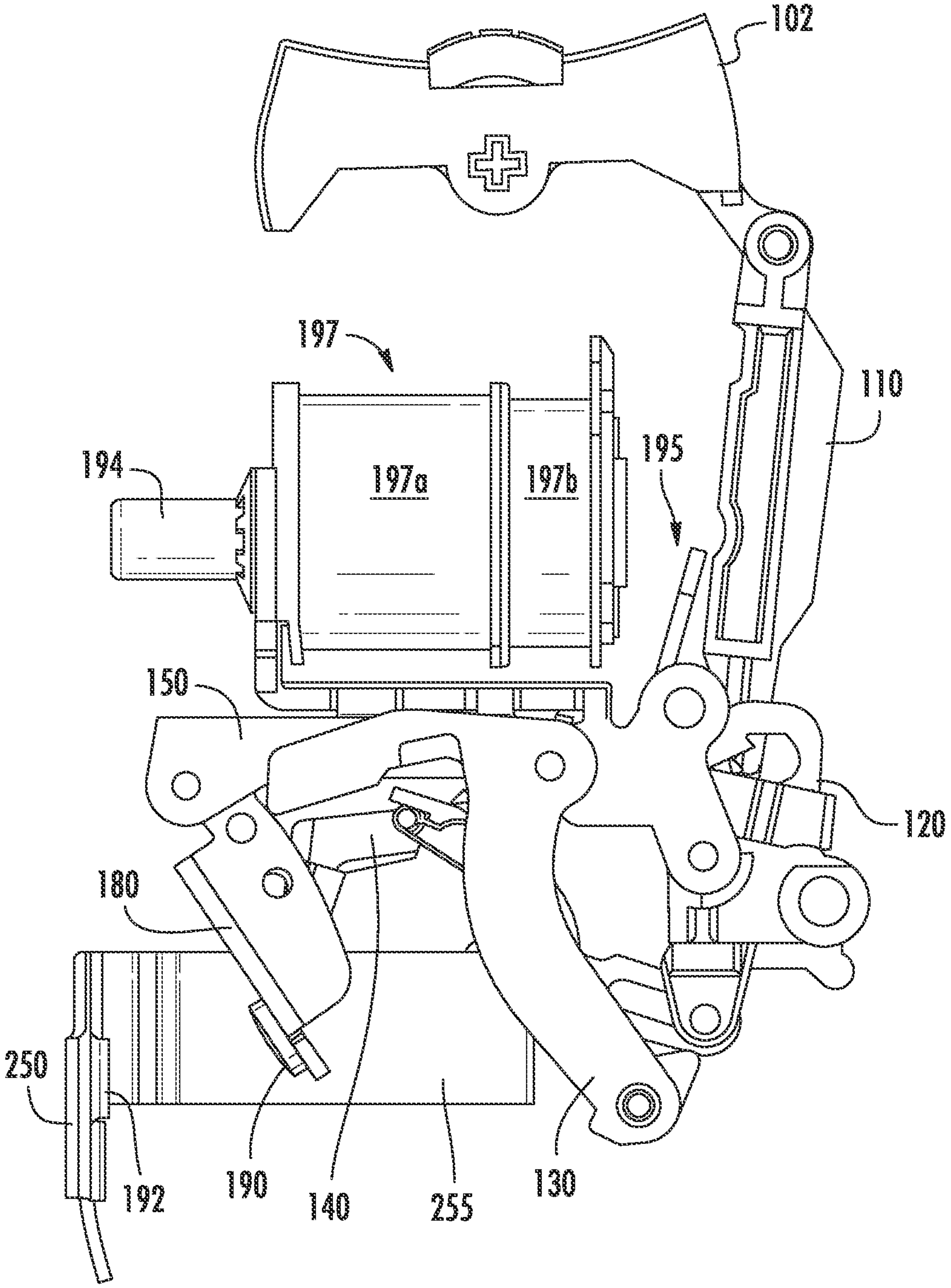

Referring to FIG. 9A, the linkage mechanism in the configuration shown in FIG. 1, where the rocker actuator 102 is in the position corresponding to the OFF configuration of the circuit breaker 100. The projections 201 are in a first position within the slots 128 of the first linkage 120. FIG. 9B illustrates the linkage mechanism in the configuration shown in FIG. 2, where the projections 201 are in a second position within the slots 128 of the first linkage 120. FIG. 9C illustrates the linkage mechanism 119 in the configuration shown in FIG. 3, where the projections 201 are in a third position within the slots 128 of the first linkage 120. The linkage also slightly swivels or rotates clockwise such that the first contact 190 moves slightly closer to the second contact 192. However, the first contact 190 and the second contact 192 still remain separated.

Figure 9D:
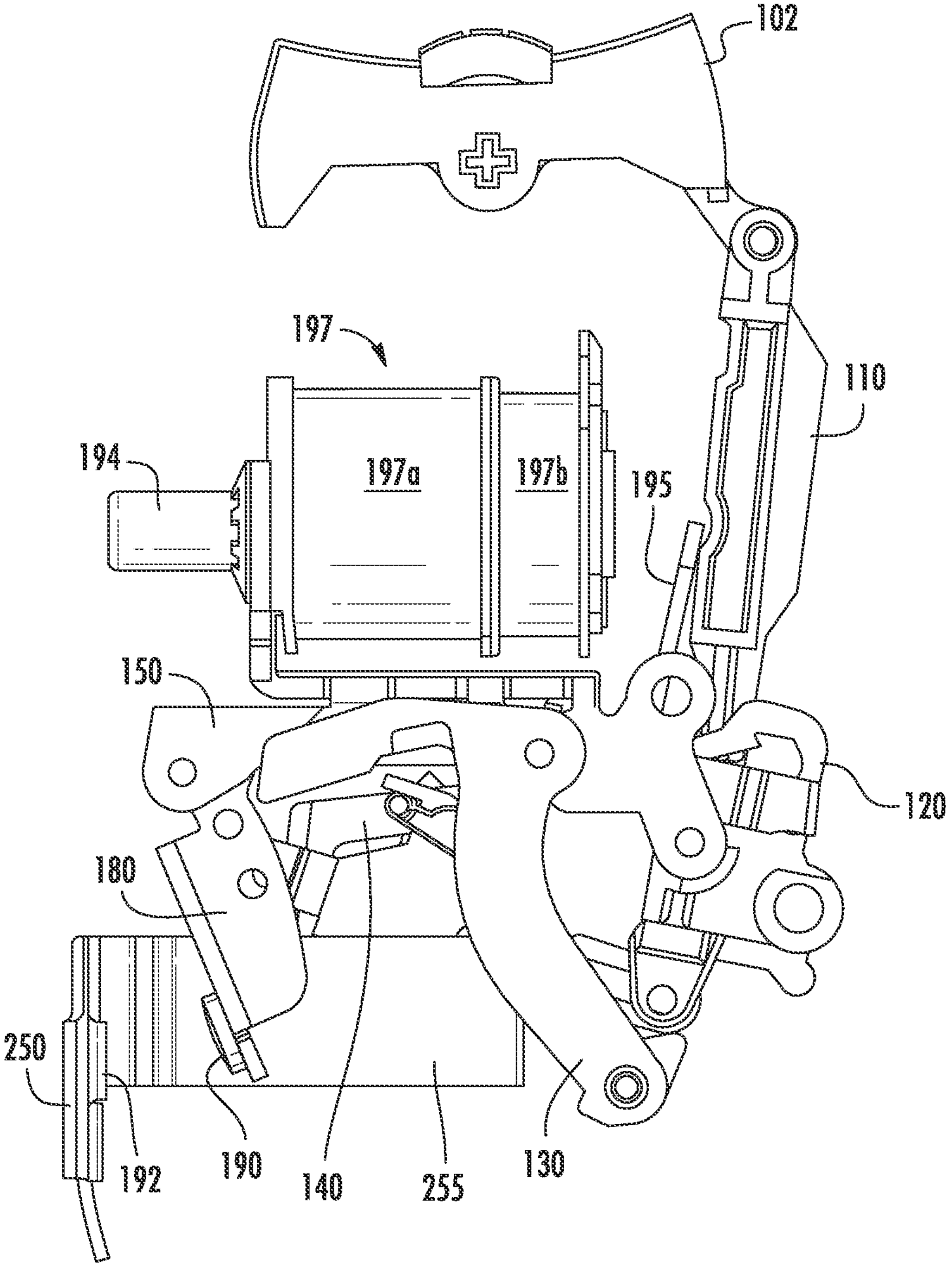
Figure 9E:
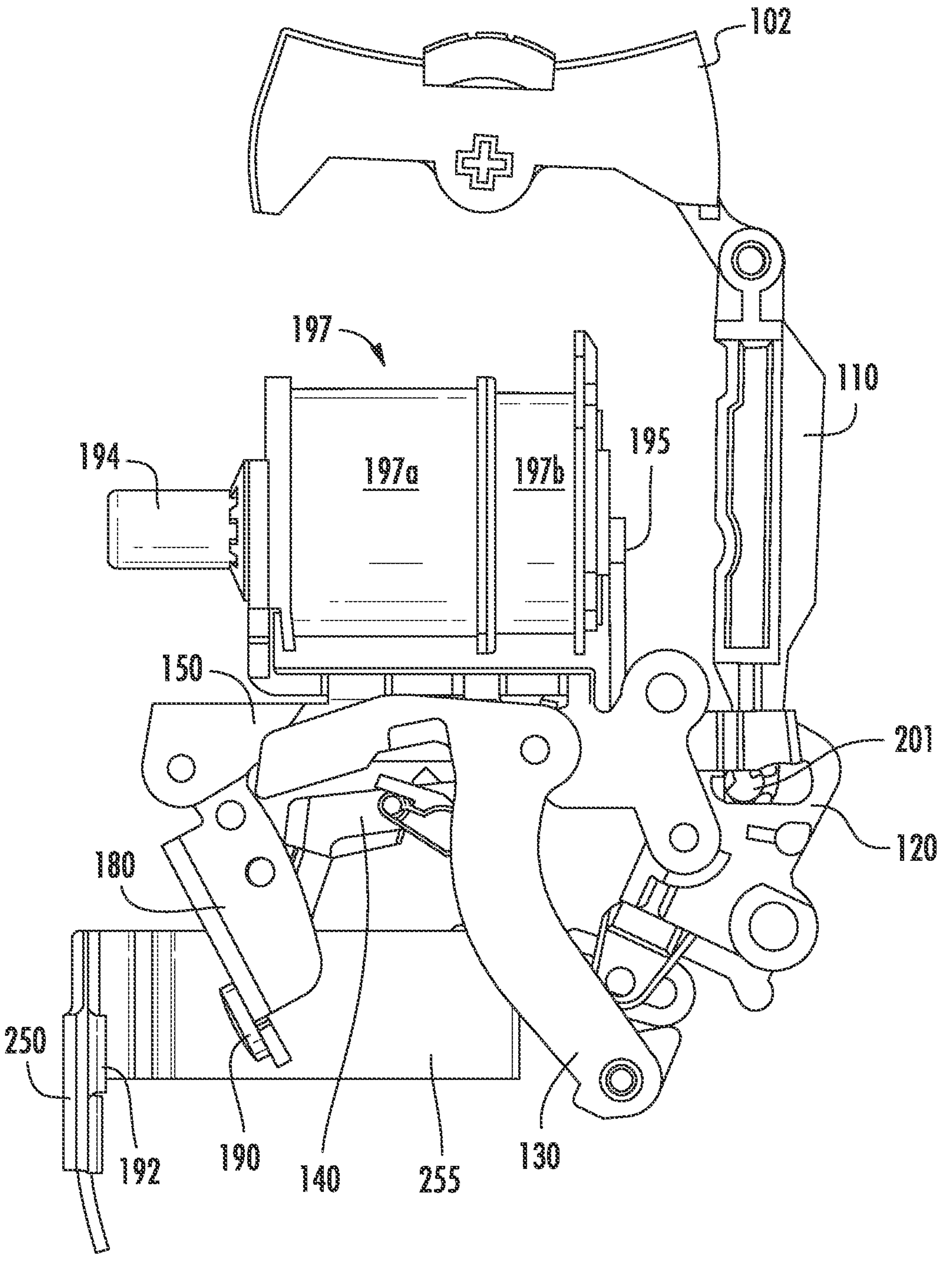

FIG. 9D illustrates the linkage mechanism in the configuration shown in FIG. 4A, where the reset lockout mechanism 10 is deactivated (i.e., cleared). The solenoid 197 is activated such that the armature 195 is rotated toward the solenoid 197. FIG. 9E illustrates the linkage mechanism in the configuration shown in FIG. 5A, where the first linkage 120 continues to swivel or rotate in a clockwise direction. The projections 201 sit in the midpoint of the slots 128. The armature 195 remains in contact with the solenoid 197 in FIGS. 9D and 9E.

Figure 9F:
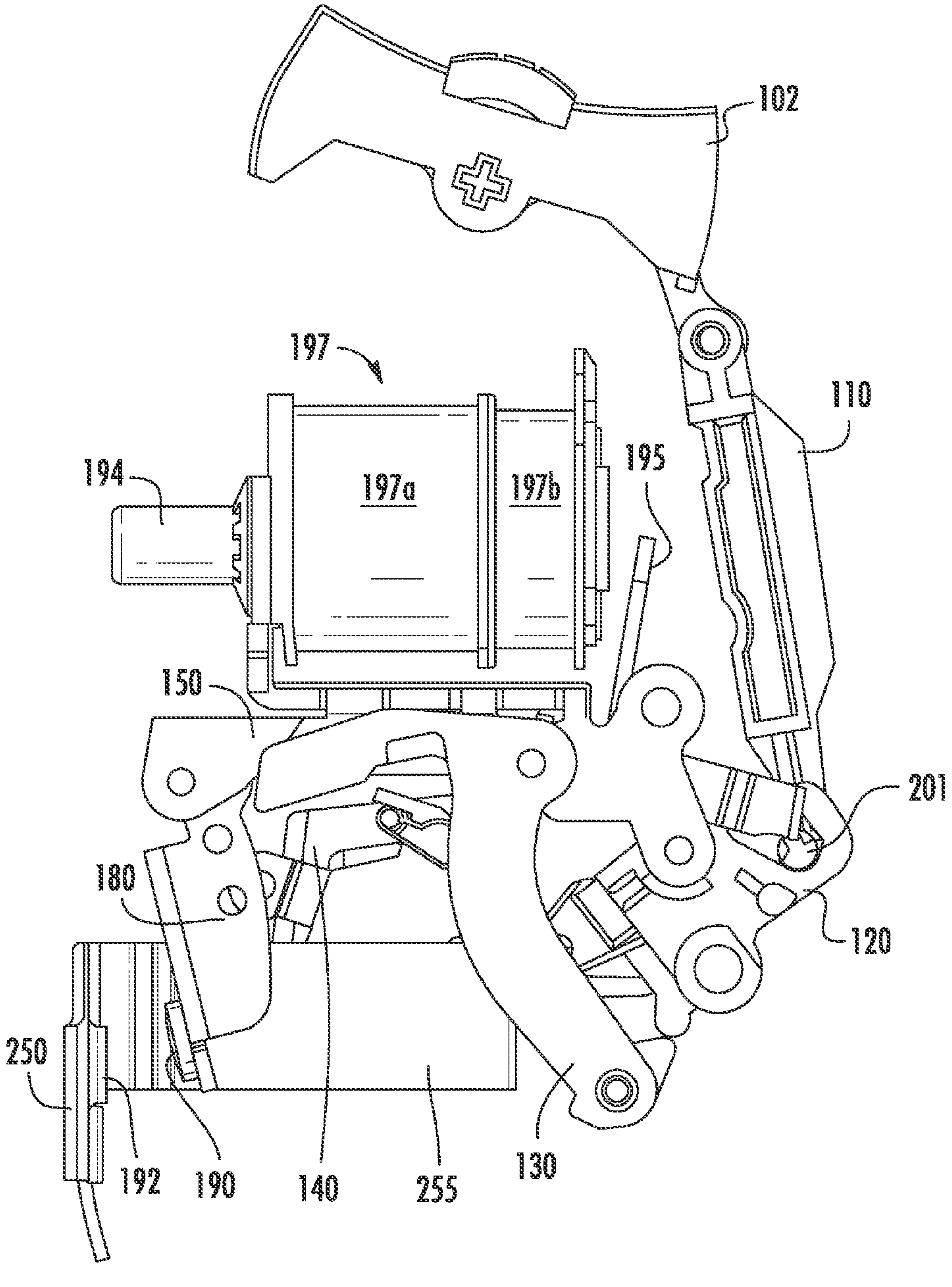

FIG. 9F illustrates the linkage mechanism 119 in the configuration shown in FIG. 6, where resetting the circuit breaker 100 by transitioning the circuit breaker 100 to the ON configuration continues. The solenoid 197 is de-energized resulting in the armature 196 being rotated away from the solenoid 197. The projections 201 slide to the rightmost position within the slots 128 of the first linkage 120.

Figure 10:
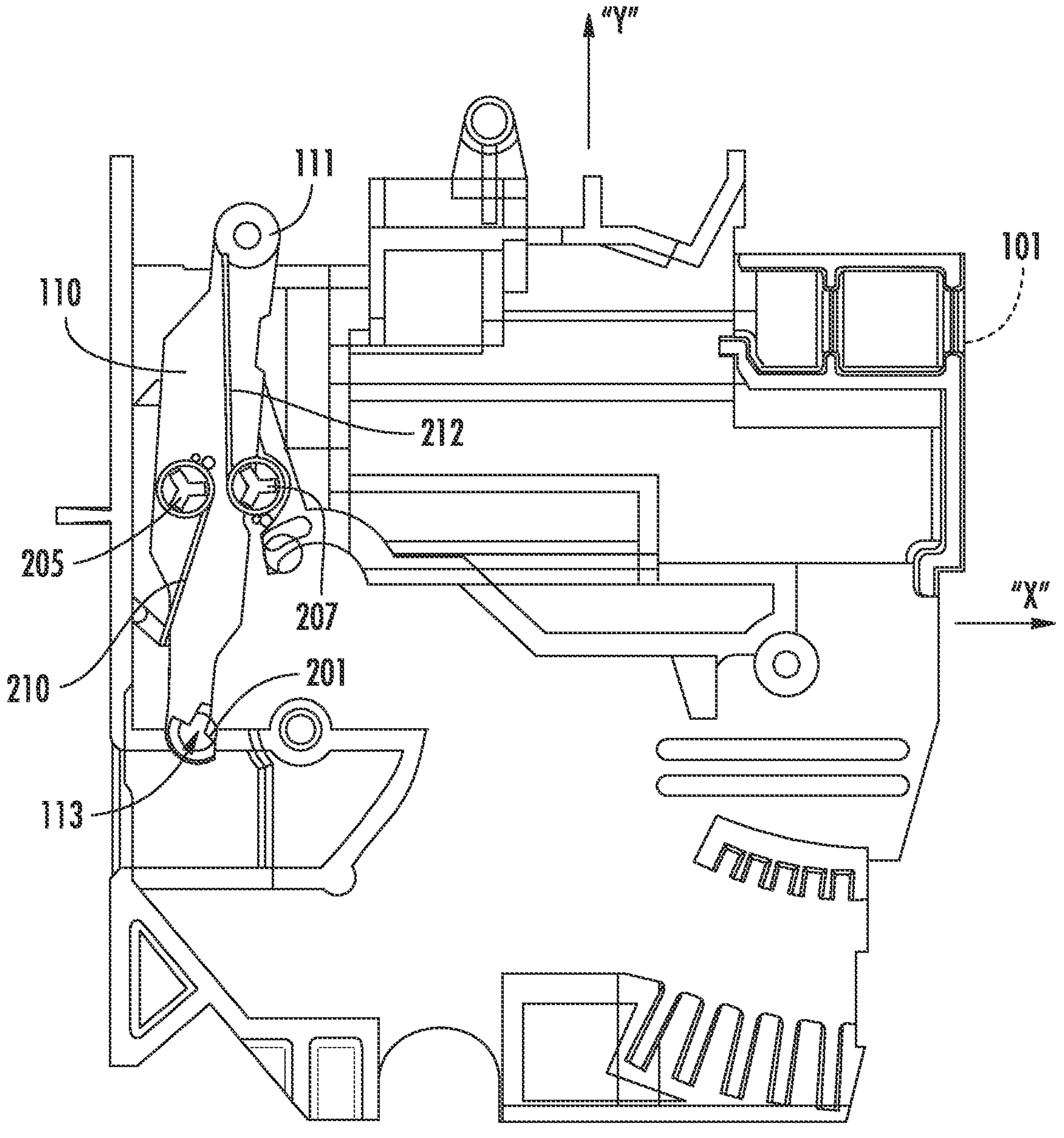
FIG. 10 is a rearview of internal components of the circuit breaker, with a housing of the circuit breaker in phantom, and depicting biasing springs disposed behind the housing and in mechanical cooperation with the latch arm also disposed behind the housing of the circuit breaker.

FIG. 10 is a side plan view of internal components of the circuit breaker 100, specifically identifying biasing springs 210, 212 in mechanical cooperation with the latch arm 110.

In FIG. 10, the housing 101 of circuit breaker 100 (illustrated translucently in FIG. 10) has a first spring post 205 and a second spring post 207 extending inwardly therefrom (e.g., perpendicularly) and facing a backside of latch arm 110. The first spring post 205 supports first spring 210 and second spring post 207 supports second spring 212. The first spring post 205 is configured to secure the first spring 210 to the housing 101 and the second spring post 207 is configured to secure the second spring 212 to the housing 101. The first spring 210 extends downward toward the latch portion 113 of the latch arm 110 and the second spring 212 extends upwards toward the link portion 111 of the latch arm 110. The first and second springs 210, 212 bias the latch arm 110 as described below.

The latch arm 110 further includes a first projection member 209 and a second projection member 211. The first projection member 209 has an outer edge 213 that interacts with the first spring 210 during a final motion to close the first and second contacts 190, 192 of the circuit breaker 100. This ensures the projections 201 of the latch portion 113 of the latch arm 110 contact/touch the toothed edge 127 of the slots 128 of the first linkage 120 after a successful reset has occurred and the circuit breaker 100 is in the ON configuration. This further ensures that the rocker actuator 102 stays biased in the position corresponding to the ON configuration (i.e. the second side 105 being depressed). The second projection member 211 interacts with the first spring 210 during an initial activation and test portion of travel of the reset lockout mechanism 10.

Figure 11:
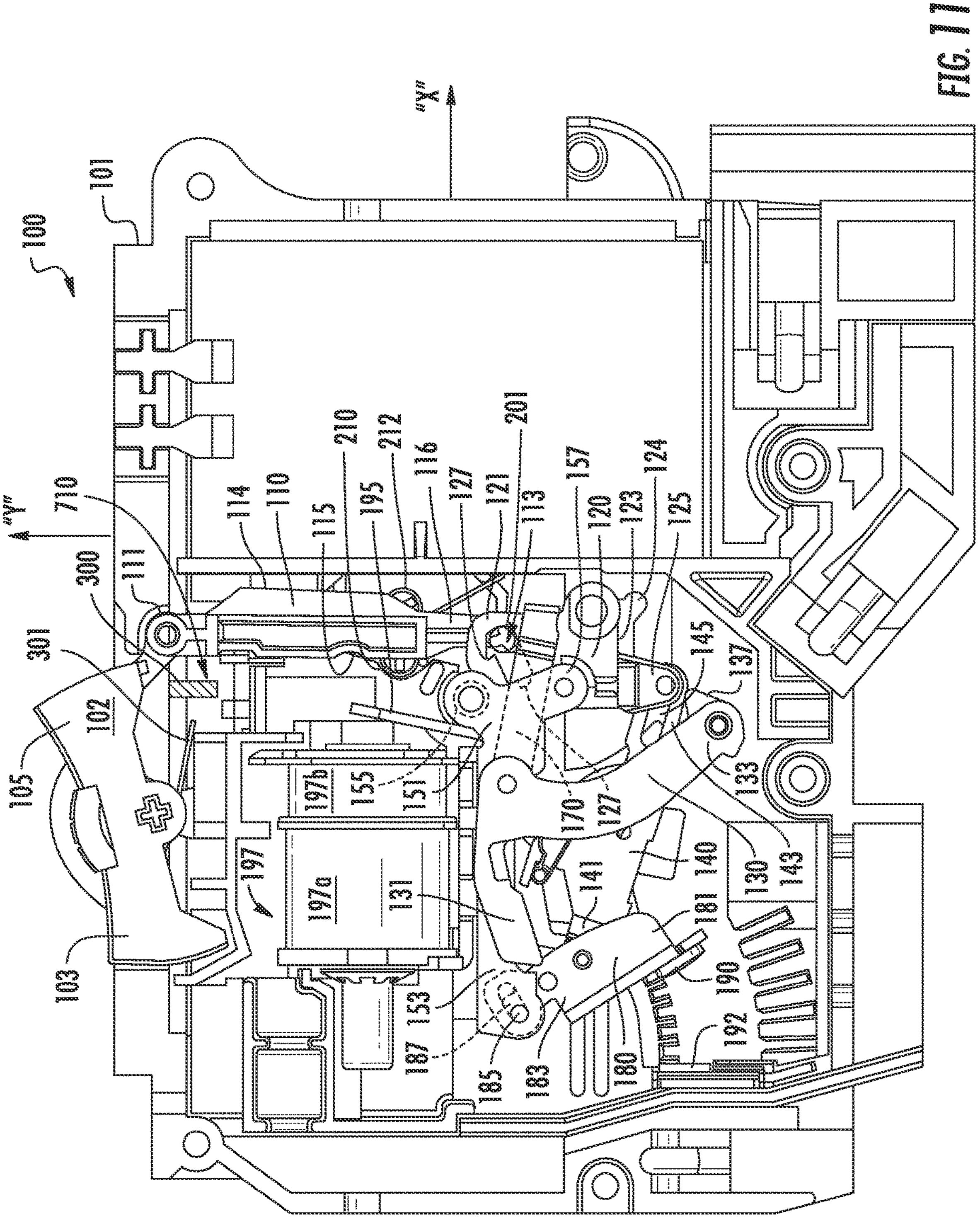
FIGS. 11-13 are front views of internal components of the circuit breaker illustrating an electrical test contact positioned within the housing.
Figure 12:
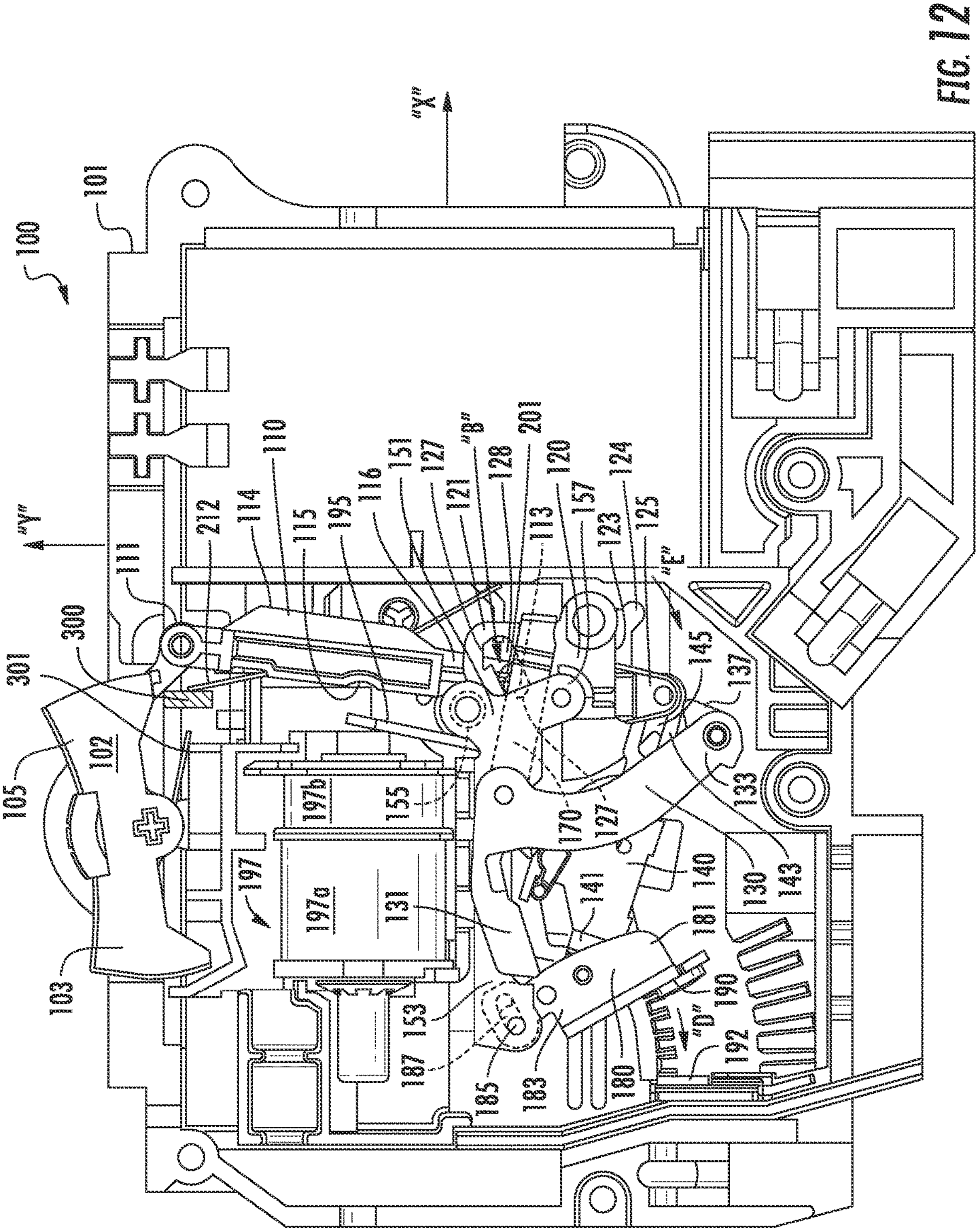
Figure 13:
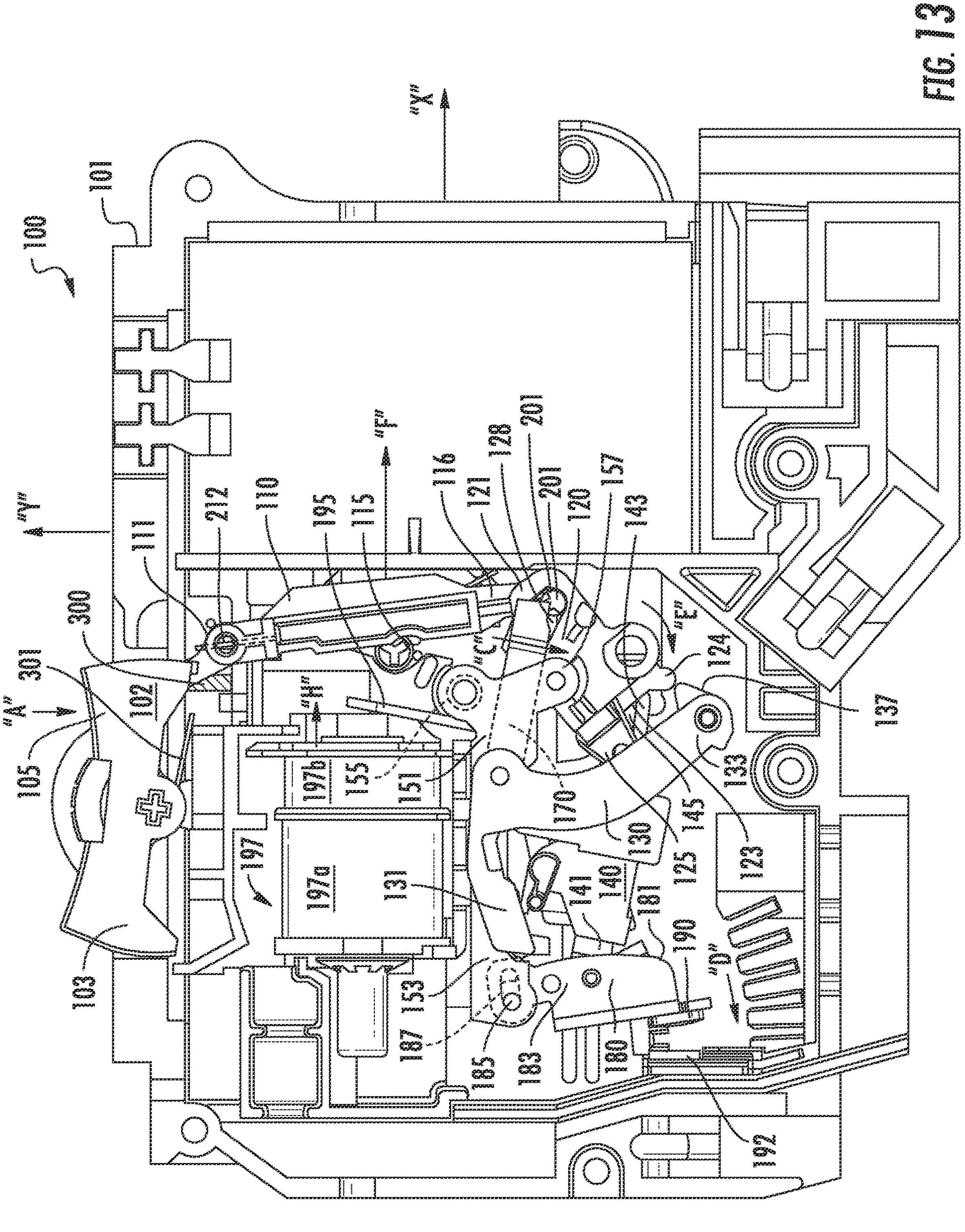
Figure 13A:
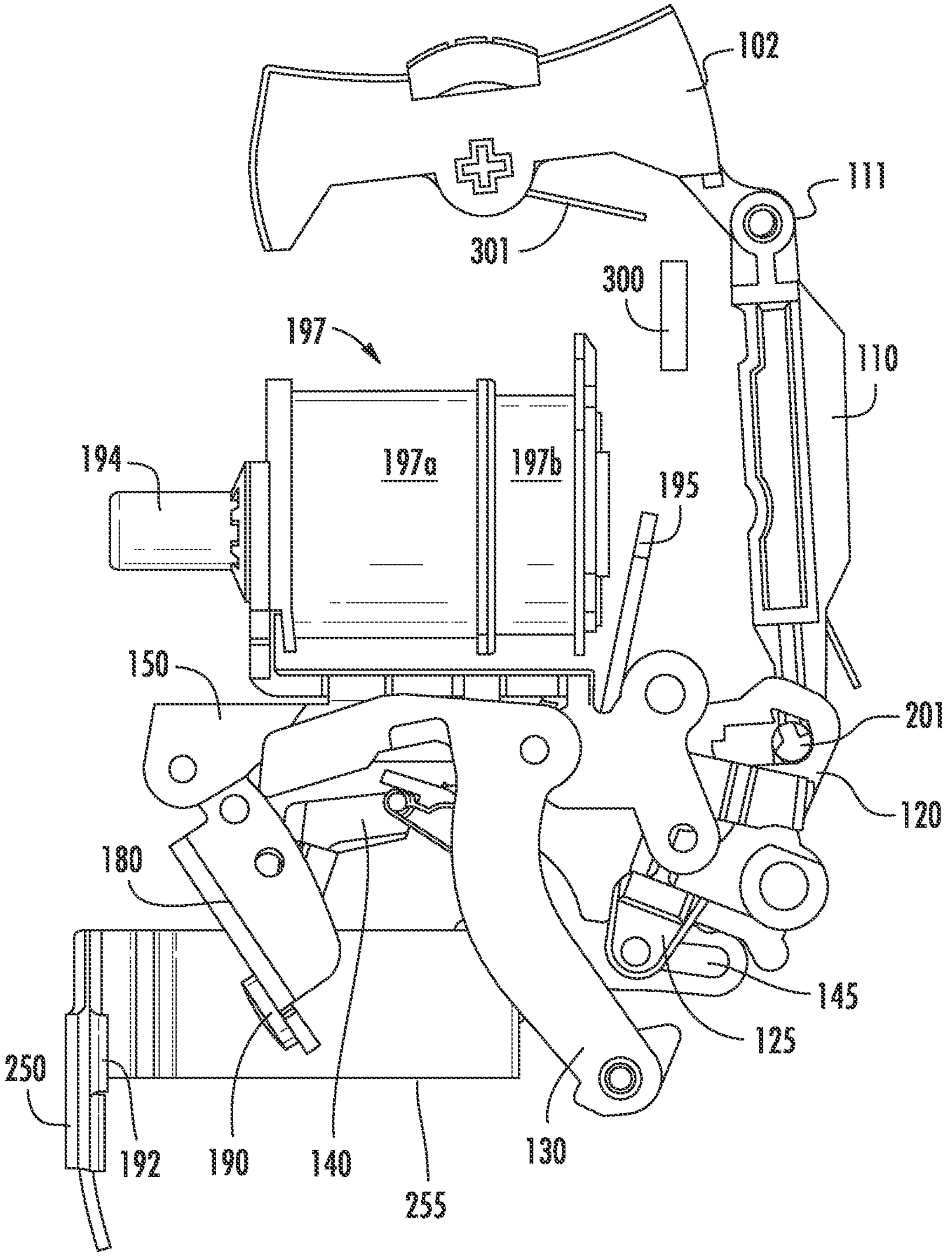
FIG. 13A is a front view of the linkage mechanism mechanically connected to the rocker actuator via the latch arm, and an electrical test contact.

With reference to FIGS. 11-13, the circuit breaker 100 has a reset switch 718*a*. The reset switch 718*a* includes an electrical test contact 300 and the second spring 212. The electrical test contact 300 and second spring 212 are positioned within the housing 101 of the circuit breaker 100. The electrical test contact 300 is positioned in proximity to the link portion 111 of the latch arm 110. In the OFF configuration of the circuit breaker 100 shown in FIG. 11, the electrical test contact 300 and second spring 212 are not touching (i.e. these two elements are in the open configuration). The rocker actuator 102 also includes a rocker spring 301.

FIG. 12 illustrates the second spring 212 contacting the electrical test contact 300 which results in activation of the reset lockout mechanism 10 as follows. Due to a continued downward force on the second side 105 of the rocker actuator 102, the projections 201 travel down the slots 128 of the first linkage 120 to create a moment on the first linkage 120. This causes the latch arm 110 to shift toward the electrical test contact 300, such that the second spring 212 of the latch arm 110 contacts the electrical test contact 300. When the second spring 212 contacts the electrical test contact 300, a test is performed, thus creating a simulated fault. At this point, the circuit breaker 100 cannot transition to the ON configuration unless the circuit breaker 100 is functioning properly.

Next, once the test is performed, if the circuit breaker 100 is functioning properly, the solenoid 197 is energized to rotate or draw the armature 195 towards the solenoid 197, as discussed above with reference to FIGS. 4A-5B. If the circuit breaker 100 is not functioning properly (e.g., if circuit interrupting portion or solenoid 197 is not functioning), the solenoid 197 will not be capable of creating a magnetic field necessary to draw the armature 195 toward the solenoid 197, and will therefore fail to rotate the armature 195. A failure of armature 195 to rotate towards solenoid 197 results in the boss 129 of first linkage 120 being continued to be captured by extension 170 of armature 195 (i.e. the interference will not be cleared). Without clearing the interference a continued application of a downward force on second side 105 of rocker actuator 102 will fail to result in a movement of linkage mechanism 119. However, if solenoid 197 is working properly, solenoid 197 will cause armature 195 and extension 170 thereof to rotate and clear the interference with boss 129 of first linkage 120 to allow linkage mechanism 119 to be actuated in response to an actuation of rocker actuator 102.

In FIG. 13, assuming solenoid 197 is functioning properly, the first linkage 120 starts to swivel or rotate to reset the circuit breaker 100 to the ON configuration. The second spring 212 no longer makes contact with the electrical test contact 300. As the first linkage 120 rotates, the projections 201 move from the leftmost position to the rightmost position within the slots 128 of the first linkage 120. The first linkage 120 continues to rotate until the MID-TRIP configuration of the circuit breaker 100 is reached, as described above with reference to FIG. 8.

Consequently, the electrical test contact 300 may be positioned within the housing 101 of the circuit breaker 100, such that the electrical test contact 300 is substantially parallel to the latch arm 110 to initiate an electrical test of the control circuit. Thus, the electrical test contact 300 ensures that the circuit breaker 100 is functioning properly before allowing power to be applied to a circuit branch. If it is determined that the control circuit does not function properly, then the circuit breaker 100 is prevented from being reset to the ON configuration. The first, second, third, and fourth linkages 120, 130, 140, 150 are mechanically connected to the rocker actuator 102 via the latch arm 110, and an electrical test contact 300.

One significant benefit of supplying line-side power (as opposed to load side power) to the circuit breaker 100, and more particularly the controller “C”, is that the circuit breaker 100 is capable of providing indications as to whether a fault, or particular condition, is present while the circuit breaker 100 is in an OFF configuration. Moreover, embodiments of the present disclosure allow for the controller “C” and the circuit interrupting portion of the circuit breaker 100 to be tested before allowing power to be applied to a branch circuit. The rocker actuator 102 may initiate the resetting and testing the mechanical and electrical functionality of the circuit breaker. Thus, in the present embodiment, there is no need for a separate user accessible test button on the housing or any other external surface of the circuit breaker 100. This allows for reduced cost and a simpler user interface. In FIGS. 11-13, the electrical test contact 300 is included within the housing of the circuit breaker 100. In other embodiments, a separate user accessible test button which allows users to manually initiate an electrical test of the controller “C” may be provided.

Figure 15A:
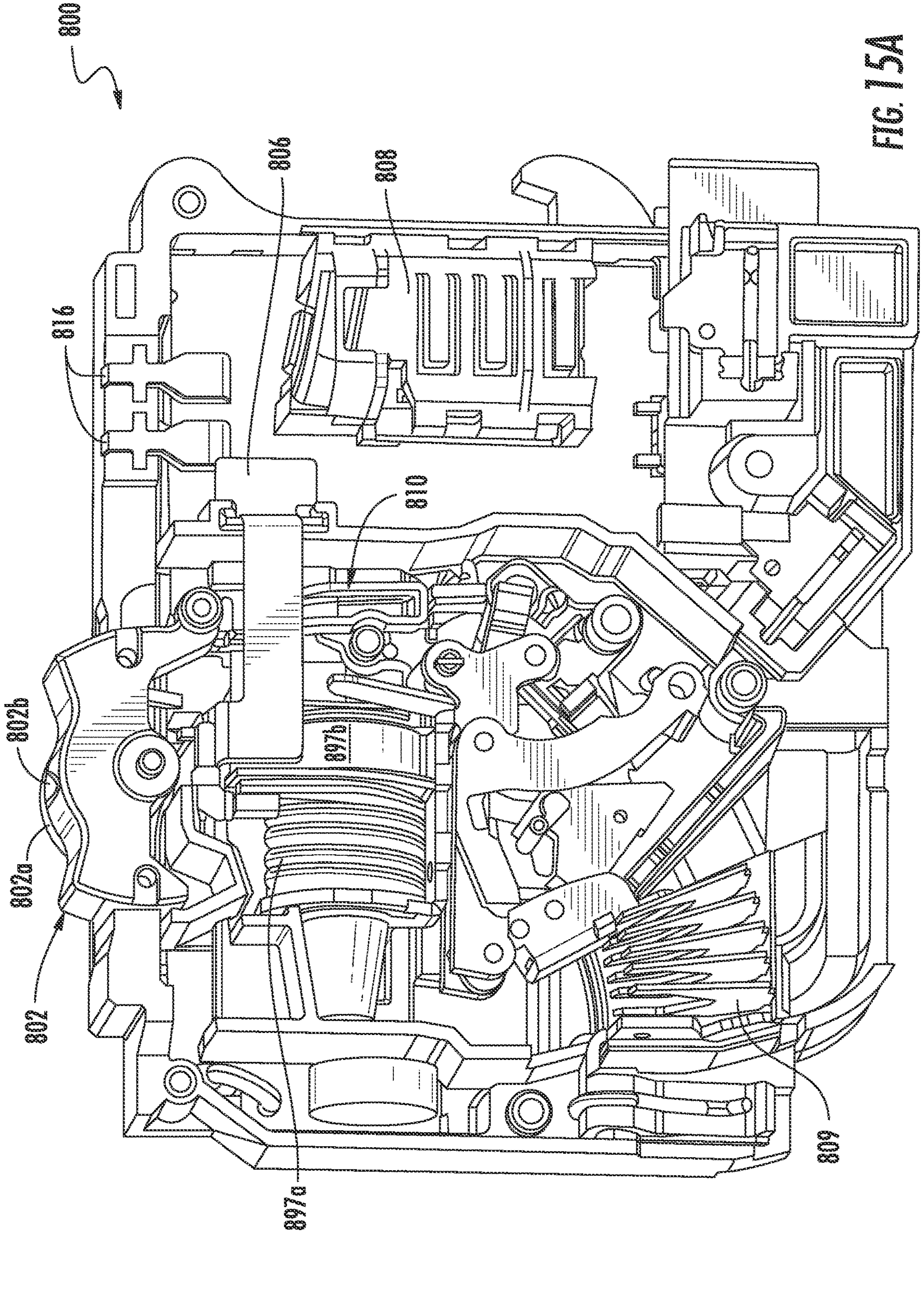
FIG. 15A is a front perspective view of internal components of another embodiment of a circuit breaker in accordance with the principles of the present disclosure.
Figure 15B:
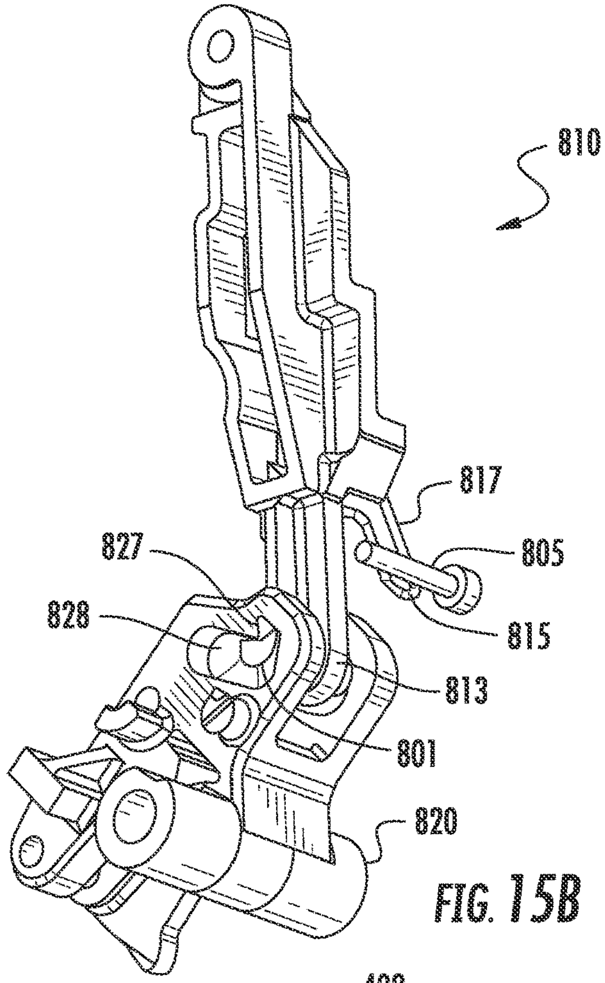
FIG. 15B is a front perspective view of a linkage mechanism of the circuit breaker of FIG. 15A.
Figure 16:
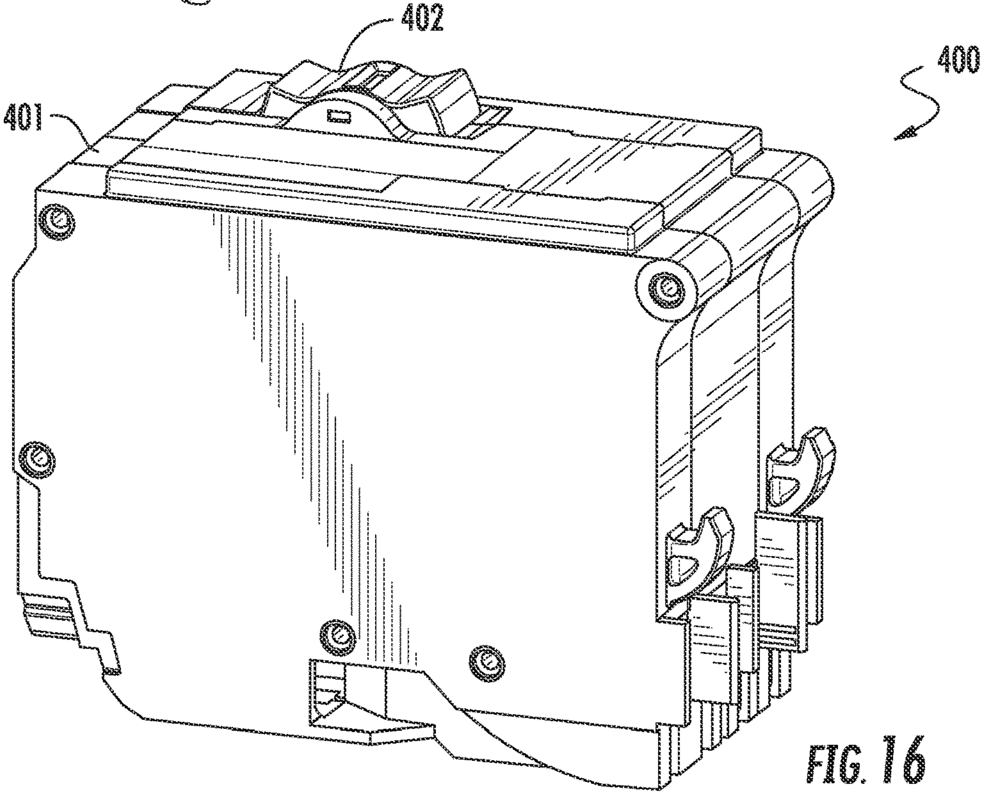
FIG. 16 is a front, perspective view of an embodiment of a multi-pole circuit breaker in accordance with the principles of the present disclosure.
Figure 17:
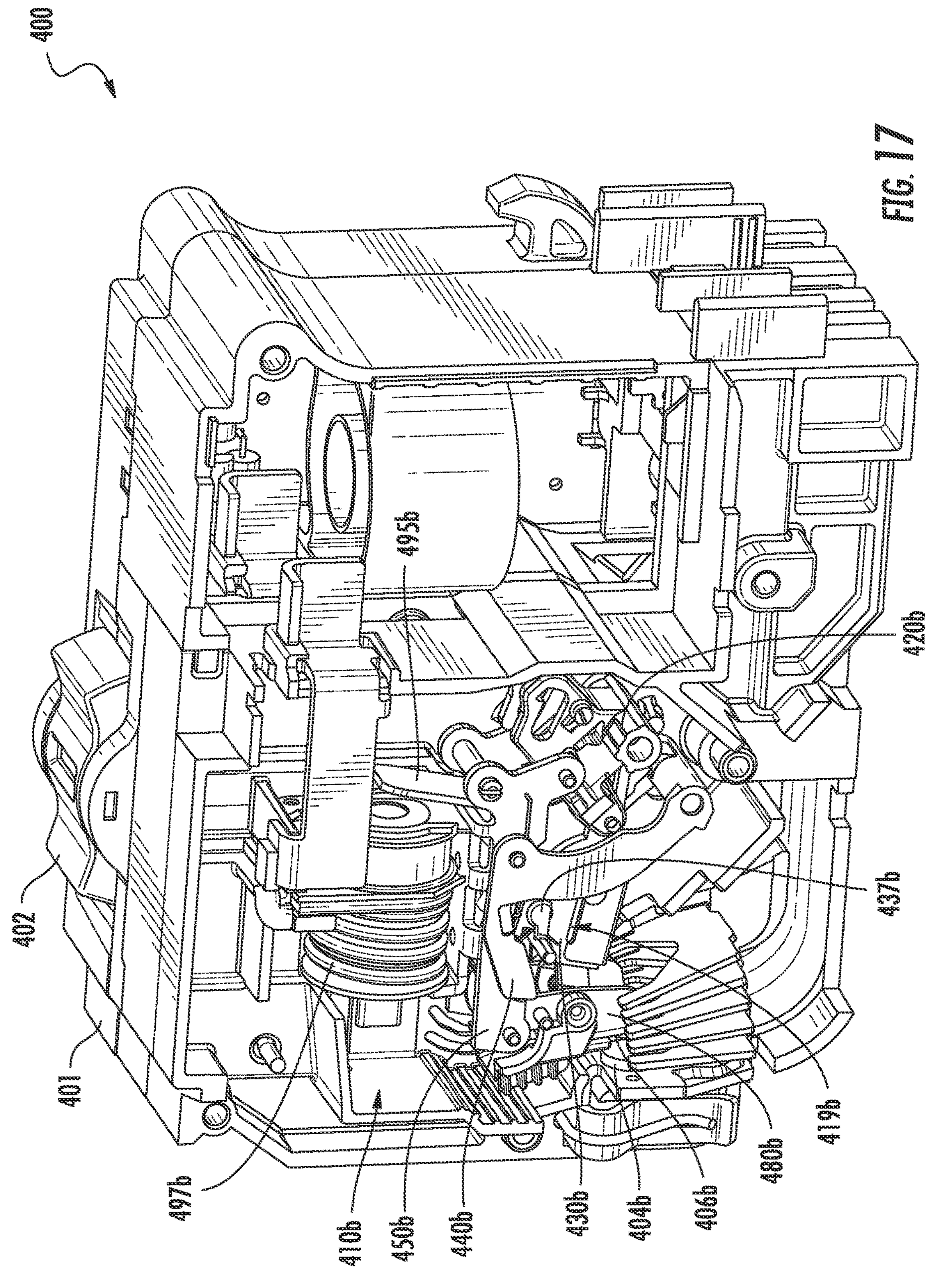
FIG. 17 is a front, perspective view, with a front portion of a housing of the circuit breaker removed, illustrating internal components of the circuit breaker of FIG. 16.

FIGS. 15A and 15B show an alternate embodiment of a circuit breaker 800, the circuit breaker 800 maintaining a construction similar to the circuit breaker 100 of FIG. 1. As such, for brevity, certain elements of the circuit breaker 800 will be described with respect to the corresponding elements of circuit breaker 100.

Referring to FIG. 15A, the shape of rocker actuator 802 has been modified with respect to rocker actuator 102 such that the central portion 802*a* of rocker actuator 802 has been enlarged to allow for a larger lens 802*b* which is configured to allow a visual indicator (e.g. an LED; not shown) to provide information to users.

A portion of the physical routing of the conductive path between the line and load terminals “LINE-T”, “LOAD-T” of the circuit breaker 800 has been modified. The current path is wound around solenoid 897 in a similar manner as the conductive path of circuit breaker 100 (omitted from the previous figures for clarity). However, after the conductive path is wound around solenoid 897, the conductive path is routed via a bus 806 (for ease of manufacturability) which, in the figures, overlies several components (including latch arm 810) of the circuit breaker 800. In contrast to the circuit breaker 800, in the circuit breaker 100, the portion of the conductive path which corresponds with bus 806 is routed via a braided wire and, in the figures, underlies several components (including the latch arm 110) of the circuit breaker 100.

The circuit breaker 800 has a transformer assembly 808 which includes one or more transformer cores (the corresponding assembly of the circuit breaker 100 is omitted from the corresponding figures for clarity). The transformer assembly 808 may include a differential transformer and a G/N transformer. The transformer assembly 808 may also include a high frequency transformer for use in arc fault detection (or any other suitable purpose). Additionally, the transformer assembly 808 may also include a current transformer with either a phase or neutral current path passing therethrough to measure the amount of current on the phase or neutral current path. The current transformer may be used for any suitable purpose such as in, for example, arc detection. The transformer assembly 808 is configured to allow the current path to pass through the cores of the transformers to put the current path in electrical communication with the transformers.

The circuit breaker 800 has a plurality of arc chutes 809 that are generally plates with cutouts in the shape of “U’s.” These arc chutes 809 are used to help dissipate arcing when the contacts are opened, which in turn, preserves the life of the contacts.

Referring to FIG. 15B, the shape of the projections 801 of latch portion 813 is generally circular with a notch. The geometry of the notch is generally the shape of a wedge. In the present embodiment, the notch is roughly one third of the area of a full circle. This is in contrast to projections 201 of the previous embodiment which includes two notches.

Slots 828, of first linkage 820 of the circuit breaker 800, are configured to receive projections 801 of latch portion 813. Slots 828 have one toothed edge 827 whereas slots 128 in the prior embodiment have two toothed edges 127.

The biasing spring 817 is configured to touch the G/N switch contact 805 similar to as described in the circuit breaker 100. In the present embodiment, biasing spring 817 has a bight 815 at its end, whereas the biasing spring 210 of the circuit breaker 100 does not have such a bight. In addition, G/N switch contact 805 in the present embodiment is in the form of a pin whereas G/N switch contact 605 is in the form of a contact pad.

Similar to the circuit breaker 100, circuit breaker 800 includes one or more indicator portions 816 to allow for visual (or other suitable) indication to a user. These indicator portions 816 may be in the form of lenses, light pipes, or the like.

With reference to FIGS. 16-21, another embodiment of a circuit breaker 400 is illustrated. In contrast to the circuit breaker 100 described above, the circuit breaker 400 of the present embodiment is a multiple-pole (e.g., two pole) circuit breaker. Due to the many shared characteristics between the multiple-pole circuit breaker 400 of the present embodiment and the single pole circuit breaker 100 of FIGS. 1-14E, only those components of the circuit breaker 400 deemed important in elucidating features that differ from the circuit breaker 100 of FIGS. 1-14E will be described in detail.

The multi-pole circuit breaker 400 includes a housing 401 and a pair of trip mechanisms 410*a*, 410*b* disposed within the housing 401. Each of the two trip mechanisms 410*a*, 410*b* are mechanically coupled to one another while also being configured to function independently of one another. In the present embodiment, the first trip mechanism 410*a* is a reset lockout mechanism and the second mechanism 410*b* is not a reset lockout mechanism. In an alternate embodiment, both trip mechanisms may include reset lockout mechanisms being substantially the same as described above. In such an alternative embodiment, the inclusion of more than one reset lockout mechanisms may result in redundancy and additional timing/delay mechanisms may be employed in connection therewith. Otherwise, since each of the two trip mechanisms 410*a*, 410*b* are similar, the first trip mechanism 410*a* corresponding to the first pole of the multi-pole circuit breaker 400 will be described in greater detail.

The circuit breaker 400 includes first and second contacts 404*a*, 404*b* fixed to the housing 401 and associated with the first and second poles, respectively, of the circuit breaker 400. The first and second contacts 404*a*, 404*b* are adjacent, and in electrical communication with, the line terminals "LINE-T". Circuit breaker 400 also includes contacts 406*a*, 406*b* that are adjacent, and in electrical communication with, the load terminals "LOAD-T".

The first and second trip mechanisms 410*a*, 410*b* each include a contact, e.g., a third contact 406*a* associated with the first trip mechanism 410*a*, and a fourth contact 406*b* associated with the second trip mechanism 410*b*. The circuit breaker 400 is in an ON state when the first and third contacts 404*a*, 406*a* of the first pole are closed (i.e., physically touching), and when the second and fourth contacts 404*b*, 406*b* of the second pole are closed. The circuit breaker is in an OFF state when the first and third contacts 404*a*, 406*a* of the first pole are opened (i.e., not physically touching), and when the second and fourth 404*b*, 406*b* contacts of the second pole are opened. Additionally, the circuit breaker 400 may be in a mid-trip state, with contacts 404*a*, 404*b*, 406*a*, 406*b* in an open configuration (i.e., the contacts 404*a*, 404*b*, 406*a*, 406*b* are not in mechanical communication, respectively).

As will be described in detail herein, the first trip mechanism 410*a* is activated when the circuit breaker 400 is in the OFF state. Since trip mechanism 410*a* is a reset lockout mechanism, when the trip mechanism 410*a* is activated the circuit breaker 400 cannot be reset to the ON state unless, preferably, all of the fault circuit interrupting portions (e.g. ground and arc fault) are operational. In the present embodiment, the circuit breaker 400 includes two circuit interrupting portions, such as, for example, two independently operable first and second solenoids 497*a*, 497*b*. Each first and second solenoid 497*a*, 497*b* is operated on different phases and has its own switching SCR.

To clear the trip mechanism 410*a* and verify that the circuit interrupting portions (e.g., first solenoid 497*a*) are operational, power is supplied to the circuitry of the circuit breaker 400 to test and activate the second solenoid 497*b* (if it is operable). As will be described in more detail below, if it is determined that the second solenoid 497*b* is operational, the first solenoid 497*a* will then be energized. If operational, the first solenoid 497*a* will then clear the trip mechanism 410*a*, thus, allowing for the circuit breaker 400 to be reset to the ON position.

The first trip mechanism 410*a* includes a rocker actuator 402, a latch arm 410, and a first linkage mechanism 419*a*. The second trip mechanism 410*b* includes a second linkage mechanism 419*b*. The rocker actuator 402 extends out of the housing 401 of the circuit breaker 400 such that a user can manually move the rocker actuator 402 to ultimately transition the circuit breaker 400 between the ON and OFF states. The latch arm 410 is operably coupled to the rocker actuator 402 and is configured to move in response to a manual actuation of the rocker actuator 402, and the rocker actuator 402 is configured for reciprocal movement in response to an actuation of the latch arm 410 in response to a fault being detected by the first and second solenoids 497*a*, 497*b*, as will be described. Movement of the latch arm 410 moves the third and fourth contacts 406*a*, 406*b* into and out of engagement with the first and second contacts 404*a*, 404*b*, respectively, via the first and second linkage mechanisms 419*a*, 419*b*.

The first and second linkage mechanisms 419*a*, 419*b* each include a respective first linkage 420*a*, 420*b*, second linkage 430*a*, 430*b*, third linkage 440*a*, 440*b*, and fourth linkage 450*a*, 450*b*, each in operable association. The first linkage 420*a* of the first linkage mechanism 419*a* mechanically cooperates with the latch arm 410. The first linkage 420*a* defines a slot 428 having received therein a projection 411 of the latch arm 410. The first linkage 420*b* of the second linkage mechanism 419*b* is mechanically coupled to the first linkage 420*a* of the first linkage mechanism 419*a* by a coupler 470. As a result, movement of the first linkage 420*b* of the second linkage mechanism 419*b* results in movement of the first linkage 420*a* of the first linkage mechanism 419*a*. As a result, movement of the first linkage 420*b* of the second linkage mechanism 419*b* causes movement of the latch arm 410 in a similar manner as movement of the first linkage 420*a* of the first linkage mechanism 419*a* would.

The second linkage 430*a* of the first linkage mechanism 419*a* mechanically cooperates with the first linkage 420*a*. Likewise, the second linkage 430*b* of the second linkage mechanism 419*b* mechanically cooperates with the first linkage 420*b*. The second linkage mechanisms 430*a*, 430*b* each include a release member 437*a*, 437*b* (described in detail above with reference to FIGS. 14A-14E), which are configured to selectively prevent movement (e.g., a collapsing) of the second linkages 430*a*, 430*b*, respectively. The second linkage 430*a* of the first linkage mechanism 419*a* is pivotally connected to a first support structure 480*a*. The first support structure 480*a* includes the third contact 406*a*, which is configured to electrically couple with the second contact 404*a* attached to the housing 401 of the circuit breaker 400, as described above.

The third linkage 440*a* of the first linkage mechanism 419*a* mechanically cooperates with the fourth linkage 450*a* of the first linkage mechanism 419*a*. The third linkage 440*a* includes a tip portion 447 (FIG. 20) configured to contact a tip 424 of the first linkage 420*a* when the circuit breaker 400 is in a mid-trip state.

The multi-pole circuit breaker 400 of the present embodiment includes first and second connectors or couplers 470, 472 interposed between the first and second linkage mechanisms 419*a*, 419*b*. The first connector 470 includes a body 470*a*, a first post 470*b* extending laterally from a first side of the body 470*a*, and a second post 470*c* extending laterally from a second side of the body 470*a*. The first post 470*b* is secured to the first linkage 420*a* of the first linkage mechanism 419*a* and the second post 470*c* is secured to the first linkage 420*b* of the second linkage mechanism 419*b*. In this way, the first linkages 420*a*, 420*b* of the first and second linkage mechanisms 419*a*, 419*b* move in synchrony. Similarly, the second connector 472 includes a body 472*a*, a first post 472*b* extending laterally from a first side of the body 472*a*, and a second post 472*c* extending laterally from a second side of the body 472*a*. The first post 472*b* is secured to the third linkage 440*a* of the first linkage mechanism 419*a* and the second post 472*c* is secured to the third linkage 440*b* of the second linkage mechanism 419*b*. In this way, the third linkages 440*a*, 440*b* of the first and second linkage mechanisms 419*a*, 419*b* move in synchrony. Therefore, when the first or second linkage mechanism 419*a* or 419*b* is actuated (e.g., due to an activation by one of the first and second solenoids 497*a* or 497*b*), the other linkage mechanism 419*a* or 419*b* will also be actuated.

The trip mechanisms 410*a*, 410*b* each include an armature 495*a*, 495*b* rotatably coupled to the respective fourth linkage 450*a*, 450*b*. The armatures 495*a*, 495*b* are movable relative to the respective first and second trip mechanisms 410*a*, 410*b*. Armature 495*a* includes an extension 476 and a projection 478*a*. As described above (e.g., with reference to FIGS. 12 and 13), the extension 476 and projection 478*a* of the armature 495*a* mechanically interact with a boss 422 (FIG. 19) of the first linkage 420*a* to selectively lock the trip mechanism 410*a*, preventing the circuit breaker 400 from moving out of the OFF state until the extension 476 disengages from the boss 422 of the first linkage 420*a*. In contrast to the armature 495*a* of the first trip mechanism 410*a*, the armature 495*b* of the second trip mechanism 410*b* does not include an extension such that the first trip mechanism 410*a* is solely responsible for preventing the circuit breaker 400 from moving out of the OFF state. In some embodiments, each of the armatures 495*a*, 495*b* of the trip mechanisms 410*a* 410*b* may have an extension for selectively preventing the circuit breaker 400 from moving out of the OFF state. The projections 478*a*, 478*b* of the armatures 495*a*, 495*b* facilitate tripping of the circuit breaker 400, as will be discussed further below.

Figure 18:
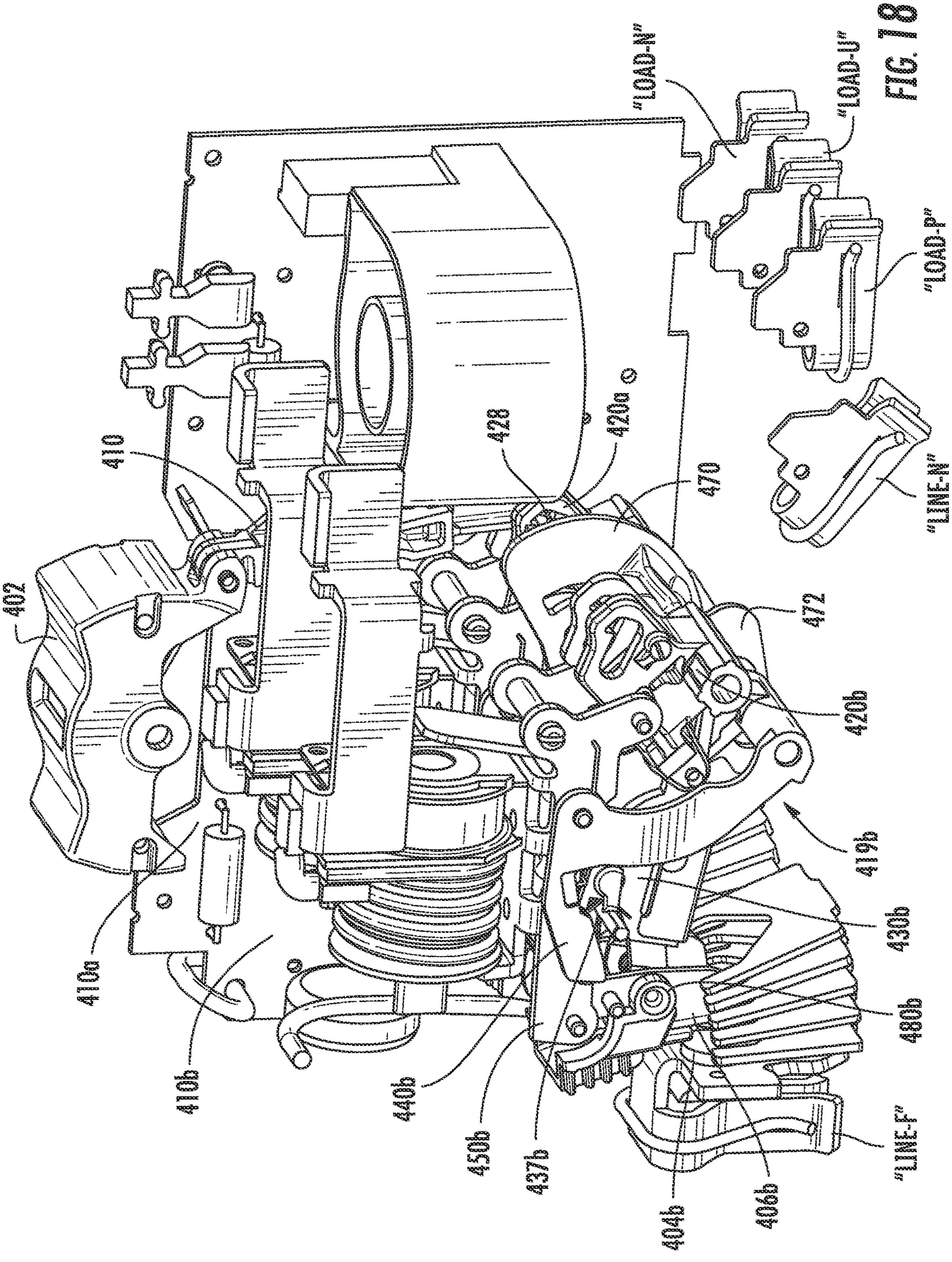
FIG. 18 is a front, perspective view, with the housing of the circuit breaker removed, illustrating the internal components of the circuit breaker of FIG. 16.
Figure 19:
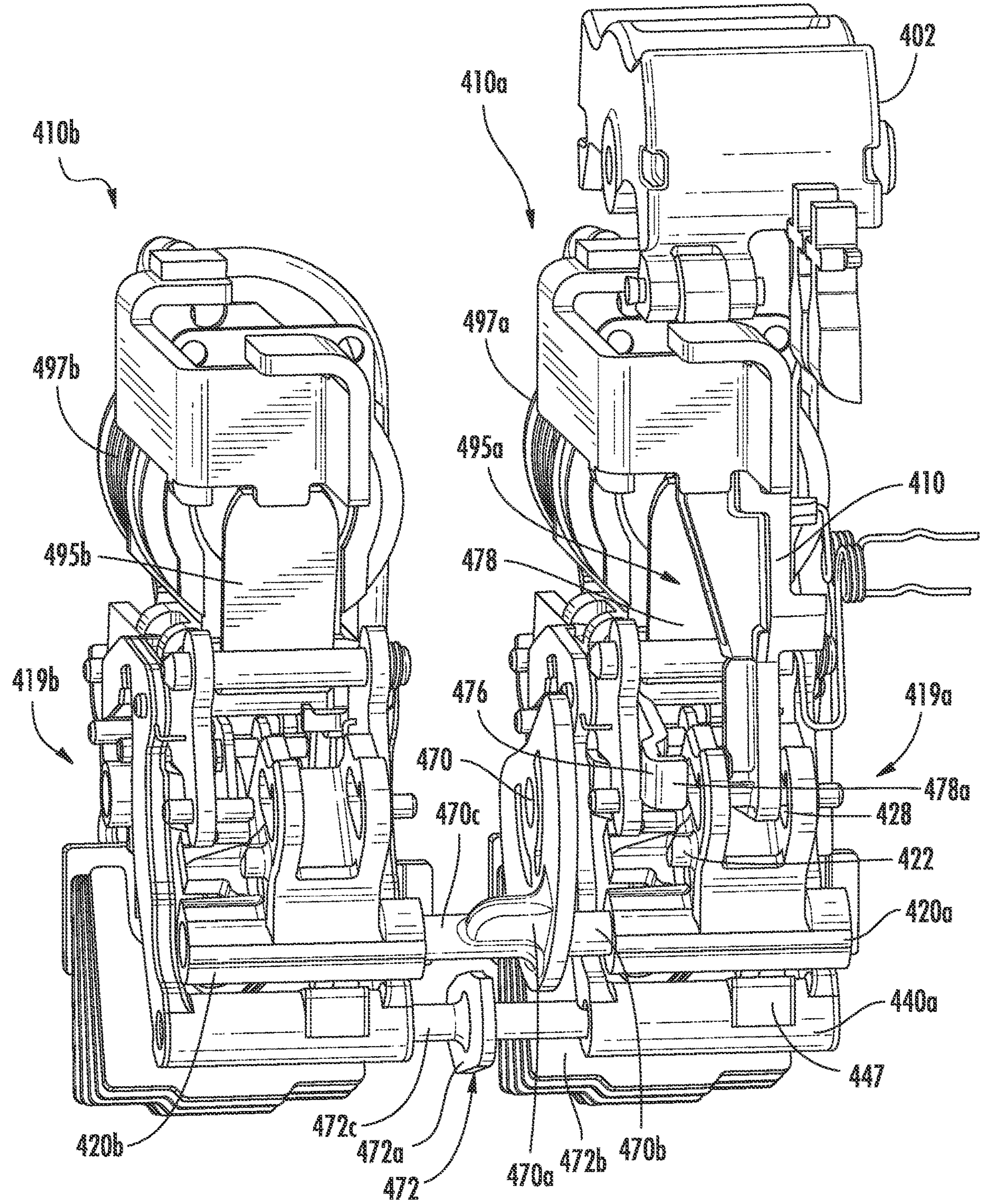
FIG. 19 is a side view of the internal components of the circuit breaker shown in FIG. 18.
Figure 20:
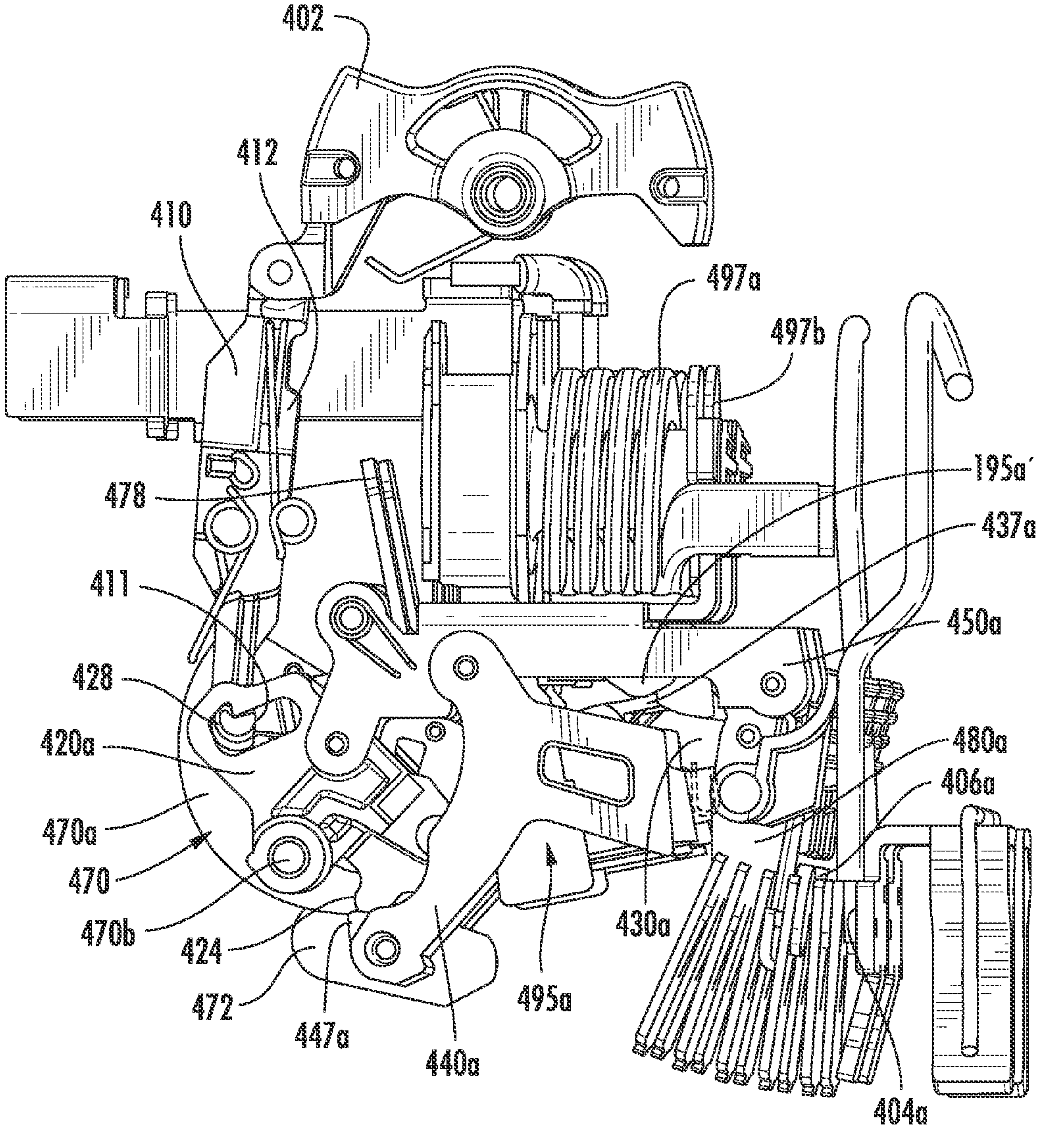
FIG. 20 is a rear view of the internal components of the circuit breaker of FIG. 18.

With continued reference to FIGS. 18-20, when an AFCI fault, a GFCI fault, or an overcurrent condition is present, the circuit breaker 400 transitions from the ON state to the mid-trip state. Depending on which of the poles a fault or overcurrent condition occurs on, trip mechanism 410*a*, trip mechanism 410*b*, or both may cause the circuit breaker 400 to transition from the ON state to the mid-trip state. For example, upon the occurrence of a fault or overcurrent condition on the first pole, the first solenoid 497*a* is activated such that the armature 495*a* of the trip mechanism 410*a* is rotated toward the first solenoid 497*a* due to, magnetic attraction between the armature 495*a* and the first solenoid 497*a*. In turn, the projection 195*a*' of the armature 495*a* moves downward and pushes on the release member 437*a* to move the release member 437*a* out of locking engagement with the second linkage 430*a* so that the release member 437*a* is no longer physically preventing the second linkage 430*a* from collapsing about a central pivot axis thereof. With the release member 437*a* no longer locking the second linkage 430*a* a biasing member drives a rotation or collapsing of the second linkage 430*a* thereby shifting the first support structure 480*a* away from the first contact 404*a*.

More specifically, since the third contact 406*a* is coupled to the first support structure 480*a*, as the first support structure 480*a* moves away from the first contact 404*a*, the third contact 406*a* is disengaged from the first contact 404*a* to open the first pole of the circuit breaker 400. As described above, the first and second connectors or couplers 470, 472 are interposed between the first and second linkage mechanisms 419*a*, 419*b*. As such, the first linkages 420*a*, 420*b* move in synchrony and the third linkages 440*a*, 440*b* of the first and second linkage mechanisms 419*a*, 419*b* also move in synchrony. Thus, when trip mechanism 410*a* is activated, corresponding activation of trip mechanism 410*b* occurs simultaneously and is caused by first and second connectors or couplers 470, 472 which causes the second pole of the circuit breaker 400 to open. When first and second poles of the circuit breaker 400 are opened, the circuit breaker 400 is in the mid-trip state and unable to transfer power.

As the second linkage 430*a* collapses, the second linkage 430*a* moves the first linkage 420*a*. The movement of the first linkage 420*a* of the first linkage mechanism 419*a* causes upward motion in of the latch arm 410 (via latch portion 411) which in turn causes the rocker actuator 402 to move toward a mid-trip state, visibly identifiable by a user by the position of the rocker actuator 402, a mechanical flag (e.g. one or more color, text indicia, etc.), or other suitable indicator.

Similarly, upon the occurrence of a fault or overcurrent condition on the second pole, the second solenoid 497*b* is activated causing the armature 495*b* to rotate and move the release member 437*b* out of locking engagement with the second linkage 430*b*. This in turn results in the collapsing of the second linkage 430*b* thereby shifting the first support structure 480*b* away from the second contact 404*b*.

Since the first linkages 420*a*, 420*b* move in synchrony and the third linkages 440*a*, 440*b* also move in synchrony, when trip mechanism 410*b* is activated, corresponding activation of trip mechanism 410*a* occurs simultaneously and is caused by first and second connectors or couplers 470, 472 which causes the first pole of the circuit breaker 400 to open. When both first and second poles of the circuit breaker 400 are opened, the circuit breaker 400 is in the mid-trip state and unable to transfer power.

As the circuit breaker 400 transitions toward the mid-trip state (via actuation of either or both of the first and second trip mechanisms 410*a*, 410*b*), the extension 476 of the armature 495*a* mechanically interacts with the boss 422 of the first linkage 420*a* to selectively lock the trip mechanism

410*a*, preventing the circuit breaker 400 from moving out of the mid-trip state toward the ON state until the extension 476 disengages from the boss 422 of the first linkage 420*a*.

To move the circuit breaker 400 out of the mid-trip state, a force is applied to the rocker actuator 402 to move the circuit breaker to the position corresponding to the OFF state. Then, the rocker actuator 402 can be moved from the position corresponding to the OFF state to towards the position corresponding to the ON state. By moving the rocker actuator 402 as such, a spring 412 of the latch arm 410 is caused to contact an electrical test contact (not explicitly shown). When the spring 412 contacts the electrical test contact, a test circuit is energized by a controller "C," thus creating a simulated fault. At this point, the circuit breaker 400 is not resettable unless the circuit breaker 400 is functioning properly.

Upon the test circuit being energized, if the circuit interrupter 400 and its components are operational (e.g., to detect and respond to the simulated fault), the SCR associated with the second solenoid 497*b* is activated. After activating the SCR, the controller "C" (FIG. 7D) monitors a voltage across the SCR associated with the second solenoid 497*b*. If the voltage does not change then the SCR associated with the second solenoid 497*b* is not functioning, the second solenoid 497*b* is defective/broken, or the circuit breaker 400 does not have this phase present. In this scenario, the circuit breaker 400 does not activate the first trip mechanism 410*a* and will remain in the OFF state.

If the circuit breaker 400 measures a voltage drop during activation of the SCR associated with the second solenoid 497*b*, the SCR associated with the first solenoid 497*a* is activated. If the SCR and the first solenoid 497*a* are operational, the trip mechanism 410*a* is cleared (as described below) and the circuit breaker 400 can be reset to the ON state (as also described below). In this way, the two pole circuit breaker 400 of the present embodiment fully tests its components and is prevented from being reset if its GFCI or AFCI components are not operational.

More particularly, if the circuit interrupter 400 is operational and the first solenoid 497*a* is functioning properly, the first solenoid 497*a* is energized to rotate the armature 495*a* towards the first solenoid 497*a* in a similar manner as when the circuit breaker 400 is tripped from the ON state. If the circuit breaker 400 is not functioning properly (e.g., if circuit interrupting portion or first solenoid 497*a* is not functioning), the first solenoid 497*a* will not be capable of energizing, and will therefore fail to rotate the armature 495*a*.

A failure of the armature 495*a* to rotate towards first solenoid 497*a* results in the boss 422 of first linkage 420*a* being continued to be captured by extension 476 of armature 495*a* (i.e. the interference will not be cleared). Without clearing the mechanical engagement of the boss 422 with the extension 476, an application of a downward force on the rocker actuator 402 toward the ON state will fail to result in a movement of the first linkage mechanism 419*a* and not transition the circuit breaker 400 from the OFF state to the ON state. However, if solenoid 497*a* is working properly, first solenoid 497*a* will cause armature 495*a* and extension 476 thereof to rotate and clear the interference with boss 422 of first linkage 420*a* to allow first linkage mechanism 419*a* to be actuated in response to an actuation of rocker actuator 402.

With the circuit breaker 400 having been successfully tested, the first solenoid 497*a* is de-energized resulting in the armature 495*a* being rotated away from the first solenoid 497*a* due to the action of a biasing member (not explicitly shown). When the armature 495*a* is rotated away from the first solenoid 497*a*, the extension 476 of the armature 495*a* moves. Continued downward pressure on the rocker actuator 402 towards the ON state causes the first linkage 420*a* to swivel or rotate further. The swiveling or rotating movement of the first linkage 420*a* causes the second linkage 430*a* to shift to the left and to rotate further counterclockwise, thus causing the first support structure 480*a* to swivel or rotate, such that the third contact 406*a* approaches and ultimately physically touches the first contact 404*a* putting the first pole of the circuit breaker 400 in the ON state. Since the first linkage 420*a* of the first pole is mechanically coupled to the first linkage 420*b* of the second pole, the fourth contact 406*b* is also caused to move toward and ultimately touch the second contact 406*a* of the second pole putting the second pole of the circuit breaker 400 in the ON state.

In the present embodiment, since the SCR and solenoid for each of the two poles are powered by their respective poles, if either one of the two poles is deenergized, the circuit breaker 400 will not be capable of transitioning to the ON state. In an alternative embodiment, both SCR's and solenoids may be powered by the same pole. In this embodiment, the voltage of the other pole would be monitored so that the circuit breaker would not be capable of transitioning to the ON state if voltage is not present on the other pole. In a further alternative embodiment, a single SCR and a single solenoid may be employed in the circuit breaker to actuate the mechanism for both poles. In this embodiment, the single SCR and single solenoid may be powered by either one or both poles.

Each of the first and second solenoids 497*a*, 497*b* operates on a different phase of the circuit breaker 400 and has its own switching SCR (not shown). During resetting, the circuit breaker 400 does a self-test and activates the SCR only if the self-test is successful. Only one side of the circuit breaker 400 removes the lock (i.e., the extension 476 disengages the boss 422 of the first linkage 420*a*) allowing the circuit breaker 400 to be reset when activated. Accordingly, other side power components (e.g., the second solenoid 497*b* and its associated SCR) are not tested during a manual retest.

To complete a self-test, a second SCR associated with the second solenoid 497*b* is activated from a non-controlling side of the circuit breaker 400. After activating the SCR, a controller (not shown) monitors a voltage of the SCR. If the voltage does not change then the SCR is not functioning, the solenoid 497*b* is defective/broken, or the circuit breaker 400 does not have this phase present. In this scenario, the circuit breaker 400 does not activate the first, main phase controlling reset lockout mechanism 410*a* and will remain in the TRIPPED state.

In the alternative scenario, if the circuit breaker 400 measures a voltage drop during the activation of the second SCR (indicating the second solenoid 497*b* is operational), the first SCR associated with the first solenoid 497*a* is activated. If the first, main SCR and the solenoid 497*a* are operational, the reset lockout mechanism 410*a* is removed (as described above) and the circuit breaker 400 can be reset to the ON state (as also described above). In this way, the two pole circuit breaker 400 of the present embodiment does a full test of its power components and blocks itself from being reset if any of the power components are not operational.

With reference to FIG. 22, another embodiment of a circuit breaker 500 is illustrated. Circuit breaker 500 may either be the a single pole circuit breaker, similar to the circuit breaker 100 of FIGS. 1-14E, or a multi-pole circuit breaker, similar to the circuit breaker 400 of FIGS. 16-20.

The circuit breaker 500 of the present embodiment provides user of the circuit breaker 500 an indication of a cause of a tripping of the circuit breaker 500. In particular, the circuit breaker 500 includes lights, such as, for example, LEDS 503 disposed on a housing 501 of the circuit breaker, which are configured to illuminate or flash upon the occurrence of any suitable predetermined condition or event, such as but not limited to a "mis-wiring" of the neutral conductor.

A potential wiring mistake when wiring GFCI, AFCI, or combination AFCI/GFCI circuit breakers occurs with the neutral wire connection. Standard mechanical breakers do not require the neutral connection at the breaker, so this is a relatively new requirement for electricians to be aware of and to satisfy. Issues that may arise when installing an AFCI, GFCI, or AFCI/GFCI circuit breaker, such as, for example, the circuit breakers 100, 400, or 500 of the present disclosure, include a connection of a branch circuit neural conductor to a system ground (e.g. a grounded neutral fault), a neutral for circuit breaker 500 being connected to a neutral bus bar (e.g. of the panel), or an unintended connection between the neutrals of two or more branch circuits (a shared neutral), neutral conductors connected to the different breaker than the corresponding phase conductors (e.g. swapped neutral).

For example, in the case of an AFCI, GFCI, or AFCI/GFCI circuit breaker 500 introduced into an existing home, a common cause of tripping will be that the neutral of the branch circuit connected to the circuit breaker 500 being unintentionally connected to a neutral of different branch circuit. The two common places this unintentional connection of neutrals would occur are at a switch electrical box where more than one branch circuit is present, or in a 3-way switch system where the neutral for the light(s) has been borrowed (improperly) from another branch circuit. When any of the above-described wiring mistakes occur, the AFCI, GFCI, or AFCI/GFCI will likely trip as soon as some level of current is running through the circuit. This is because the AFCI, GFCI, or AFCI/GFCI will see a current imbalance and trip. Currently, if such a mis-wiring occurs, the installer must troubleshoot the cause of the tripping, which may include several distinct causes and troubleshooting steps.

However, with the circuit breakers 100, 400, 500 of the present disclosure, since the construction of the circuit breakers 100, 400, 500 are line side powered, after tripping and opening the contacts of the circuit breaker, a continued current imbalance is capable of being detected. As such, after tripping, the circuit breaker 500 may be configured to flash or illuminate the LEDS 503 of the circuit breaker 500 to indicate the condition to the installer. Preferably, this indication will inform the installer that the cause of the tripping is due to, e.g., one of mis-wired neutral conditions discussed above.

Figure 21:
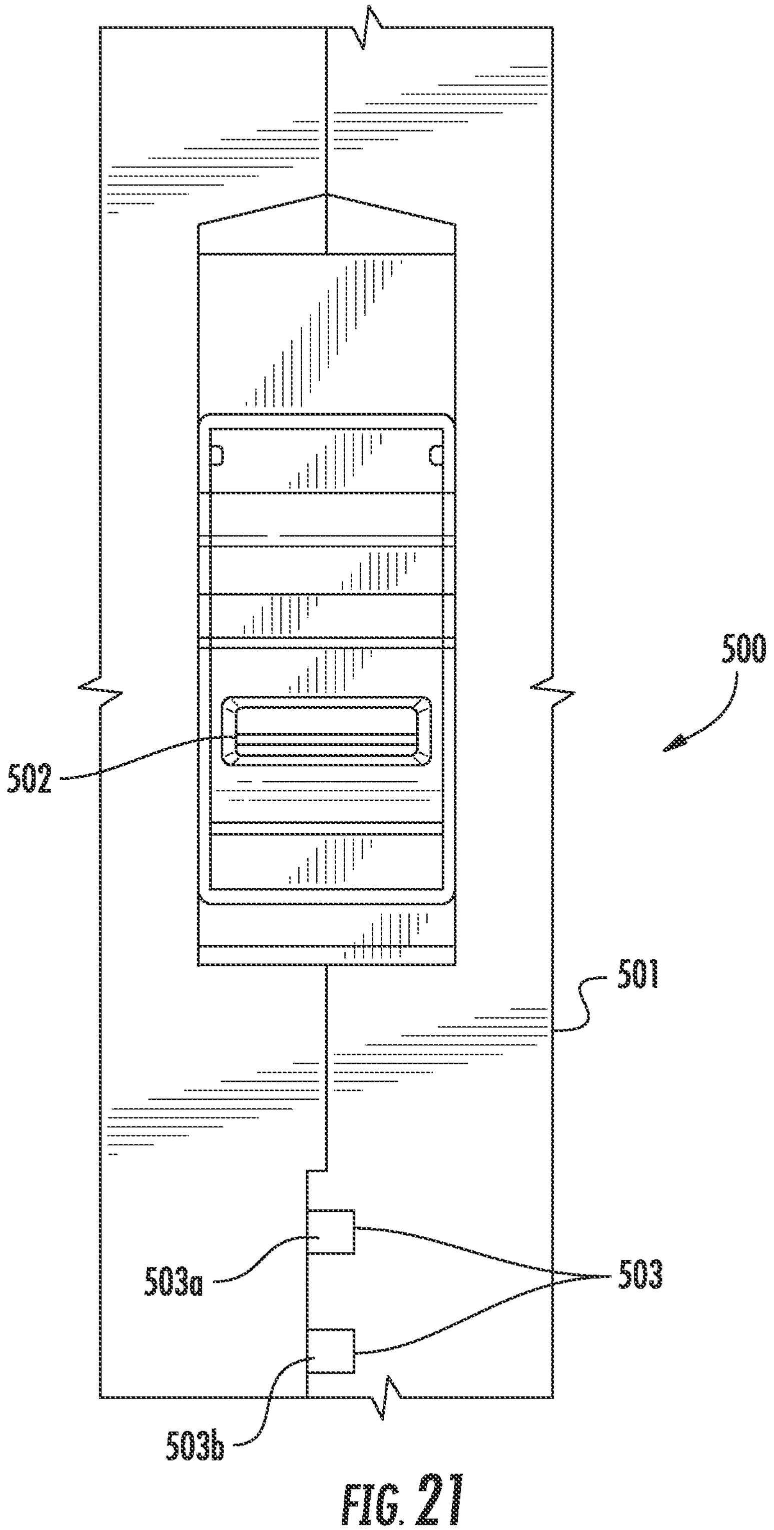
FIG. 21 is a plan view of another embodiment of a circuit breaker user interface incorporating indicator lights.
Figure 22A:
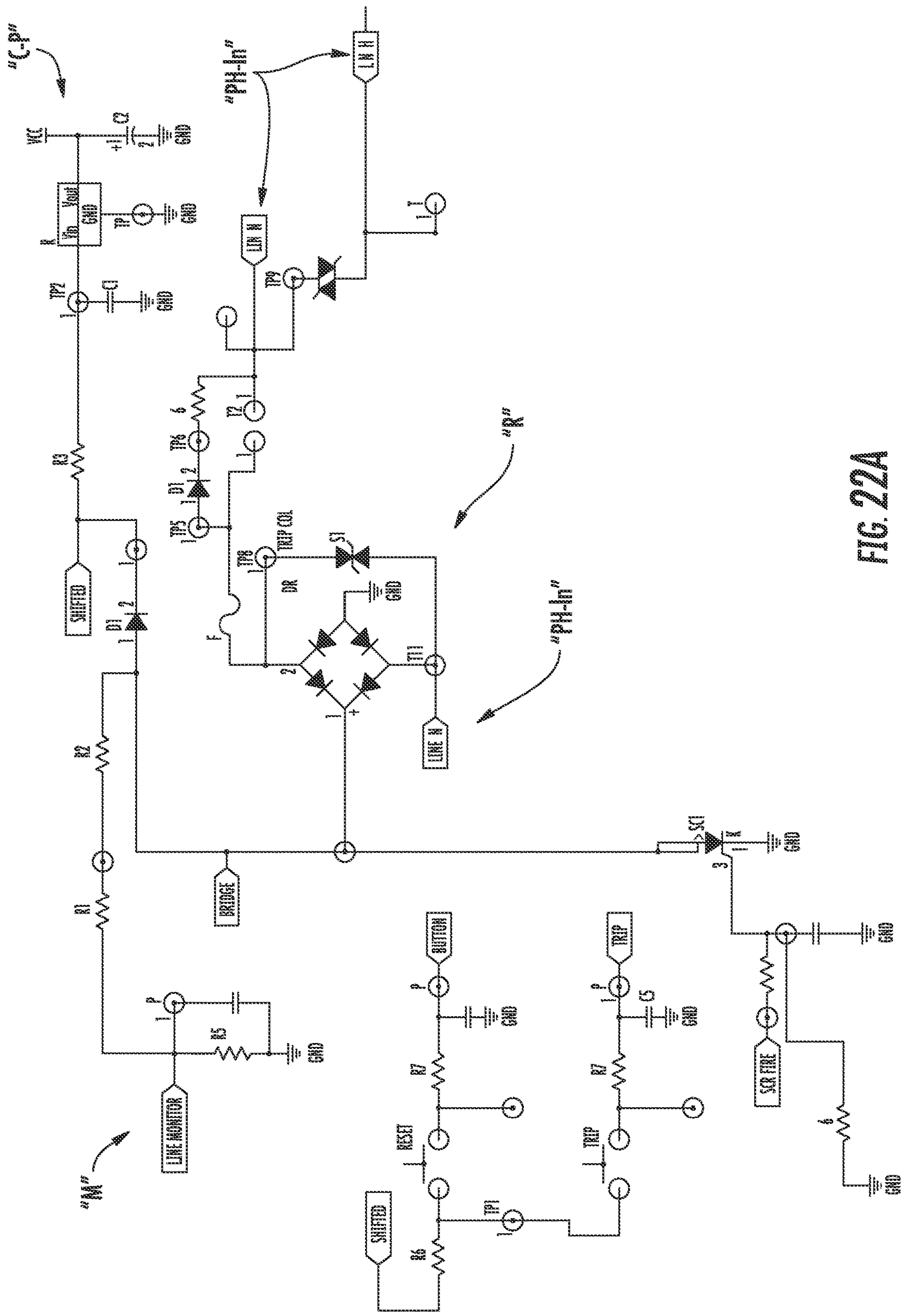
FIGS. 22A-22D illustrate portions of a schematic diagram of the circuit breaker of FIG. 1 for detecting ground faults in a circuit breaker.
Figure 22B:
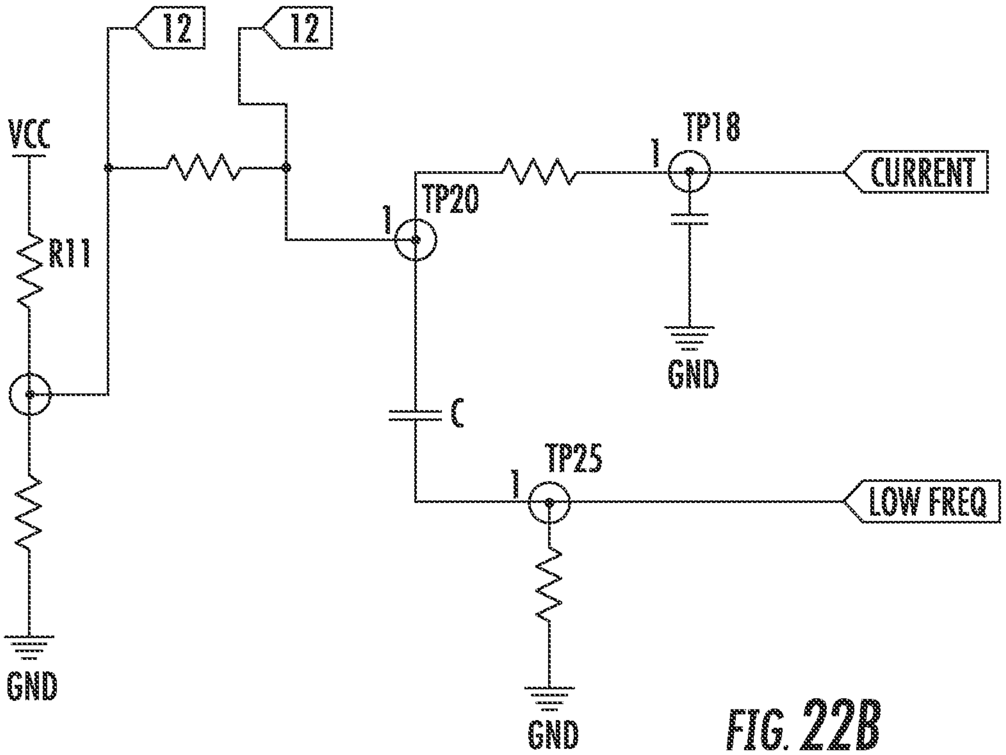
Figure 22C:
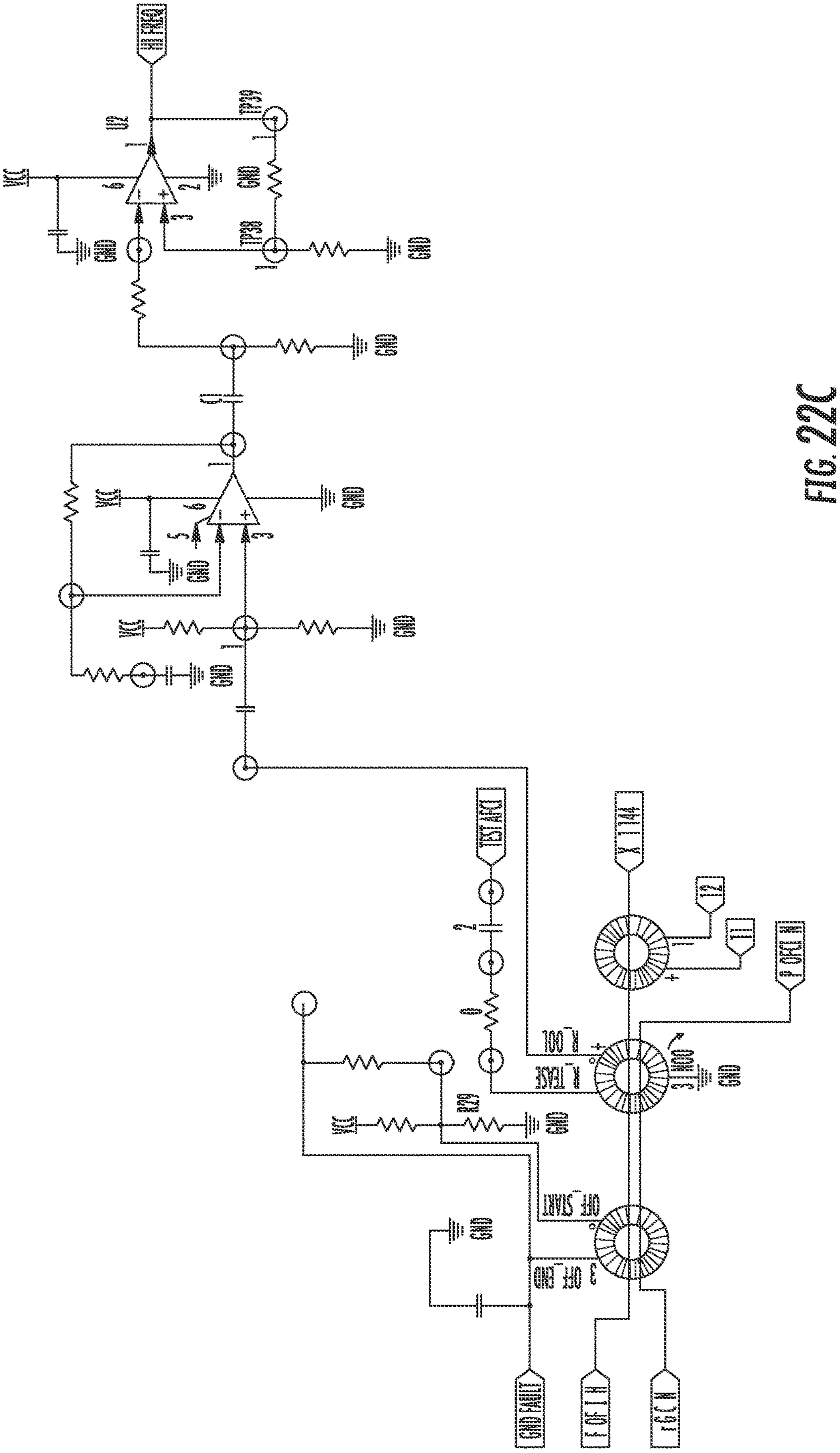
Figure 22D:
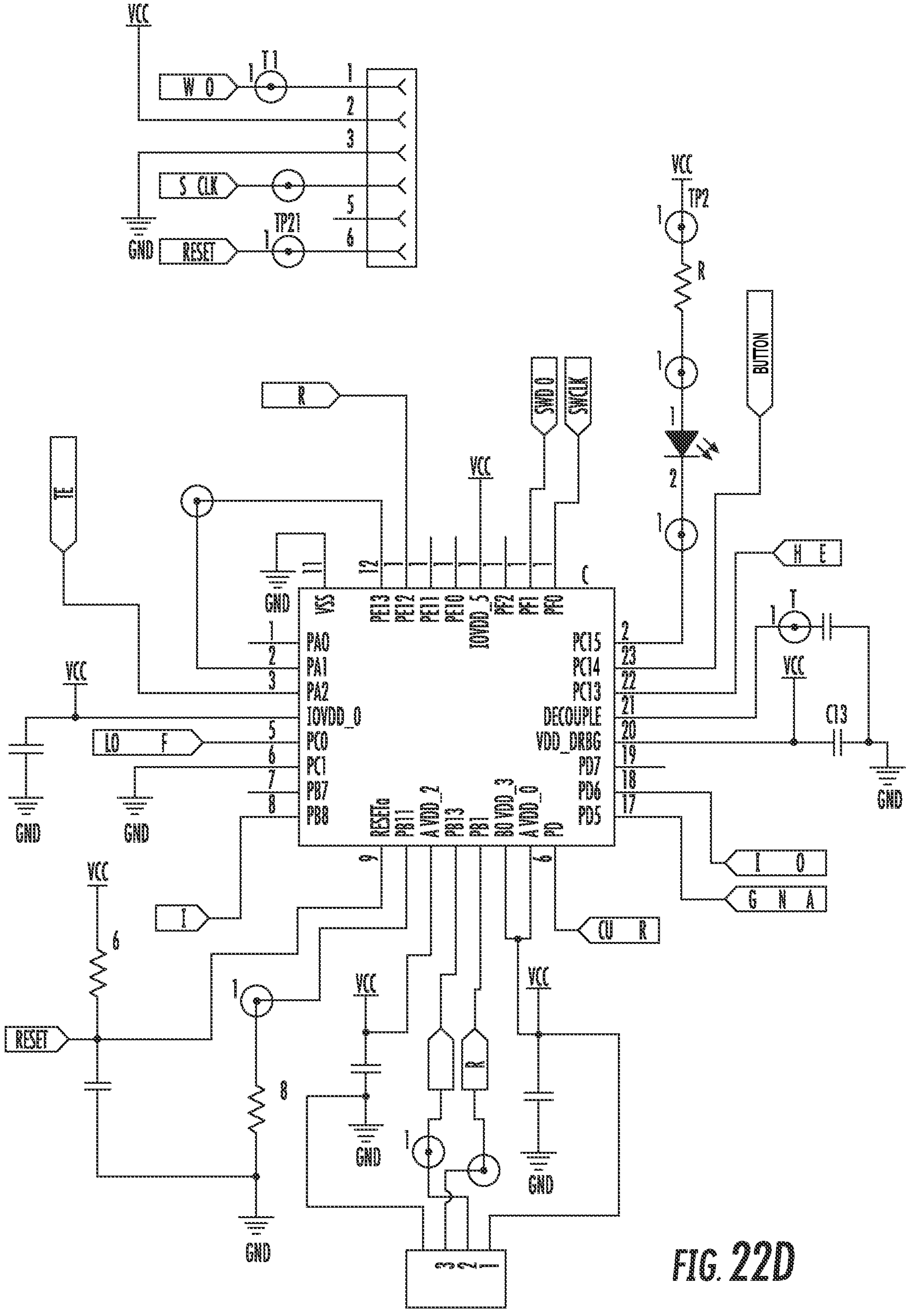
Figure 23A:
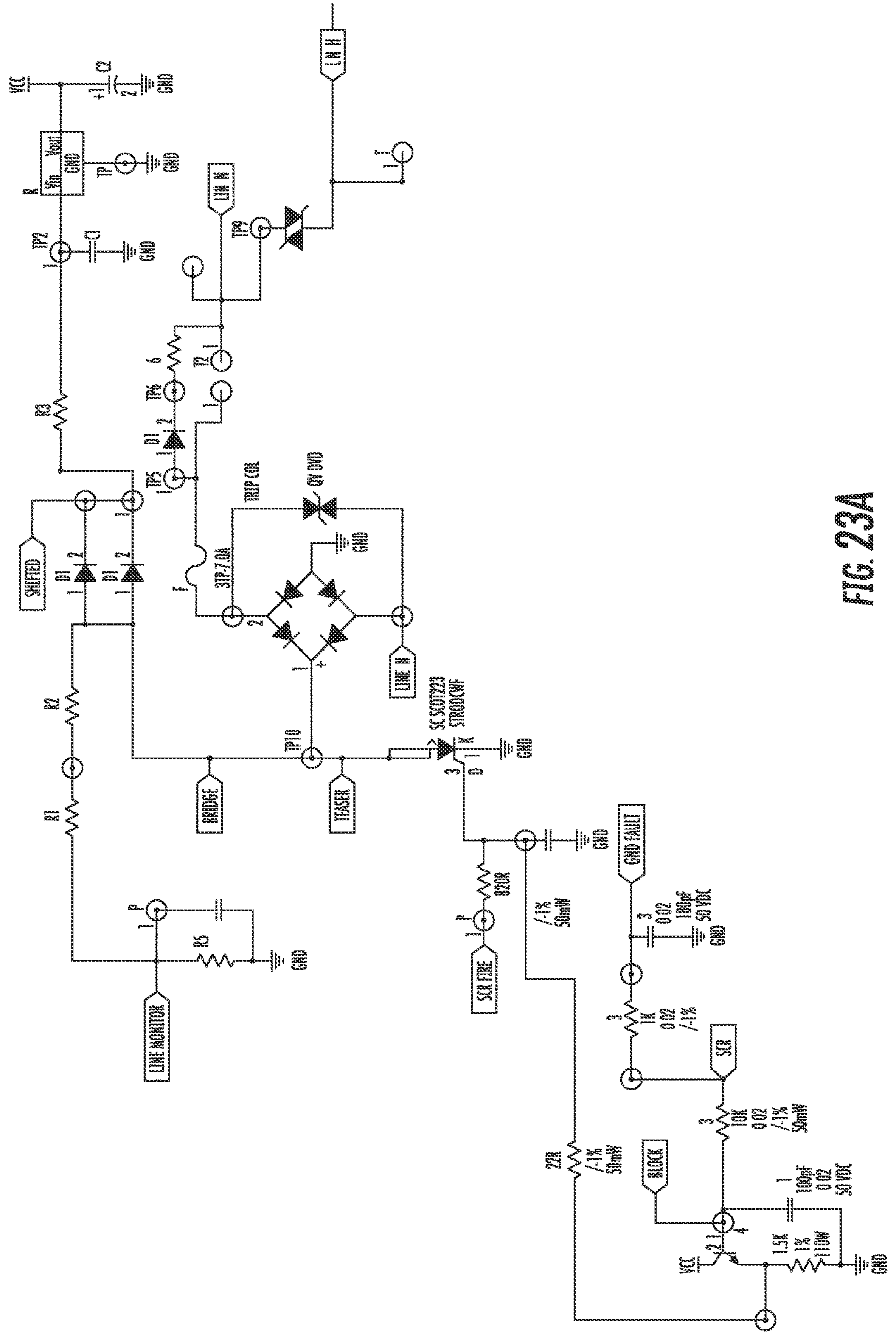
FIGS. 23A-23F illustrate portions of a schematic diagram for detecting arc faults and ground faults in a circuit breaker.
Figure 23B:
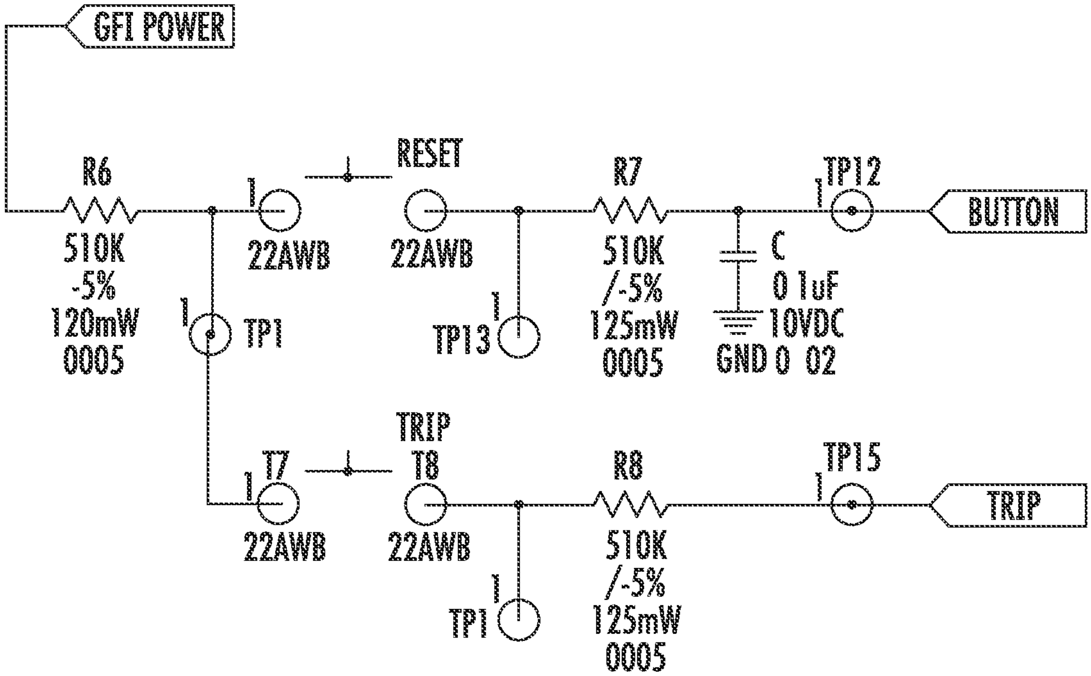
Figure 23C:
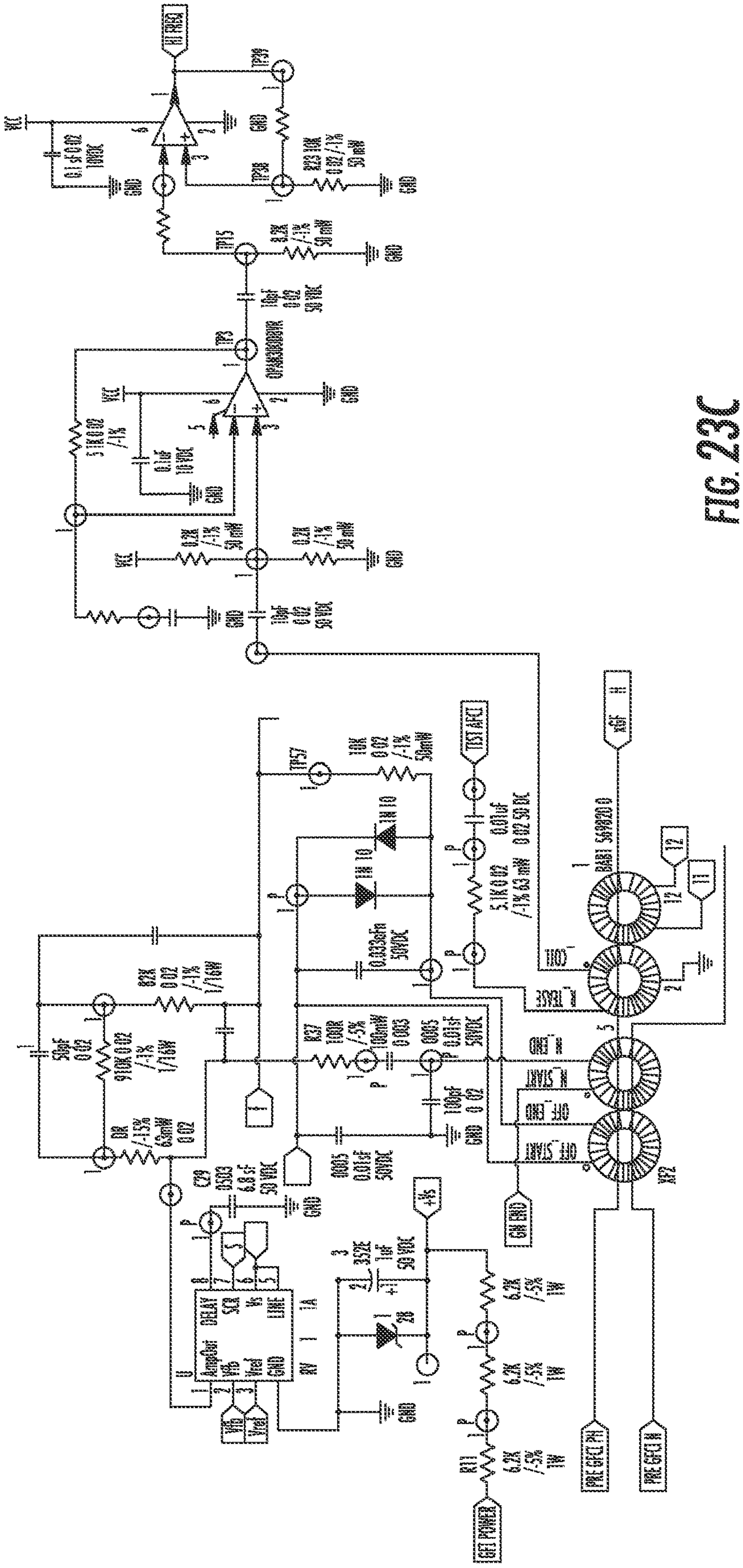
Figure 23D:
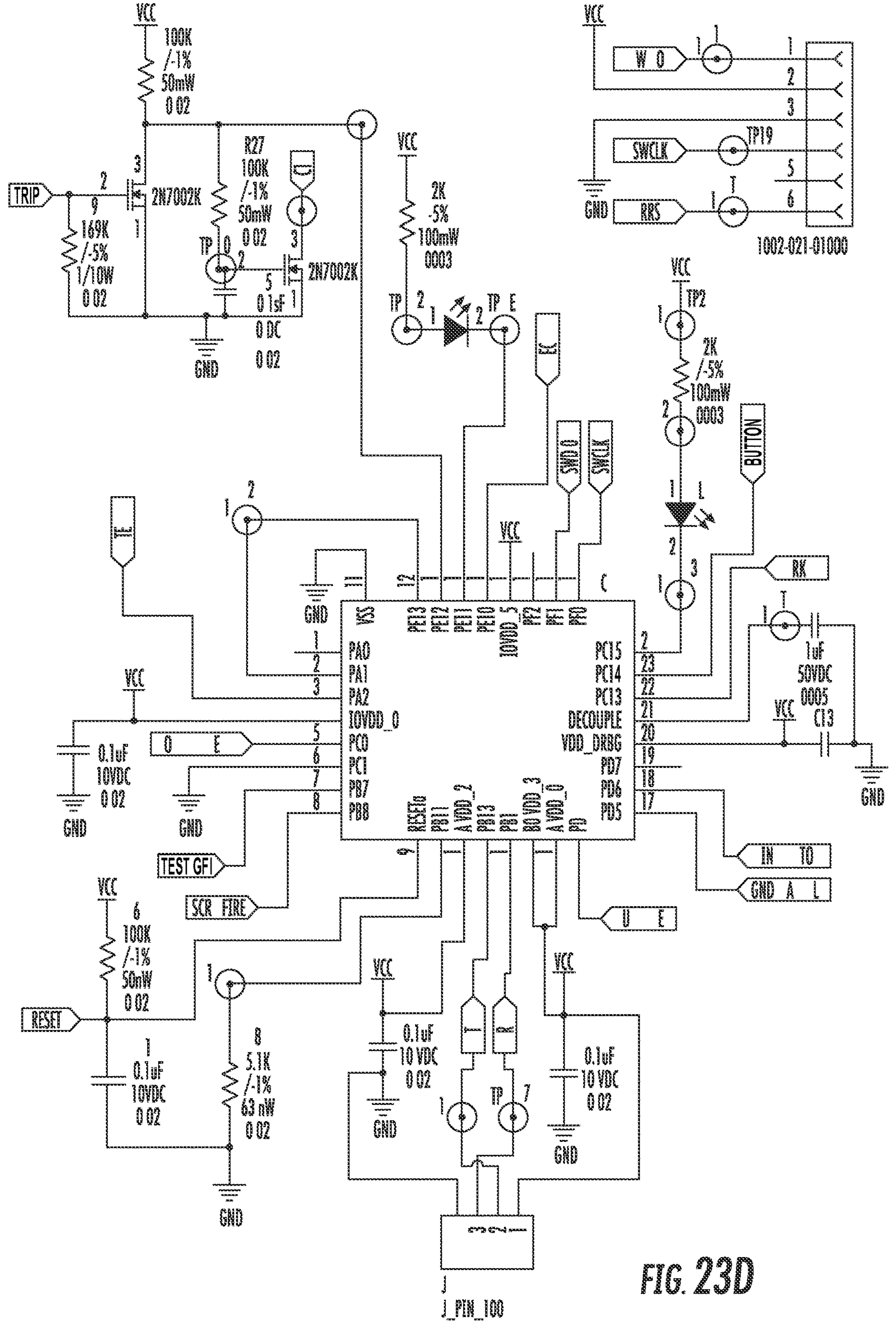
Figure 23E:
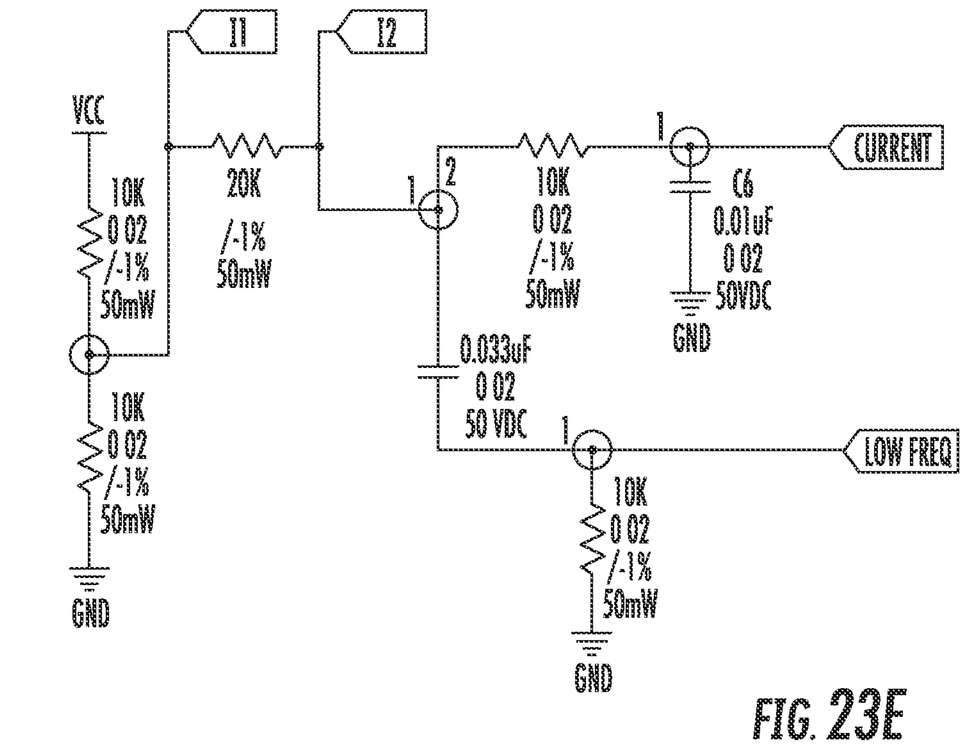
Figure 23F:
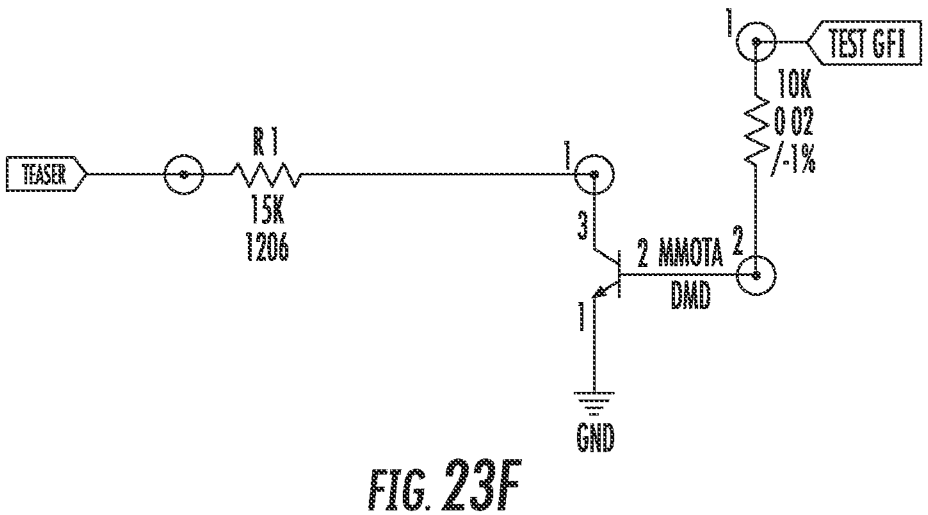
Figure 24A:
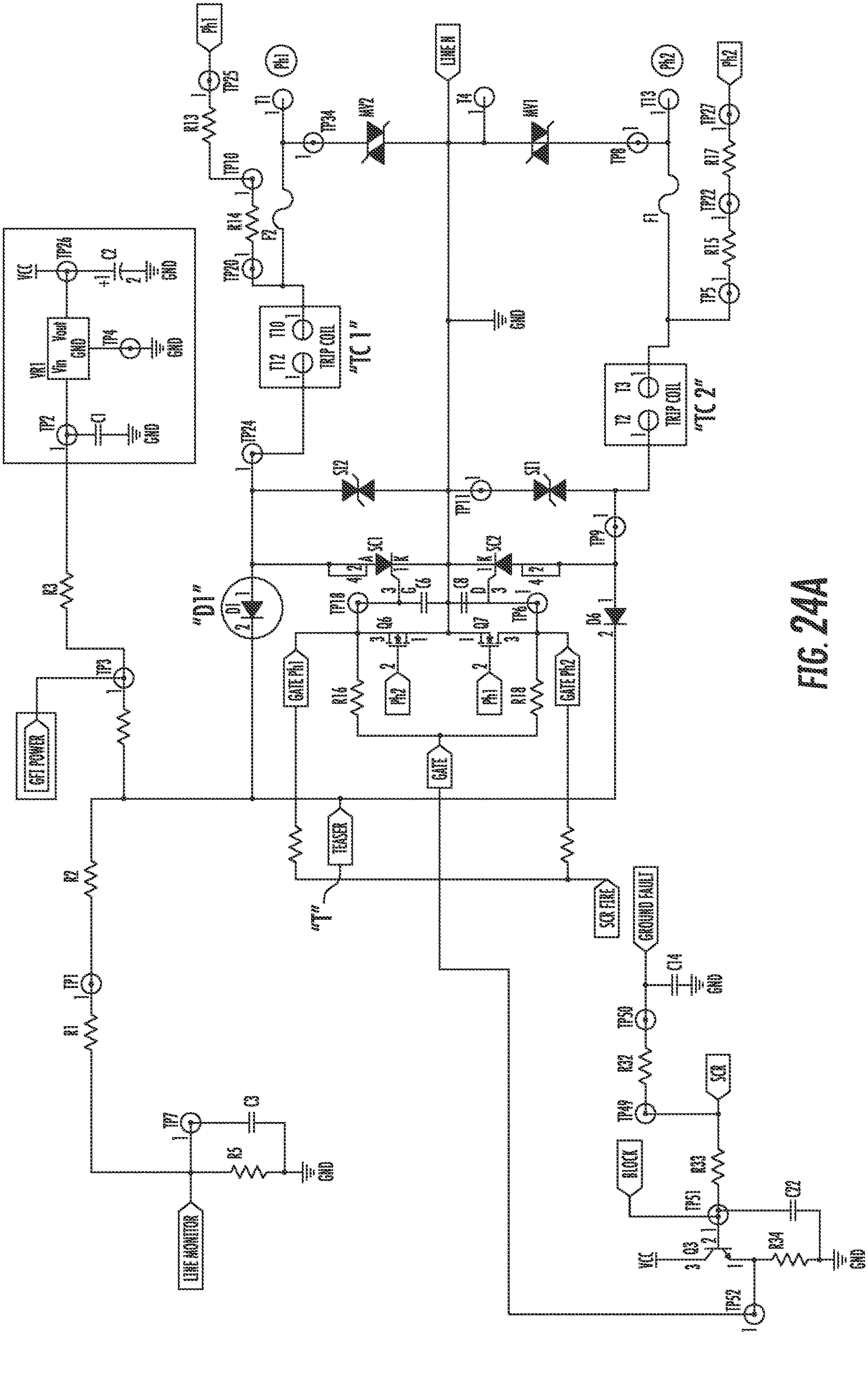
FIGS. 24A-24D illustrate portions of a schematic diagram for detecting ground faults in a two-pole circuit breaker.
Figure 24B:
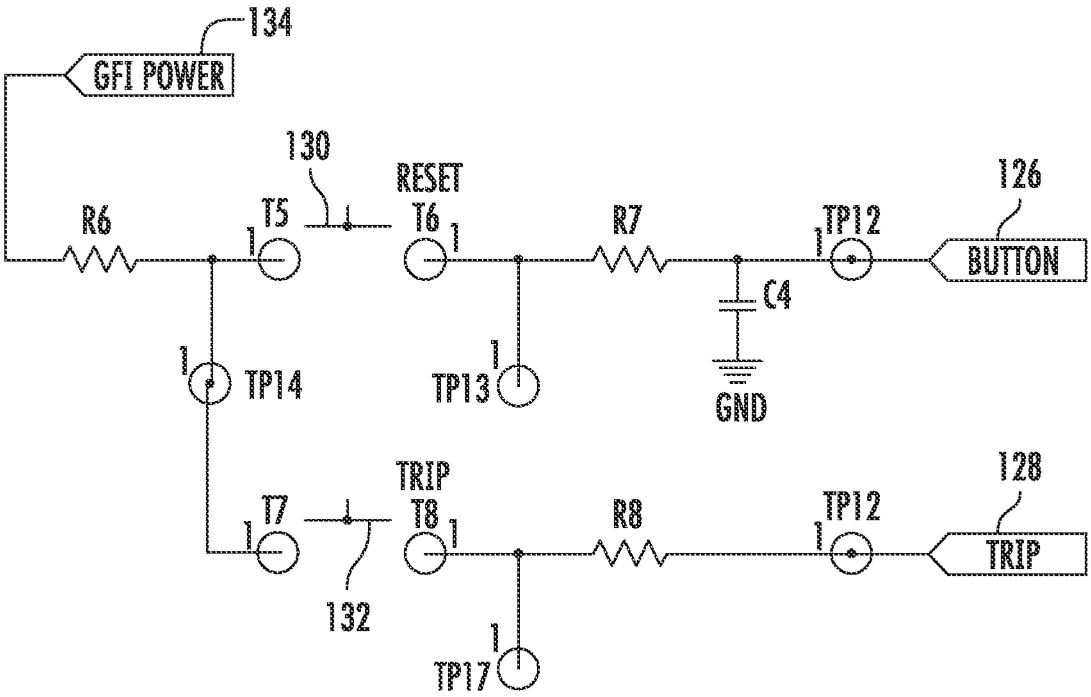
Figure 24C:
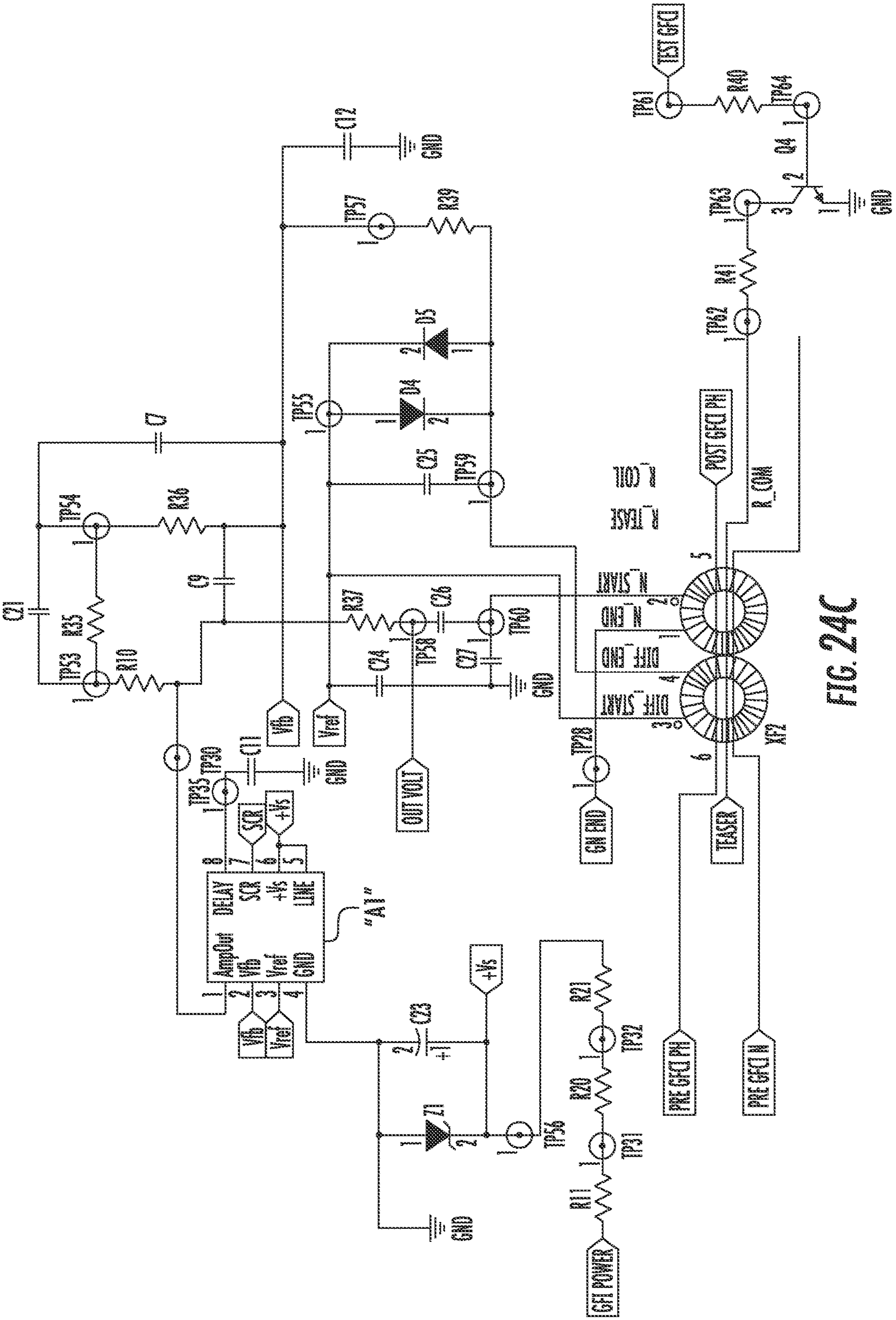
Figure 24D:
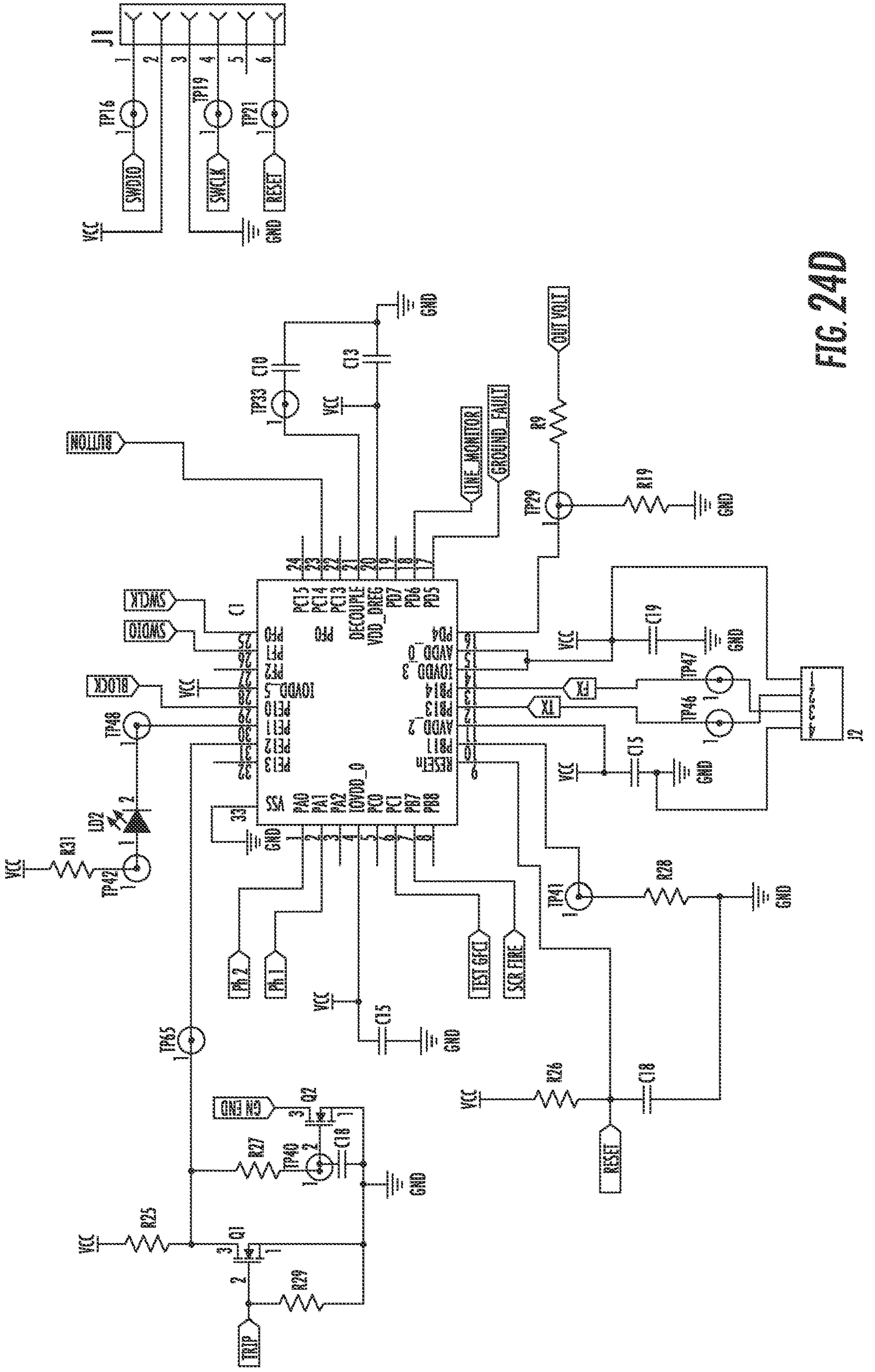

With reference to FIG. 22, a front plan view of a circuit breaker is shown which including a first indicator and a second indicator. The first and second indicators 503*a*, 503*b*, as well as a rocker indicator are configured to output color signals indicative of various states of operation which the circuit breaker may be in. Depending on whether the reset lockout mechanism (FIG. 1), or trip mechanism, are in a trip, mid-trip, or operational configuration, the rocker indicator displays binary signals corresponding to the configuration of the reset lockout mechanism 10 or the trip mechanism. Additionally, the first and second indicators "LED 1", "LED 2" may display various color signals indicative of associated faults detected by the controller (FIG. 7D). More specifically, FIG. 21 shows a GFCI circuit breaker with two LED indicators 503. The various operational states are visually indicated via a combination of electronic (e.g. LED) and mechanical elements. For states that are indicated by a mechanical element, this may be indicated by the position of the rocker actuator and/or a color flag being made visible through a cut-out or window 502 in a central portion of the rocker actuator. More specifically, in the case of the mechanical indication, there may be a plurality of color markings, one of which is visible to the user depending on the position of the rocker actuator. For example, when in the OFF state, the rocker actuator would be in the position that exposes the same color as the overall housing through its window (e.g. white or black). Alternatively, a different color may be used to indicate the OFF state. When in the ON state, the rocker actuator would be in the position that exposes a green color through its window. When in the mid-trip state, the rocker actuator would be in the position that exposes a red color through its window.

In addition to the mechanical indication provided by the rocker actuator, one or more LEDs 503 may be included. For example, a GFCI circuit breaker may have a first LED 503*a* in a first location, an AFCI circuit breaker may have a second LED 503*b* in a second location, and a combination AFCI/GFCI circuit breaker may include the first and second LED 503*a*, 503*b* in both the first and second locations, respectively. By locating the LEDs 503 in the first location, the second location, or both the first and second locations based on the type of protection provided by the circuit breaker (GFCI, AFCI, and AFCI/GFCI respectively), a more intuitive user interface 500 is provided. This user interface 500 may help users distinguish between different circuits when viewing multiple circuit breakers disposed along a circuit breaker panel (not shown).

In the case of a GFCI circuit breaker, the various states may be indicated as in the following table.

| State | Rocker Actuator | GFCI LED |
|---|---|---|
| ON | GREEN | OFF |
| MID-TRIP due to Overcurrent | RED | OFF |
| MID-TRIP due to Ground Fault | RED | STEADY ON |
| MID-TRIP due to Self-Test Failure (locked out) | RED | BLINKING (0.1 s on/0.1 s off) |
| OFF | WHITE (or BLACK) | OFF |

In the case of a AFCI circuit breaker, the various states may be indicated as in the following table.

| State | Rocker Actuator | AFCI LED |
|---|---|---|
| ON | GREEN | OFF |
| MID-TRIP due to overcurrent | RED | OFF |
| MID-TRIP due to Series Arc Fault | RED | STEADY ON |
| MID-TRIP due to Parallel Arc Fault | RED | BLINKING (1 s on/1 s off) |
| MID-TRIP due to Miswired Neutral | RED | BLINKING (3 s on/3 s off) |
| MID-TRIP due to Self-Test Failure (locked out) | RED | BLINKING (0.1 s on/0.1 s off) |
| OFF | WHITE (or BLACK) | OFF |

In the case of a AFCI/GFCI circuit breaker, the various states may be indicated as in the following table.

| State | Rocker Actuator | GFCI LED | AFCI LED |
|---|---|---|---|
| ON | GREEN | OFF | OFF |
| MID-TRIP due to overcurrent | RED | OFF | OFF |
| MID-TRIP due to ground fault | RED | STEADY ON | OFF |
| MID-TRIP due to Series Arc Fault | RED | OFF | STEADY ON |
| MID-TRIP due to Parallel Arc Fault | RED | OFF | BLINKING (1 s on/1 s off) |
| MID-TRIP due to Miswired Neutral | RED | BLINKING (3 s on/3 s off) | BLINKING (3 s on/3 s off) |
| MID-TRIP due to Self-Test Failure (locked out) | RED | BLINKING (0.1 s on/0.1 s off) | BLINKING (0.1 s on/0.1 s off) |
| OFF | WHITE (or BLACK) | OFF | OFF |

It is contemplated that the various states indicated by signals produced by the window 502 and/or the GFCI and AFCI LEDs 503 may vary depending on the types of faults which the circuit breaker is capable of identifying, a display hierarchy for identifying particular faults, etc. For a detailed discussion of the various states and indicators of a circuit breaker, reference may be made to commonly-owned U.S. Pat. No. 6,437,700, the entire disclosure of which is hereby incorporated by reference.

Circuit breakers may employ trip mechanisms which include, without limitation, solenoids, bimetallic, and/or hydraulic components. In the case of a trip mechanism which includes bimetallic elements, the speed at which it trips is directly proportional to the amount of overcurrent passing therethrough due to the heat generated by the overcurrent. This is commonly referred to as a trip-time curve of a circuit breaker. Regulatory authorities such as Underwriters Laboratories (UL) define limits on the amount of time a circuit breaker may take to trip at a given current level. However, the trip-time curve may vary among circuit breakers depending on the application and requirements associated with a particular installation. Such variation in the trip-time curve is acceptable as long as it does not exceed the defined limit prescribed by applicable regulatory authorities.

Other trip mechanisms, such as solenoids may trip near instantaneously once a given current threshold is reached. With such mechanisms, it may be beneficial to introduce a delay in tripping based on current level to replicate a trip-time curve.

In certain embodiments, circuit breakers may include mechanisms to introduce a delay in tripping based on a detected current level to replicate a trip-time curve. These embodiment are similar to the other embodiments describe above except that they include an additional current sensor to measure the current flowing through the branch circuit (not shown). The controller of the circuit breaker monitors the current level detected by the current sensor and when the controller detects a fault or overcurrent, the controller may set a delay time before which it will trip the circuit breaker based on the current level sensed by the current sensor. The trip-time curve may be modified by the controller based on the desired circuit breaker operation. For example, the circuit breaker can be programmed with one or more of a plurality of trip-time curves to fit any given application. In addition, the trip-time curve could be customized or modified for a particular user based on the user's requirements.

FIGS. 22A-22D are portions of a schematic diagram of a AFCI circuit breaker. The circuit shown in FIGS. 22A-22D is similar to the circuit shown in FIGS. 23A-23F (e.g. GFCI circuit breaker) except that the GFCI related components are not included. In this embodiment, there is no G/N transformer and there is no GFCI IC.

FIGS. 23A-23F are portions of a schematic diagram of a combination AFCI/GFCI circuit breaker. The circuit shown in FIG. 7C is similar to the circuit shown in FIG. 7A (e.g. GFCI circuit breaker 100) with additional components for AFCI detection which include a high frequency (or Rogowski) core 791, a current measuring core 792 a current interface circuit 780, and a high frequency amplifier circuit 790. The high frequency core 791 is used to detect high frequency signals on the conductor passing therethough and the current measuring core 792 is used to measure the magnitude of current on the conductor passing therethough. The current interface circuit 780, which includes voltage divider components, communicates the output of the current measuring core 792 to the controller. The high frequency amplifier circuit 780 communicates the output of the high frequency core 791 to the controller.

FIGS. 24A-24D illustrate portions of a schematic diagram for detecting ground faults in a two-pole circuit breaker.

Figure 25:
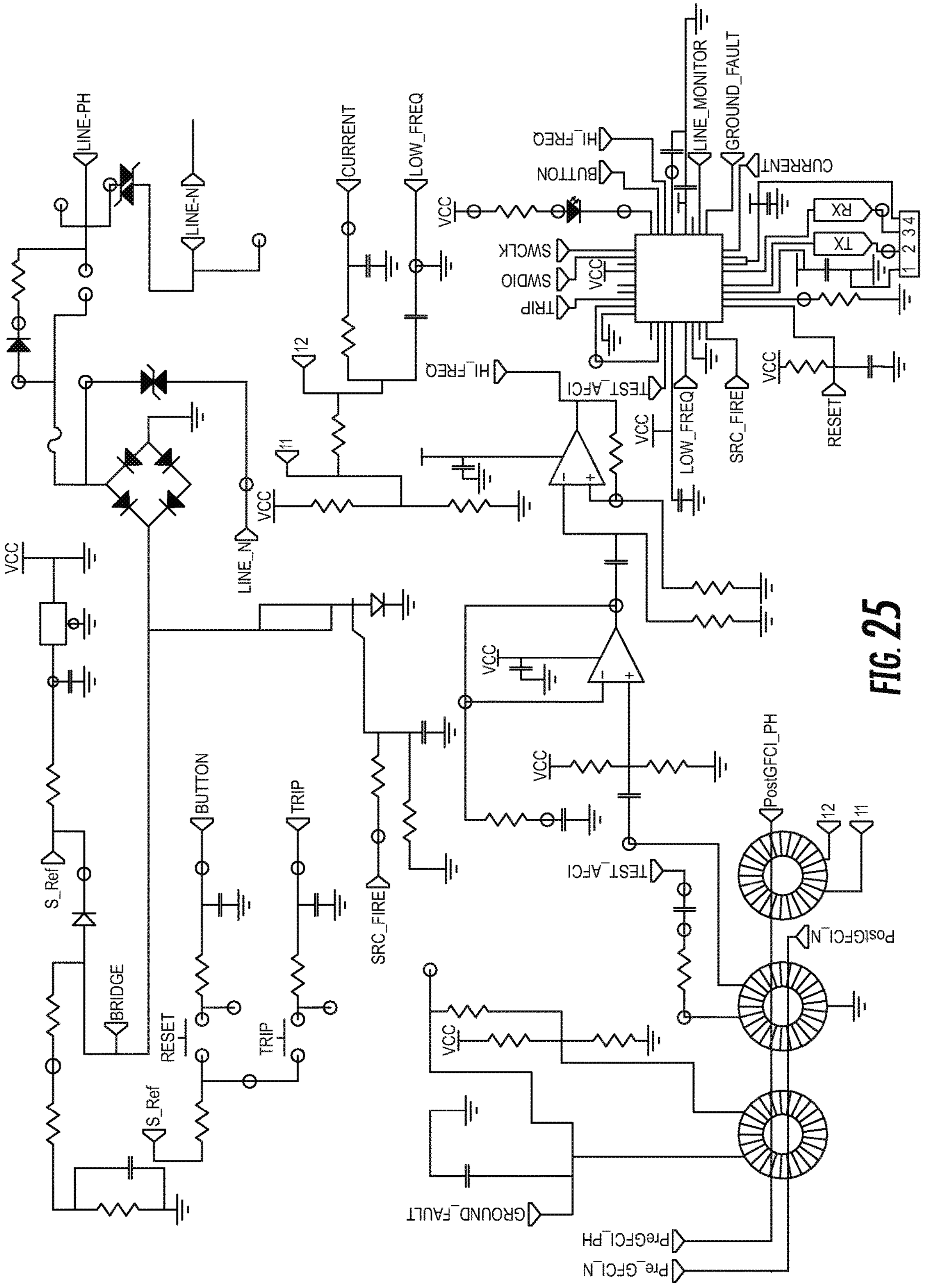
FIG. 25 illustrates the circuit diagrams of FIGS. 22A-22D interconnected.

FIG. 25 illustrates the circuit diagrams of FIGS. 22A-22D interconnected.

Figure 26:
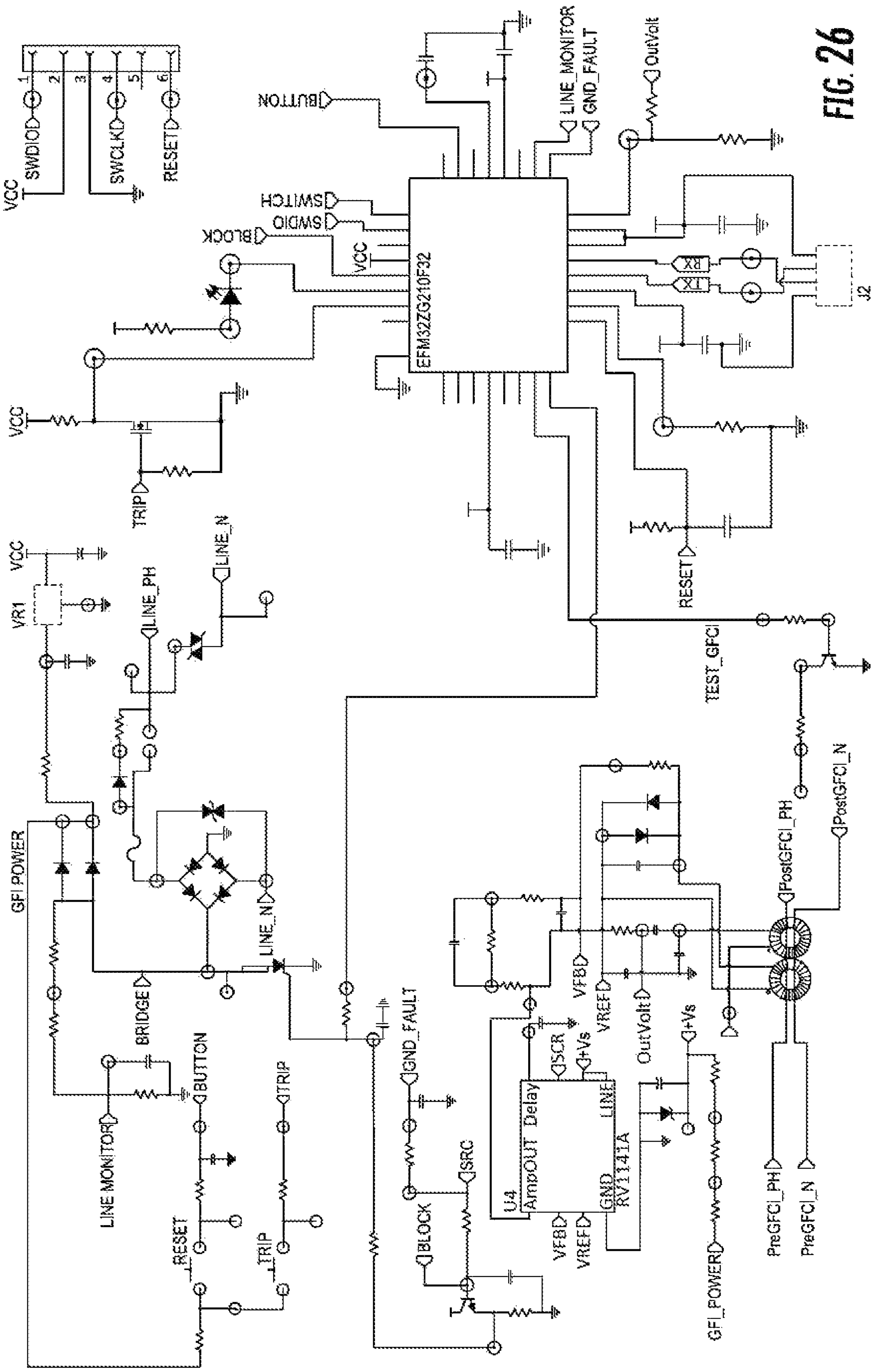
FIG. 26 illustrates the circuit diagrams of a ground fault protection of equipment (GFPE) circuit breaker.
Figure 29:
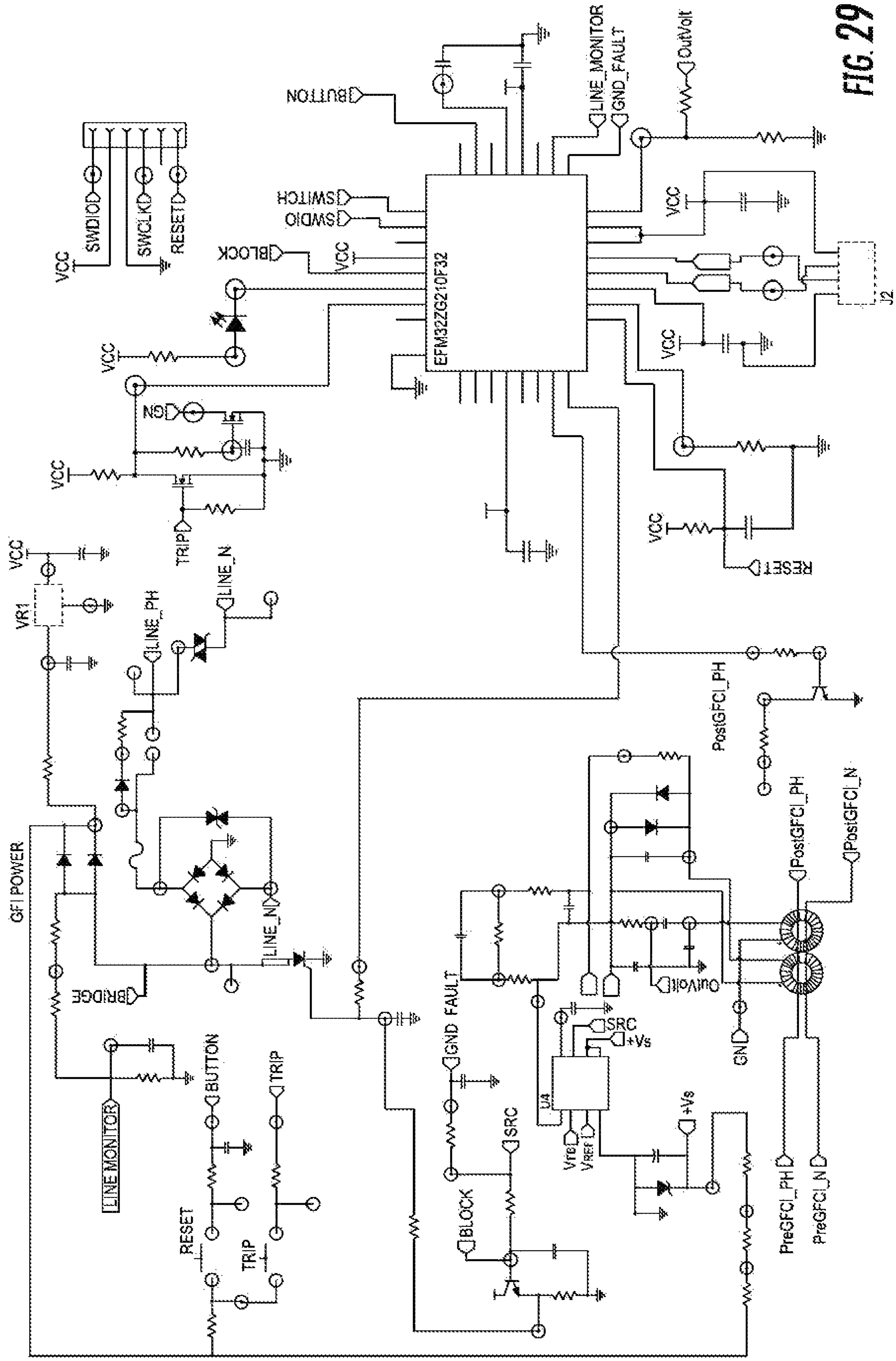
FIG. 29 illustrates the circuit diagrams of FIGS. 7A-7D interconnected.

FIG. 26 is a schematic diagram of a ground fault protection of equipment (GFPE) circuit breaker. The circuit shown in FIG. 29 is similar to the circuit shown in FIG. 26 (e.g. GFCI circuit breaker 100) except that the G/N transformer and some of the G/N related components of interface are not used. In this embodiment, the G/N transformer may be omitted or simply not connected to the remainder of the circuit. In addition, the levels at which the GFPE circuit breaker will trip are higher than in the circuit breaker (e.g. GFCI circuit breaker).

Figure 27:
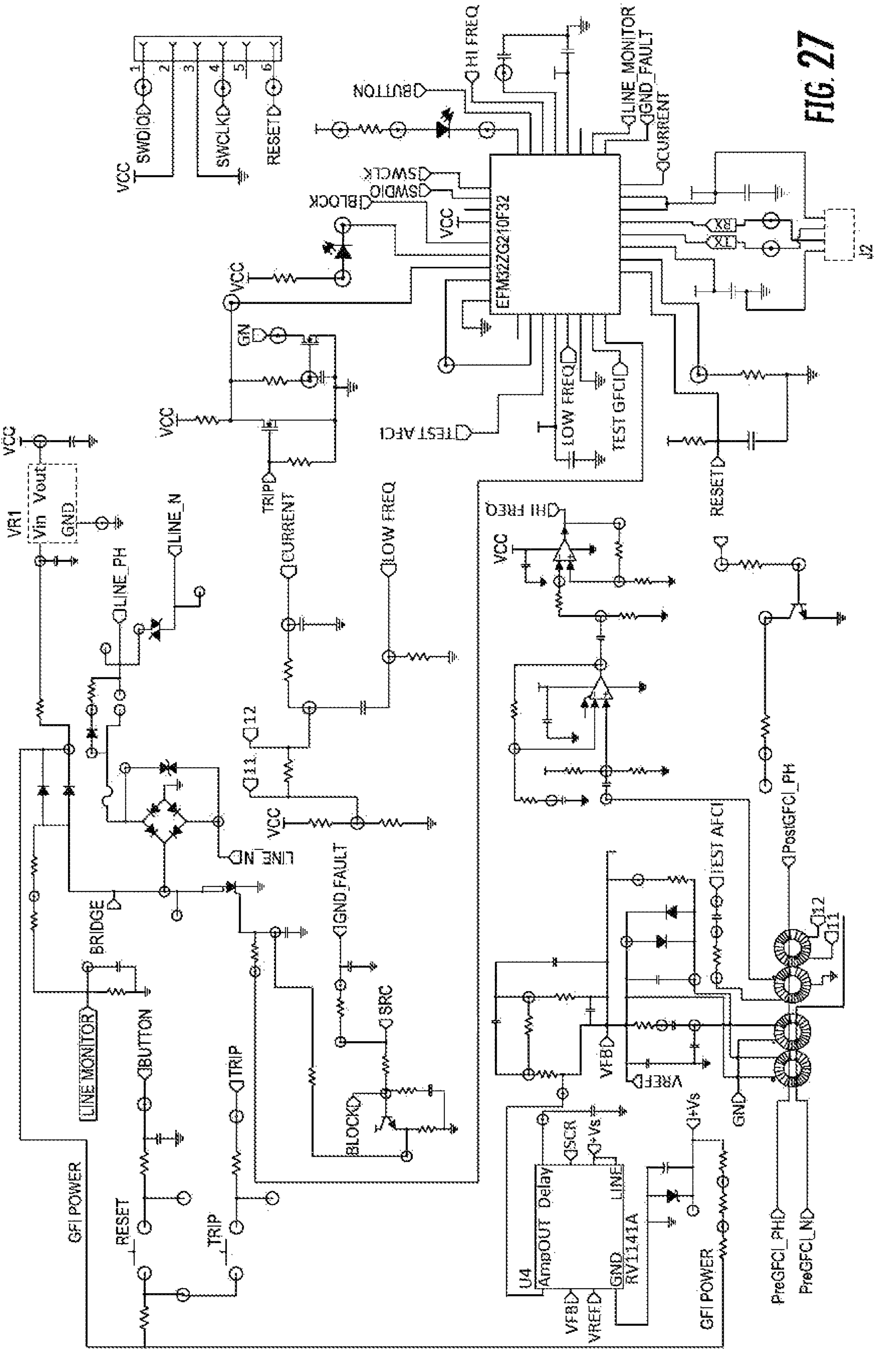
FIG. 27 illustrates the circuit diagrams of FIGS. 23A-23F interconnected.
Figure 28:
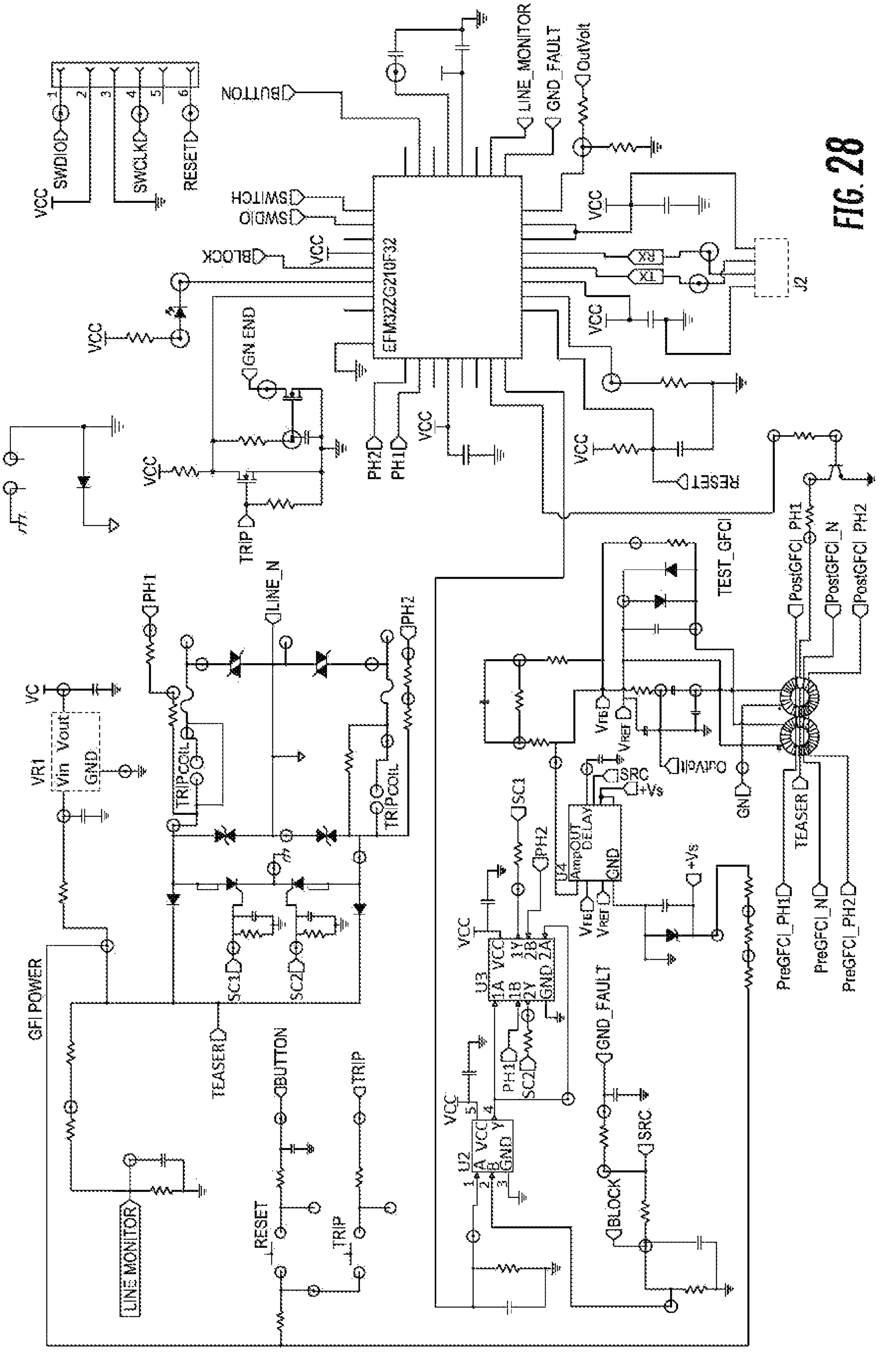
FIG. 28 illustrates the circuit diagrams of FIGS. 24A-24D interconnected.

FIG. 27 illustrates the circuit diagrams of FIGS. 23A-23F interconnected; FIG. 28 illustrates the circuit diagrams of FIGS. 24A-24D interconnected; and FIG. 29 illustrates the circuit diagrams of FIGS. 7A-7D interconnected.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A circuit breaker, comprising:

a line terminal;

a load terminal;

an actuator movable between a first position and a second position;

a latch arm having a proximal portion operably coupled to the actuator and a distal portion;

a linkage mechanism operably coupled to the distal portion of the latch arm wherein movement of the actuator from the first position towards the second position actuates the latch arm, wherein actuation of the latch arm operates the linkage mechanism, wherein operation of the linkage mechanism selectively establishes electrical communication between the line terminal and the load terminal;

a reset lockout mechanism configured to selectively inhibit operation of the linkage mechanism, wherein the reset lockout mechanism includes an armature movable between a biased position and an actuated position;

a solenoid configured to selectively generate a magnetic field to draw the armature toward the solenoid, wherein the linkage mechanism further includes a second linkage coupled to the armature and a first linkage, the second linkage configured to selectively decouple the line terminal from the load terminal when the armature is drawn toward the solenoid; and a housing and an electrical test contact, the electrical test contact being disposed within the housing, wherein the housing at least partially encloses the circuit breaker, the electrical test contact in operable communication with the latch arm and configured to cause the circuit breaker to perform a self-test.

2. The circuit breaker of claim 1, wherein the linkage mechanism includes a projection, wherein the armature is configured to selectively disengage the projection when the armature is in the actuated position, and wherein the linkage mechanism further includes a slot configured to slidably receive the projection.

3. The circuit breaker of claim 2, wherein the armature is moved to the actuated position when a predetermined condition is detected by the circuit breaker, wherein the first position of the actuator is associated with an OFF state of the circuit breaker and the second position of the actuator is associated with an ON state of the circuit breaker and the reset lockout mechanism permits the actuator to move between the first position and the second position by disengaging the projection of the armature when the circuit breaker detects the predetermined condition, and wherein the predetermined condition is selected from the group consisting of a ground fault, a ground-neutral fault, an arc fault, and an overcurrent.

4. The circuit breaker of claim 3, further including control circuitry configured to perform a self-test and determine, based on the self-test, if the predetermined condition is present, wherein the self-test is performed in response to movement of the actuator from the first position towards the second position, and wherein the self-test is performed automatically by the control circuitry when the actuator is located in the second position.

5. The circuit breaker of claim 4, wherein the circuit breaker includes a sensor and the control circuitry performs the self-test by:

creating a simulated fault;

obtaining a sensor signal from the sensor;

analyzing the sensor signal; and determining whether the predetermined condition is present based on the sensor signal.

6. The circuit breaker of claim 5, wherein the sensor includes at least one of a differential transformer, a ground neutral transformer, a high frequency transformer, and a voltage sensor.

7. The circuit breaker of claim 3, wherein a latch portion of the latch arm includes at least one projection, the linkage mechanism having a first linkage including a toothed edge that defines a portion of a slot disposed along the first linkage, the slot configured to receive the at least one projection.

8. The circuit breaker of claim 7, wherein the circuit breaker is in an ON state when the first linkage of the linkage mechanism is rotated such that the projection engages the toothed edge of the first linkage.

9. The circuit breaker of claim 1, wherein the circuit breaker is a multi-pole circuit breaker.

10. A circuit breaker, comprising:

an actuator movable between a first position and a second position;

a latch arm having a proximal portion operably coupled to the actuator and a distal portion;

a conductive path configured to selectively electrically couple a line terminal and a load terminal;

a reset lockout mechanism for selectively opening the conductive path if a predetermined condition is detected, the reset lockout mechanism including:

a linkage mechanism operably coupled to the distal portion of the latch arm, wherein movement of the actuator from the first position towards the second position actuates the latch arm, wherein actuation of the latch arm operates the linkage mechanism, wherein operation of the linkage mechanism selectively establishes electrical communication between the line terminal and the load terminal; and an armature movable between a biased position and an actuated position, the armature configured to selectively engage the distal portion of the latch arm when the armature is in the actuated position; and a projection extending from the distal portion of the latch arm wherein the armature forms an interference fit with the projection, wherein when the projection is in a first position relative to the linkage mechanism the line terminal is in electrical communication with the load terminal, and when the projection is in a second position relative to the linkage mechanism the line terminal is not in electrical communication with the load terminal.

11. The circuit breaker of claim 10, further comprising an extension of the armature; a first linkage; and an actuator configured to engage the armature to clear the interference fit between the projection of the first linkage and the extension of the armature.

12. The circuit breaker of claim 11, wherein the actuator is a solenoid.

13. A circuit breaker, comprising:

an actuator movable between a first position and a second position;

a latch arm having a proximal portion operably coupled to the actuator and a distal portion;

a conductive path configured to selectively electrically couple a line terminal and a load terminal;

a reset lockout mechanism for selectively opening the conductive path if a predetermined condition is detected, the reset lockout mechanism including:

a linkage mechanism operably coupled to the distal portion of the latch arm, wherein movement of the actuator from the first position towards the second position actuates the latch arm, wherein actuation of the latch arm operates the linkage mechanism, wherein operation of the linkage mechanism selectively establishes electrical communication between the line terminal and the load terminal; and an armature movable between a biased position and an actuated position, the armature configured to selectively engage the distal portion of the latch arm when the armature is in the actuated position, wherein the linkage mechanism further comprises a first linkage, wherein the first linkage defines a slot configured to receive a latch portion of the latch arm, and wherein the latch portion includes at least one projection configured to engage a toothed edge of the first linkage, the toothed edge formed along a portion of the slot.

14. A circuit breaker, comprising:

an actuator movable between a first position and a second position;

a latch arm having a proximal portion operably coupled to the actuator and a distal portion;

a conductive path configured to selectively electrically couple a line terminal and a load terminal;

a reset lockout mechanism for selectively opening the conductive path if a predetermined condition is detected, the reset lockout mechanism including:

a linkage mechanism operably coupled to the distal portion of the latch arm, wherein movement of the actuator from the first position towards the second position actuates the latch arm, wherein actuation of the latch arm operates the linkage mechanism, wherein operation of the linkage mechanism selectively establishes electrical communication between the line terminal and the load terminal; and an armature movable between a biased position and an actuated position, the armature configured to selectively engage the distal portion of the latch arm when the armature is in the actuated position, wherein the latch arm includes a pair of springs on a rear end thereof for biasing the latch arm.

15. A circuit breaker, comprising:

an actuator movable between a first position and a second position;

a latch arm having a proximal portion operably coupled to the actuator and a distal portion;

a conductive path configured to selectively electrically couple a line terminal and a load terminal:

a reset lockout mechanism for selectively opening the conductive path if a predetermined condition is detected, the reset lockout mechanism including:

a linkage mechanism operably coupled to the distal portion of the latch arm, wherein movement of the actuator from the first position towards the second position actuates the latch arm, wherein actuation of the latch arm operates the linkage mechanism, wherein operation of the linkage mechanism selectively establishes electrical communication between the line terminal and the load terminal; and an armature movable between a biased position and an actuated position, the armature configured to selectively engage the distal portion of the latch arm when the armature is in the actuated position; and an electrical test contact disposed within a housing enclosing the circuit breaker, the electrical test contact configured to cause the circuit breaker to perform a simulated test.

16. A circuit breaker, comprising:

a line terminal;

a load terminal;

an actuator movable between a first position, a second position, and a third position;

a latch arm having a proximal portion operably coupled to the actuator and a distal portion;

a linkage mechanism operably coupled to the distal portion of the latch arm wherein movement of the actuator from the first position towards the third position actuates the latch arm, wherein actuation of the latch arm operates the linkage mechanism, wherein operation of the linkage mechanism selectively establishes electrical communication between the line terminal and the load terminal; and a reset lockout mechanism configured to selectively inhibit operation of the linkage mechanism, wherein the first position of the actuator is associated with an OFF state of the circuit breaker and the second position of the actuator in which a fault or overcurrent condition is present corresponding to a mid-trip state of the circuit breaker, wherein the circuit breaker is configured to perform a self-test when going from the second position of the actuator to the first position of the actuator;

an armature movable between a biased position and an actuated position, the armature configured to selectively engage the distal portion of the latch arm when the armature is in the actuated position;

a solenoid and configured to selectively generate a magnetic field to draw the armature toward the solenoid, wherein the linkage mechanism further includes a second linkage coupled to the armature and a first linkage, the second linkage configured to selectively decouple the line terminal from the load terminal when the armature is drawn toward the solenoid; and a housing and an electrical test contact, the electrical test contact being disposed within the housing, wherein the housing at least partially encloses the circuit breaker, the electrical test contact in operable communication with the latch arm and configured to cause the circuit breaker to perform a self-test.

* * * * *